US00RE45559E

(19) United States
(12) Reissued Patent
Williams

(10) Patent Number: US RE45,559 E
(45) Date of Reissued Patent: Jun. 9, 2015

(54) PORTABLE COMPUTERS

(75) Inventor: Hilary Lyndsay Williams, Cambridge (GB)

(73) Assignee: Apple Inc., Cupertino, CA (US)

(21) Appl. No.: 13/940,105

(22) Filed: Jul. 11, 2013

Related U.S. Patent Documents

Reissue of:
(64) Patent No.: 6,956,564
Issued: Oct. 18, 2005
Appl. No.: 09/171,921
PCT Filed: Oct. 8, 1998
PCT No.: PCT/GB98/03016
§ 371 (c)(1),
(2), (4) Date: Oct. 29, 1998
PCT Pub. No.: WO99/22338
PCT Pub. Date: May 6, 1999

U.S. Applications:
(62) Division of application No. 13/188,239, filed on Jul. 21, 2011, now Pat. No. Re. 44,855, which is a division of application No. 11/907,832, filed on Oct. 17, 2007, now Pat. No. Re. 42,738, which is an application for the reissue of Pat. No. 6,956,564.

(30) Foreign Application Priority Data

Oct. 28, 1997 (GB) ..... 9722766.4

(51) Int. Cl.
*G09G 5/00* (2006.01)
*H04M 19/00* (2006.01)

(52) U.S. Cl.
CPC ..... *H04M 19/00* (2013.01)

(58) Field of Classification Search
USPC ..... 455/566, 410, 411, 550.1, 418
See application file for complete search history.

(56) References Cited

U.S. PATENT DOCUMENTS 2,798,907 A 7/1957 Schneider
2,945,111 A 7/1960 McCormick (Continued)

FOREIGN PATENT DOCUMENTS

AU 2007283771 A1 4/2008
CN 1139235 A 1/1997

(Continued)

OTHER PUBLICATIONS

Hilary Lyndsay Williams, "Portable Computers", U.S. Appl. No. 12/255,557, filed Oct. 21, 2008.

(Continued)

*Primary Examiner* — Vladimir Magloire
(74) *Attorney, Agent, or Firm* — Novak Druce Connolly Bove + Quigg LLP

(57) ABSTRACT

A [portable computer] *hand held cellular telephone* arranged to rest comfortably in the hand has a small display screen. Accelerometers capable of detecting movement of the [pen] *cellular telephone* with respect to gravity provide input to a microcontroller which selects a response from a number of viewing modes. The [pen] *cellular telephone* may be held in either hand and the output message to the screen will be oriented according to the location of the [pen] *cellular telephone*. Full personal digital assistance functionality may be incorporated in a relatively small plastics casing and functions, such as calendar, [contracts] *contacts and* the like may be incorporated.

11 Claims, 10 Drawing Sheets

(56) References Cited

U.S. PATENT DOCUMENTS 3,005,055 A 10/1961 Mattke
3,382,588 A 5/1968 Serrell et al.
3,482,241 A 12/1969 Johnson
3,509,298 A 4/1970 Kirk
3,662,105 A 5/1972 Hurst et al.
3,696,409 A 10/1972 Braaten
3,706,867 A 12/1972 Rand et al.
3,721,956 A 3/1973 Hamann et al.
3,790,727 A 2/1974 Laserson et al.
3,798,370 A 3/1974 Hurst
3,825,730 A 7/1974 Worthington, Jr. et al.
3,846,826 A 11/1974 Mueller
3,873,770 A 3/1975 Ioannou
3,965,399 A 6/1976 Walker, Jr. et al.
3,988,616 A 10/1976 Shimada
4,014,000 A 3/1977 Uno et al.
4,070,649 A 1/1978 Wright, Jr. et al.
4,103,252 A 7/1978 Bobick
4,110,749 A 8/1978 Janko et al.
4,115,670 A 9/1978 Chandler
4,121,204 A 10/1978 Welch et al.
4,129,747 A 12/1978 Pepper, Jr.
4,146,876 A 3/1979 Arellano et al.
4,146,924 A 3/1979 Birk et al.
4,158,216 A 6/1979 Bigelow
4,170,916 A 10/1979 Fritz et al.
4,196,429 A 4/1980 Davis
4,241,409 A 12/1980 Nolf
4,242,676 A 12/1980 Piguet et al.
4,246,452 A 1/1981 Chandler
4,264,903 A 4/1981 Bigelow
4,290,052 A 9/1981 Eichelberger et al.
4,293,734 A 10/1981 Pepper, Jr.
4,305,071 A 12/1981 Bell et al.
4,305,131 A 12/1981 Best
4,311,891 A 1/1982 Faust
4,340,911 A 7/1982 Kato et al.
4,346,376 A 8/1982 Mallos
4,375,674 A 3/1983 Thornton
4,380,007 A 4/1983 Steinegger
4,380,040 A 4/1983 Posset
4,396,945 A 8/1983 DiMatteo et al.
4,435,835 A 3/1984 Sakow et al.
4,449,193 A 5/1984 Tournois
4,475,008 A 10/1984 Doi et al.
4,475,122 A 10/1984 Green
4,484,179 A 11/1984 Kasday
4,484,346 A 11/1984 Sternberg et al.
4,513,183 A 4/1985 Hill
4,526,043 A 7/1985 Boie et al.
4,542,375 A 9/1985 Alles et al.
4,550,221 A 10/1985 Mabusth
4,561,017 A 12/1985 Greene
4,562,429 A 12/1985 Conway et al.
4,564,952 A 1/1986 Karabinis
4,570,149 A 2/1986 Thornburg et al.
4,571,454 A 2/1986 Tamaru et al.
4,587,378 A 5/1986 Moore
4,595,990 A 6/1986 Garwin et al.
4,613,942 A 9/1986 Chen
4,618,989 A 10/1986 Tsukune et al.
4,628,160 A 12/1986 Canevari
4,629,319 A 12/1986 Clarke et al.
4,631,356 A 12/1986 Taguchi et al.
4,631,525 A 12/1986 Serravalle, Jr.
4,631,676 A 12/1986 Pugh
4,644,100 A 2/1987 Brenner et al.
4,654,872 A 3/1987 Hisano et al.
4,663,669 A 5/1987 Kinoshita et al.
4,669,054 A 5/1987 Schlunt et al.
4,677,913 A 7/1987 Farace
4,686,332 A 8/1987 Greanias et al.
4,686,374 A 8/1987 Liptay-Wagner et al.
4,698,461 A 10/1987 Meadows et al.
4,700,022 A 10/1987 Salvador et al.
4,710,760 A 12/1987 Kasday
4,719,524 A 1/1988 Morishima et al.
4,733,222 A 3/1988 Evans
4,734,034 A 3/1988 Maness et al.
4,736,191 A 4/1988 Matzke et al.
4,739,299 A 4/1988 Eventoff et al.
4,743,895 A 5/1988 Alexander
4,746,770 A 5/1988 McAvinney
4,752,655 A 6/1988 Tajiri et al.
4,755,811 A 7/1988 Slavin et al.
4,763,356 A 8/1988 Day, Jr. et al.
4,764,717 A 8/1988 Tucker et al.
4,780,764 A 10/1988 Kinoshita et al.
4,783,829 A 11/1988 Miyakawa et al.
4,787,040 A 11/1988 Ames et al.
4,787,712 A 11/1988 Ukai et al.
4,798,919 A 1/1989 Miessler et al.
4,806,709 A 2/1989 Evans
4,810,992 A 3/1989 Eventoff
4,831,359 A 5/1989 Newell
4,833,281 A 5/1989 Maples
4,839,634 A 6/1989 More et al.
4,843,568 A 6/1989 Krueger et al.
4,847,789 A 7/1989 Kelly et al.
4,849,852 A 7/1989 Mullins
4,856,993 A 8/1989 Maness et al.
4,866,602 A 9/1989 Hall
4,876,524 A 10/1989 Jenkins
4,897,511 A 1/1990 Itaya et al.
4,899,956 A 2/1990 King et al.
4,912,662 A 3/1990 Butler et al.
4,914,624 A 4/1990 Dunthorn
4,917,516 A 4/1990 Retter
4,922,061 A 5/1990 Meadows et al.
4,951,036 A 8/1990 Grueter et al.
4,954,967 A 9/1990 Takahashi
4,958,911 A 9/1990 Beiswenger et al.
4,969,180 A 11/1990 Watterson et al.
4,972,496 A 11/1990 Sklarew
4,975,830 A 12/1990 Gerpheide et al.
4,976,435 A 12/1990 Shatford et al.
4,988,981 A 1/1991 Zimmerman et al.
4,990,900 A 2/1991 Kikuchi
5,008,497 A 4/1991 Asher
5,023,438 A * 6/1991 Wakatsuki et al. ..... 235/462.46
5,036,321 A 7/1991 Leach et al.
5,043,736 A 8/1991 Darnell et al.
5,045,843 A 9/1991 Hansen
5,053,757 A 10/1991 Meadows
5,061,920 A 10/1991 Nelson
5,062,198 A 11/1991 Sun
5,063,526 A 11/1991 Kagawa et al.
5,072,294 A 12/1991 Engle
5,073,950 A 12/1991 Colbert et al.
5,083,118 A 1/1992 Kazama
5,105,186 A 4/1992 May
5,113,041 A 5/1992 Blonder et al.
5,117,071 A 5/1992 Greanias et al.
5,119,079 A 6/1992 Hube et al.
5,133,076 A 7/1992 Hawkins et al.
5,149,919 A 9/1992 Greanias et al.
5,153,829 A 10/1992 Furuya et al.
5,159,159 A 10/1992 Asher
5,168,531 A 12/1992 Sigel
5,179,648 A 1/1993 Hauck
5,186,629 A 2/1993 Rohen
5,189,404 A 2/1993 Masimo et al.
5,203,704 A 4/1993 McCloud
5,215,397 A * 6/1993 Taguchi et al. ..... 382/3
5,220,324 A 6/1993 Morita
5,227,929 A 7/1993 Comerford
5,227,985 A 7/1993 DeMenthon
5,231,326 A 7/1993 Echols
5,231,381 A 7/1993 Duwaer
5,233,547 A 8/1993 Kapp et al.
5,235,509 A 8/1993 Mueller et al.
5,237,311 A 8/1993 Mailey et al.
5,252,951 A 10/1993 Tannenbaum et al.
5,267,327 A 11/1993 Hirayama

(56) References Cited

U.S. PATENT DOCUMENTS 5,276,794 A 1/1994 Lamb, Jr.
5,278,362 A 1/1994 Ohashi
5,293,430 A 3/1994 Shiau et al.
5,297,030 A 3/1994 Vassigh et al.
5,301,222 A * 4/1994 Fujiwara ..... 379/58
5,305,017 A 4/1994 Gerpheide
5,313,027 A 5/1994 Inoue et al.
5,313,835 A 5/1994 Dunn
5,319,386 A 6/1994 Gunn et al.
5,327,161 A 7/1994 Logan et al.
5,329,289 A 7/1994 Sakamoto et al.
5,335,557 A 8/1994 Yasutake
5,339,213 A 8/1994 O'Callaghan
5,340,108 A 8/1994 Gerpheide et al.
5,341,133 A 8/1994 Savoy et al.
5,345,543 A 9/1994 Capps et al.
5,345,824 A 9/1994 Sherman et al.
5,349,303 A 9/1994 Gerpheide
5,357,266 A 10/1994 Tagawa
5,361,387 A 11/1994 Millar et al.
5,367,199 A 11/1994 Lefkowitz et al.
5,369,262 A 11/1994 Dvorkis et al.
5,374,787 A 12/1994 Miller et al.
5,383,091 A 1/1995 Snell
5,386,219 A 1/1995 Greanias et al.
5,394,096 A 2/1995 Meyer
5,396,265 A 3/1995 Ulrich et al.
5,398,310 A 3/1995 Tchao et al.
5,404,152 A 4/1995 Nagai
5,408,621 A 4/1995 Ben-Arie
5,410,329 A 4/1995 Tagawa et al.
5,412,189 A 5/1995 Cragun
5,414,445 A 5/1995 Kaneko et al.
5,416,498 A 5/1995 Grant
5,418,760 A 5/1995 Kawashima et al.
5,422,656 A 6/1995 Allard et al.
5,424,756 A 6/1995 Ho et al.
5,428,367 A 6/1995 Mikan
5,432,531 A 7/1995 Calder et al.
5,434,964 A 7/1995 Moss et al.
5,438,331 A 8/1995 Gilligan et al.
5,442,347 A 8/1995 Vranish
5,442,742 A 8/1995 Greyson et al.
D362,431 S 9/1995 Kaneko et al.
5,450,075 A 9/1995 Waddington
5,453,761 A 9/1995 Tanaka
5,459,793 A 10/1995 Naoi et al.
5,463,388 A 10/1995 Boie et al.
5,463,696 A 10/1995 Beernink et al.
5,463,725 A 10/1995 Henckel et al.
5,468,947 A 11/1995 Danielson et al.
5,473,343 A 12/1995 Kimmich et al.
5,473,344 A 12/1995 Bacon et al.
5,477,237 A 12/1995 Parks
5,479,192 A 12/1995 Carroll, Jr. et al.
5,479,528 A 12/1995 Speeter
5,483,261 A 1/1996 Yasutake
5,488,204 A 1/1996 Mead et al.
5,488,558 A 1/1996 Ohki
5,491,495 A 2/1996 Ward et al.
5,491,706 A 2/1996 Tagawa et al.
5,495,269 A 2/1996 Elrod et al.
5,495,566 A 2/1996 Kwatinetz
5,508,703 A 4/1996 Okamura et al.
5,511,148 A 4/1996 Wellner
5,513,309 A 4/1996 Meier et al.
RE35,269 E 6/1996 Comerford
5,523,775 A 6/1996 Capps
5,528,265 A 6/1996 Harrison
5,528,266 A 6/1996 Arbeitman et al.
5,528,267 A 6/1996 Ise
5,534,892 A 7/1996 Tagawa
5,534,893 A 7/1996 Hansen, Jr. et al.
5,537,608 A 7/1996 Beatty et al.
5,540,095 A 7/1996 Sherman et al.
5,543,588 A 8/1996 Bisset et al.
5,543,591 A 8/1996 Gillespie et al.
5,552,787 A 9/1996 Schuler et al.
5,559,301 A 9/1996 Bryan, Jr. et al.
5,559,943 A 9/1996 Cyr et al.
5,561,445 A 10/1996 Miwa et al.
5,563,996 A 10/1996 Tchao
5,565,658 A 10/1996 Gerpheide et al.
5,565,887 A 10/1996 McCambridge et al.
5,566,098 A 10/1996 Lucente et al.
5,570,109 A 10/1996 Jenson
5,572,239 A 11/1996 Jaeger
5,578,817 A 11/1996 Bidiville et al.
5,581,243 A 12/1996 Ouellette et al.
5,581,274 A 12/1996 Tagawa
5,581,670 A 12/1996 Bier et al.
5,581,681 A 12/1996 Tchao et al.
5,583,543 A 12/1996 Takahashi et al.
5,583,946 A 12/1996 Gourdol
5,585,823 A 12/1996 Duchon et al.
5,589,856 A 12/1996 Stein et al.
5,589,893 A 12/1996 Gaughan et al.
5,590,219 A 12/1996 Gourdol
5,592,197 A 1/1997 Tagawa
5,592,566 A 1/1997 Pagallo et al.
5,592,572 A 1/1997 Le
5,594,776 A 1/1997 Dent
5,594,806 A 1/1997 Colbert
5,594,810 A 1/1997 Gourdol
5,598,183 A 1/1997 Robertson et al.
5,602,566 A 2/1997 Motosyuku et al.
5,603,053 A 2/1997 Gough et al.
5,611,060 A 3/1997 Belfiore et al.
5,612,719 A 3/1997 Beernink et al.
5,613,137 A 3/1997 Bertram et al.
5,615,132 A 3/1997 Horton et al.
5,615,384 A 3/1997 Allard et al.
5,616,384 A 4/1997 Goettmann et al.
5,617,114 A 4/1997 Bier et al.
5,626,430 A 5/1997 Bistrack
5,627,531 A 5/1997 Posso et al.
5,632,679 A 5/1997 Tremmel
5,638,093 A 6/1997 Takahashi et al.
5,640,258 A 6/1997 Kurashima et al.
5,648,642 A 7/1997 Miller et al.
5,650,597 A 7/1997 Redmayne
5,652,569 A * 7/1997 Gerstenberger et al. ... 340/573.4
5,655,094 A 8/1997 Cline et al.
5,656,804 A 8/1997 Barkan et al.
5,657,012 A 8/1997 Tait
5,661,632 A 8/1997 Register
5,670,985 A 9/1997 Cappels, Sr. et al.
5,677,710 A 10/1997 Thompson-Rohrlich
5,686,940 A 11/1997 Kuga
5,689,285 A 11/1997 Asher
5,702,323 A 12/1997 Poulton
5,708,804 A 1/1998 Goodwin et al.
5,709,219 A 1/1998 Chen et al.
5,712,661 A 1/1998 Jaeger
5,715,524 A 2/1998 Jambhekar et al.
5,726,672 A 3/1998 Hernandez et al.
5,726,685 A 3/1998 Kuth et al.
5,726,687 A 3/1998 Belfiore et al.
5,729,219 A 3/1998 Armstrong et al.
5,729,249 A 3/1998 Yasutake
5,729,604 A 3/1998 Van Schyndel
5,734,371 A 3/1998 Kaplan
5,734,742 A 3/1998 Asaeda et al.
5,734,875 A 3/1998 Cheng
5,739,451 A 4/1998 Winksy et al.
5,745,116 A 4/1998 Pisutha-Arnond
5,748,185 A 5/1998 Stephan et al.
5,748,785 A 5/1998 Mantell et al.
5,749,908 A 5/1998 Snell
5,751,274 A 5/1998 Davis
5,753,983 A 5/1998 Dickie et al.
5,754,645 A * 5/1998 Metroka et al. ..... 379/58
5,754,890 A 5/1998 Holmdahl et al.
5,757,368 A 5/1998 Gerpheide et al.

(56) References Cited

U.S. PATENT DOCUMENTS 5,758,267 A 5/1998 Pinder et al.
5,764,218 A 6/1998 Della Bona et al.
5,767,457 A 6/1998 Gerpheide et al.
5,777,605 A 7/1998 Yoshinobu et al.
5,781,630 A 7/1998 Huber et al.
5,786,789 A 7/1998 Janky
5,789,716 A 8/1998 Wang
5,790,769 A 8/1998 Buxton et al.
5,793,310 A 8/1998 Watanabe et al.
5,794,164 A 8/1998 Beckert et al.
5,798,750 A 8/1998 Ozaki
5,798,756 A 8/1998 Yoshida et al.
5,805,144 A 9/1998 Scholder et al.
5,805,145 A 9/1998 Jaeger
5,805,161 A 9/1998 Tiphane
5,808,602 A 9/1998 Sellers
5,809,166 A 9/1998 Huang et al.
5,809,267 A 9/1998 Moran et al.
5,815,142 A 9/1998 Allard et al.
5,824,904 A 10/1998 Kouhei et al.
5,825,351 A 10/1998 Tam
5,825,352 A 10/1998 Bisset et al.
5,825,353 A 10/1998 Will
5,825,675 A 10/1998 Want et al.
5,828,364 A 10/1998 Siddiqui
5,835,061 A 11/1998 Stewart
5,835,079 A 11/1998 Shieh
5,835,083 A 11/1998 Nielsen et al.
5,835,732 A 11/1998 Kikinis et al.
5,838,302 A 11/1998 Kuriyama et al.
5,841,078 A 11/1998 Miller et al.
5,841,423 A 11/1998 Carroll, Jr. et al.
5,841,428 A 11/1998 Jaeger et al.
5,844,547 A 12/1998 Minakuchi et al.
5,847,280 A 12/1998 Sherman et al.
5,847,698 A 12/1998 Reavey et al.
5,848,373 A 12/1998 DeLorme
5,850,213 A 12/1998 Imai et al.
5,850,358 A 12/1998 Danielson et al.
5,856,822 A 1/1999 Du et al.
5,859,621 A 1/1999 Leisten
5,859,629 A 1/1999 Tognazzini
5,859,631 A 1/1999 Bergman et al.
5,861,875 A 1/1999 Gerpheide
5,867,149 A 2/1999 Jaeger
5,867,158 A 2/1999 Murasaki et al.
5,869,790 A 2/1999 Shigetaka et al.
5,869,791 A 2/1999 Young
5,871,251 A 2/1999 Welling et al.
5,874,941 A 2/1999 Yamada
5,874,942 A 2/1999 Walker
5,875,257 A 2/1999 Marrin et al.
5,875,311 A 2/1999 Bertram et al.
5,880,411 A 3/1999 Gillespie et al.
5,883,619 A 3/1999 Ho et al.
5,884,156 A 3/1999 Gordon
5,886,735 A 3/1999 Bullister
5,889,236 A 3/1999 Gillespie et al.
5,889,511 A 3/1999 Ong et al.
5,898,434 A 4/1999 Small et al.
5,900,863 A 5/1999 Numazaki
5,902,968 A * 5/1999 Sato et al. ..... 345/179
5,903,229 A 5/1999 Kishi
5,903,902 A 5/1999 Orr et al.
5,906,657 A 5/1999 Tognazzini
5,907,130 A 5/1999 Suzuki
5,907,152 A 5/1999 Dandliker et al.
5,907,318 A 5/1999 Medina
5,909,207 A 6/1999 Ho
5,909,211 A 6/1999 Combs et al.
5,910,797 A 6/1999 Beuk
5,910,800 A 6/1999 Shields et al.
5,910,882 A 6/1999 Burrell
5,914,706 A 6/1999 Kono
5,914,708 A 6/1999 LaGrange et al.
5,914,882 A 6/1999 Yeghiazarians
5,920,309 A 7/1999 Bisset et al.
5,923,319 A 7/1999 Bishop et al.
5,923,388 A 7/1999 Kurashima et al.
5,923,757 A 7/1999 Hocker et al.
5,923,861 A 7/1999 Bertram et al.
5,933,778 A 8/1999 Buhrmann et al.
5,936,613 A 8/1999 Jaeger et al.
5,942,733 A 8/1999 Allen et al.
5,943,043 A 8/1999 Furuhata et al.
5,943,044 A 8/1999 Martinelli et al.
5,943,052 A 8/1999 Allen et al.
5,945,980 A 8/1999 Moissev et al.
5,946,376 A 8/1999 Cistulli
5,949,345 A 9/1999 Beckert et al.
5,949,408 A 9/1999 Kang et al.
5,953,001 A * 9/1999 Challener et al. ..... 345/179
5,955,712 A 9/1999 Zakutin
5,956,019 A 9/1999 Bang et al.
5,956,020 A 9/1999 D'Amico et al.
5,956,626 A 9/1999 Kaschke et al.
5,959,611 A 9/1999 Smailagic et al.
5,966,680 A 10/1999 Butnaru
5,973,668 A 10/1999 Watanabe
5,973,915 A 10/1999 Evans
5,982,352 A 11/1999 Pryor
5,982,355 A 11/1999 Jaeger et al.
5,982,573 A 11/1999 Henze
5,986,634 A 11/1999 Alioshin et al.
5,991,085 A 11/1999 Rallison et al.
5,995,104 A 11/1999 Kataoka et al.
5,995,119 A 11/1999 Cosatto et al.
5,995,328 A 11/1999 Balakrishnan
5,996,080 A 11/1999 Silva et al.
6,002,389 A 12/1999 Kasser
6,002,808 A 12/1999 Freeman
6,002,963 A 12/1999 Mouchawar et al.
6,005,299 A 12/1999 Hengst
6,008,800 A 12/1999 Pryor
6,009,336 A 12/1999 Harris et al.
6,011,585 A 1/2000 Anderson
6,016,135 A * 1/2000 Biss et al. ..... 345/179
6,016,355 A 1/2000 Dickinson et al.
6,020,891 A 2/2000 Rekimoto
6,021,193 A 2/2000 Thomas
6,025,832 A 2/2000 Sudo et al.
6,028,271 A 2/2000 Gillespie et al.
6,028,602 A 2/2000 Weidenfeller et al.
6,029,214 A 2/2000 Dorfman et al.
6,031,518 A 2/2000 Adams et al.
6,031,600 A 2/2000 Winner et al.
6,034,672 A 3/2000 Gaultier et al.
6,034,688 A 3/2000 Greenwood et al.
6,037,882 A 3/2000 Levy
6,037,923 A 3/2000 Suzuki
6,037,937 A 3/2000 Beaton et al.
6,041,023 A 3/2000 Lakhansingh
6,044,299 A 3/2000 Nilsson
6,046,877 A 4/2000 Kelsic
6,057,540 A 5/2000 Gordon et al.
6,057,829 A 5/2000 Silfvast
6,061,063 A 5/2000 Wagner et al.
6,066,075 A 5/2000 Poulton
6,067,068 A 5/2000 Hussain
6,067,460 A 5/2000 Alanara et al.
6,072,494 A 6/2000 Nguyen
6,073,036 A 6/2000 Heikkinen et al.
6,075,520 A 6/2000 Inoue et al.
6,075,533 A 6/2000 Chang
6,083,353 A 7/2000 Alexander, Jr.
6,084,574 A 7/2000 Bidiville
6,084,594 A 7/2000 Goto
6,085,112 A 7/2000 Kleinschmidt et al.
6,091,030 A 7/2000 Tagawa et al.
6,091,956 A 7/2000 Hollenberg
6,097,372 A 8/2000 Suzuki
6,100,874 A 8/2000 Schena et al.
6,108,426 A 8/2000 Stortz
6,111,577 A 8/2000 Zilles et al.

(56) References Cited

U.S. PATENT DOCUMENTS 6,115,025 A 9/2000 Buxton et al.
6,115,620 A 9/2000 Colonna et al.
6,121,960 A 9/2000 Carroll et al.
6,122,526 A 9/2000 Parulski et al.
6,124,587 A 9/2000 Bidiville et al.
6,128,003 A 10/2000 Smith et al.
6,128,006 A 10/2000 Rosenberg et al.
6,128,045 A 10/2000 Anai
6,130,663 A 10/2000 Null
6,130,666 A * 10/2000 Persidsky ..... 345/179
6,137,427 A 10/2000 Binstead
6,137,468 A 10/2000 Martinez et al.
6,137,481 A 10/2000 Phillipps
6,141,014 A 10/2000 Endo et al.
6,141,018 A 10/2000 Beri et al.
6,144,380 A 11/2000 Shwarts et al.
6,147,680 A 11/2000 Tareev
6,148,261 A 11/2000 Obradovich et al.
6,157,935 A 12/2000 Tran et al.
6,163,312 A 12/2000 Furuya
6,166,721 A 12/2000 Kuroiwa et al.
6,169,538 B1 1/2001 Nowlan et al.
6,169,911 B1 1/2001 Wagner et al.
6,175,610 B1 1/2001 Peter
6,181,322 B1 1/2001 Nanavati
6,185,485 B1 2/2001 Ashrafi et al.
6,188,391 B1 2/2001 Seely et al.
6,188,392 B1 * 2/2001 O'Connor et al. ..... 345/179
6,188,393 B1 2/2001 Shu
6,191,774 B1 2/2001 Schena et al.
6,198,473 B1 3/2001 Armstrong
6,199,045 B1 3/2001 Giniger et al.
6,199,874 B1 3/2001 Galvin et al.
6,202,060 B1 3/2001 Tran
6,208,329 B1 3/2001 Ballare
6,219,035 B1 4/2001 Skog
6,219,038 B1 4/2001 Cho
6,222,465 B1 4/2001 Kumar et al.
6,222,528 B1 4/2001 Gerpheide et al.
6,225,976 B1 5/2001 Yates et al.
6,225,980 B1 5/2001 Weiss et al.
6,227,966 B1 5/2001 Yokoi
6,232,937 B1 5/2001 Jacobsen et al.
6,236,386 B1 5/2001 Watanabe
6,239,389 B1 5/2001 Allen et al.
6,239,788 B1 5/2001 Nohno et al.
6,243,074 B1 6/2001 Fishkin
6,243,075 B1 6/2001 Fishkin et al.
6,243,080 B1 6/2001 Molne
6,255,604 B1 7/2001 Tokioka et al.
6,256,011 B1 7/2001 Culver
6,256,020 B1 7/2001 Pabon et al.
6,259,405 B1 7/2001 Stewart et al.
6,262,717 B1 7/2001 Donohue et al.
6,266,050 B1 7/2001 Oh et al.
6,268,857 B1 7/2001 Fishkin et al.
6,278,441 B1 8/2001 Gouzman et al.
6,278,443 B1 8/2001 Amro et al.
6,278,884 B1 8/2001 Kim
6,297,795 B1 10/2001 Kato et al.
6,297,805 B1 10/2001 Adler et al.
6,297,811 B1 10/2001 Kent et al.
6,297,838 B1 10/2001 Chang et al.
6,300,933 B1 10/2001 Nagasaki et al.
6,308,134 B1 10/2001 Croyle et al.
6,310,610 B1 10/2001 Beaton et al.
6,310,666 B1 10/2001 Moon
6,311,162 B1 10/2001 Reichwein et al.
6,313,849 B1 11/2001 Takase et al.
6,313,853 B1 11/2001 Lamontagne et al.
6,323,845 B1 11/2001 Robbins
6,323,846 B1 11/2001 Westerman et al.
6,330,009 B1 12/2001 Murasaki et al.
6,330,149 B1 12/2001 Burrell
6,335,727 B1 1/2002 Morishita et al.
6,337,698 B1 1/2002 Keely, Jr. et al.
6,340,957 B1 1/2002 Adler et al.
6,347,290 B1 2/2002 Bartlett
6,373,612 B1 4/2002 Hoffman et al.
6,380,929 B1 4/2002 Platt
6,380,931 B1 4/2002 Gillespie et al.
6,393,401 B1 5/2002 Loudermilk et al.
6,400,359 B1 6/2002 Katabami
6,407,846 B1 6/2002 Myers et al.
6,414,671 B1 7/2002 Gillespie et al.
6,414,672 B2 7/2002 Rekimoto et al.
6,417,627 B1 7/2002 Derraa
6,421,042 B1 7/2002 Omura et al.
6,421,046 B1 7/2002 Edgren
6,429,846 B2 8/2002 Rosenberg et al.
6,429,852 B1 8/2002 Adams et al.
6,441,806 B1 8/2002 Jaeger
6,446,203 B1 9/2002 Aguilar et al.
6,452,514 B1 9/2002 Phillipp
6,459,424 B1 10/2002 Resman
6,466,203 B2 10/2002 Van Ee
6,473,069 B1 10/2002 Gerpheide
6,486,896 B1 11/2002 Ubillos
6,489,951 B1 12/2002 Wong et al.
6,492,979 B1 12/2002 Kent et al.
6,496,181 B1 12/2002 Bomer et al.
6,498,590 B1 12/2002 Dietz et al.
6,504,530 B1 1/2003 Wilson et al.
6,509,907 B1 1/2003 Kuwabara
6,538,635 B1 3/2003 Ringot
6,552,719 B2 4/2003 Lui et al.
6,559,869 B1 5/2003 Lui et al.
6,563,492 B1 5/2003 Furuya
6,567,068 B2 5/2003 Rekimoto
6,567,102 B2 5/2003 Kung
6,570,557 B1 5/2003 Westerman et al.
6,573,833 B1 6/2003 Rosenthal
6,573,883 B1 6/2003 Bartlett
6,597,347 B1 7/2003 Yasutake
6,597,817 B1 7/2003 Silverbrook
6,610,936 B2 8/2003 Gillespie et al.
6,624,824 B1 9/2003 Tognazzini et al.
6,639,586 B2 10/2003 Gerpheide
6,657,615 B2 12/2003 Harada
6,661,409 B2 12/2003 Demartines et al.
6,664,982 B1 12/2003 Bi
6,677,932 B1 1/2004 Westerman
6,677,965 B1 1/2004 Ullmann et al.
6,680,731 B2 1/2004 Gerpheide et al.
6,681,120 B1 1/2004 Kim
6,683,628 B1 1/2004 Nakagawa et al.
6,686,910 B2 2/2004 O'Donnell, Jr.
6,690,365 B2 2/2004 Hinckley et al.
6,690,387 B2 2/2004 Zimmerman et al.
RE38,471 E 3/2004 Howard et al.
6,707,449 B2 3/2004 Hinckley et al.
6,714,221 B1 3/2004 Christie et al.
6,720,949 B1 4/2004 Pryor et al.
6,727,891 B2 4/2004 Moriya et al.
6,730,863 B1 5/2004 Gerpheide et al.
6,734,845 B1 5/2004 Nielsen et al.
6,741,996 B1 5/2004 Brechner et al.
6,747,692 B2 6/2004 Patel et al.
6,750,848 B1 6/2004 Pryor
6,785,578 B2 8/2004 Johnson et al.
6,788,815 B2 9/2004 Lui et al.
6,791,530 B2 9/2004 Vernier et al.
6,809,724 B1 10/2004 Shiraishi
6,822,634 B1 11/2004 Kemp et al.
6,839,721 B2 1/2005 Schwols
6,847,354 B2 1/2005 Vranish
6,856,259 B1 2/2005 Sharp
6,873,312 B2 3/2005 Matsueda
6,873,313 B2 3/2005 Washio et al.
6,888,532 B2 5/2005 Wong et al.
6,888,536 B2 5/2005 Westerman et al.
6,891,531 B2 5/2005 Lin
6,903,927 B2 6/2005 Anlauff
6,907,575 B2 6/2005 Duarte

(56) References Cited

U.S. PATENT DOCUMENTS

| | | | |
|---|---|---|---|
| 6,912,462 | B2 | 6/2005 | Ogaki |
| 6,920,619 | B1 | 7/2005 | Milekic |
| 6,924,790 | B1 | 8/2005 | Bi |
| 6,931,309 | B2 | 8/2005 | Phelan et al. |
| 6,938,222 | B2 | 8/2005 | Hullender et al. |
| 6,956,564 | B1 | 10/2005 | Williams |
| 6,957,392 | B2 | 10/2005 | Simister et al. |
| 6,958,749 | B1 | 10/2005 | Matsushita et al. |
| RE38,896 | E | 11/2005 | Anderson |
| 6,970,160 | B2 | 11/2005 | Mulligan et al. |
| 6,972,749 | B2 | 12/2005 | Hinckley et al. |
| 6,972,776 | B2 | 12/2005 | Davis et al. |
| 6,975,306 | B2 | 12/2005 | Hinckley et al. |
| 6,999,779 | B1 | 2/2006 | Hashimoto |
| 7,002,821 | B2 | 2/2006 | Gerpheide |
| 7,009,599 | B2 | 3/2006 | Pihlaja |
| 7,009,626 | B2 | 3/2006 | Anwar |
| 7,015,894 | B2 | 3/2006 | Morohoshi |
| 7,030,860 | B1 | 4/2006 | Hsu et al. |
| 7,030,861 | B1 | 4/2006 | Westerman et al. |
| 7,030,862 | B2 | 4/2006 | Nozaki |
| 7,046,230 | B2 | 5/2006 | Zadesky et al. |
| 7,053,886 | B2 | 5/2006 | Shin |
| 7,061,474 | B2 | 6/2006 | Hinckley et al. |
| 7,075,512 | B1 | 7/2006 | Fabre et al. |
| 7,081,886 | B2 | 7/2006 | Nakano et al. |
| 7,084,859 | B1 | 8/2006 | Pryor |
| 7,088,346 | B2 | 8/2006 | Krajewski et al. |
| 7,088,374 | B2 | 8/2006 | David et al. |
| 7,098,897 | B2 | 8/2006 | Vakil et al. |
| 7,102,626 | B2 | 9/2006 | Denny, III |
| 7,109,978 | B2 | 9/2006 | Gillespie et al. |
| 7,117,453 | B2 | 10/2006 | Drucker et al. |
| 7,124,315 | B2 | 10/2006 | Espinoza-Ibarra et al. |
| 7,126,157 | B2 | 10/2006 | Okada et al. |
| 7,129,935 | B2 | 10/2006 | Mackey |
| 7,136,213 | B2 | 11/2006 | Chui |
| 7,138,971 | B2 | 11/2006 | Miyazaki |
| 7,138,983 | B2 | 11/2006 | Wakai et al. |
| 7,152,210 | B1 | 12/2006 | Van Den Hoven et al. |
| 7,154,481 | B2 | 12/2006 | Cross et al. |
| 7,154,534 | B2 | 12/2006 | Seki et al. |
| 7,155,048 | B2 | 12/2006 | Ohara |
| 7,158,121 | B2 | 1/2007 | Krajewski et al. |
| 7,169,996 | B2 | 1/2007 | Georges et al. |
| 7,173,623 | B2 | 2/2007 | Calkins et al. |
| 7,180,500 | B2 | 2/2007 | Marvit et al. |
| 7,181,373 | B2 | 2/2007 | Le Cocq et al. |
| 7,184,064 | B2 | 2/2007 | Zimmerman et al. |
| 7,184,796 | B2 | 2/2007 | Karidis et al. |
| 7,202,857 | B2 | 4/2007 | Hinckley et al. |
| 7,218,314 | B2 | 5/2007 | Itoh |
| 7,236,161 | B2 | 6/2007 | Geaghan et al. |
| 7,240,291 | B2 | 7/2007 | Card et al. |
| 7,242,136 | B2 | 7/2007 | Kim et al. |
| 7,254,775 | B2 | 8/2007 | Geaghan et al. |
| 7,256,767 | B2 | 8/2007 | Wong et al. |
| 7,274,353 | B2 | 9/2007 | Chiu et al. |
| 7,283,126 | B2 | 10/2007 | Leung |
| 7,292,229 | B2 | 11/2007 | Morag et al. |
| 7,304,621 | B2 | 12/2007 | Oomori et al. |
| 7,304,691 | B2 | 12/2007 | Song et al. |
| 7,337,412 | B2 | 2/2008 | Guido et al. |
| RE40,153 | E | 3/2008 | Westerman et al. |
| 7,339,580 | B2 | 3/2008 | Westerman et al. |
| 7,345,889 | B1 | 3/2008 | Norte |
| 7,346,850 | B2 | 3/2008 | Swartz et al. |
| 7,355,620 | B2 | 4/2008 | Ikehata et al. |
| 7,356,575 | B1 | 4/2008 | Shapiro |
| 7,362,313 | B2 | 4/2008 | Geaghan et al. |
| 7,362,396 | B2 | 4/2008 | Jeoung et al. |
| 7,372,455 | B2 | 5/2008 | Perski et al. |
| 7,382,139 | B2 | 6/2008 | Mackey |
| 7,385,544 | B2 | 6/2008 | Chia |
| 7,385,593 | B2 | 6/2008 | Krajewski et al. |
| 7,400,318 | B2 | 7/2008 | Gerpheide et al. |
| 7,411,575 | B2 | 8/2008 | Hill et al. |
| 7,420,376 | B2 | 9/2008 | Tola et al. |
| 7,439,962 | B2 | 10/2008 | Reynolds et al. |
| 7,446,783 | B2 | 11/2008 | Grossman |
| 7,450,113 | B2 | 11/2008 | Gillespie et al. |
| 7,450,114 | B2 | 11/2008 | Anwar |
| 7,459,723 | B2 | 12/2008 | Okada et al. |
| 7,469,381 | B2 | 12/2008 | Ording |
| 7,479,949 | B2 | 1/2009 | Jobs et al. |
| 7,499,036 | B2 | 3/2009 | Flowers |
| 7,508,375 | B2 | 3/2009 | Liu |
| 7,511,702 | B2 | 3/2009 | Hotelling |
| 7,532,205 | B2 | 5/2009 | Gillespie et al. |
| 7,561,159 | B2 | 7/2009 | Abel et al. |
| 7,567,240 | B2 | 7/2009 | Peterson, Jr. et al. |
| RE40,867 | E | 8/2009 | Binstead |
| 7,573,459 | B2 | 8/2009 | Shih et al. |
| 7,576,732 | B2 | 8/2009 | Lii |
| 7,598,949 | B2 | 10/2009 | Han |
| 7,612,786 | B2 | 11/2009 | Vale et al. |
| 7,614,019 | B2 | 11/2009 | Rimas Ribikauskas et al. |
| 7,639,238 | B2 | 12/2009 | Hauck |
| 7,658,675 | B2 | 2/2010 | Hotta |
| 7,663,607 | B2 | 2/2010 | Hotelling et al. |
| 7,667,884 | B2 | 2/2010 | Chui |
| 7,701,442 | B2 | 4/2010 | Wong et al. |
| 7,705,924 | B2 | 4/2010 | Kim |
| 7,710,407 | B2 | 5/2010 | Trent, Jr. et al. |
| 7,719,523 | B2 | 5/2010 | Hillis |
| 7,724,242 | B2 | 5/2010 | Hillis et al. |
| 7,728,821 | B2 | 6/2010 | Hillis et al. |
| 7,735,016 | B2 | 6/2010 | Celik et al. |
| 7,768,503 | B2 | 8/2010 | Chiu et al. |
| 7,786,975 | B2 | 8/2010 | Ording et al. |
| 7,796,104 | B2 | 9/2010 | Kim |
| 7,808,255 | B2 | 10/2010 | Hristov et al. |
| 7,812,826 | B2 | 10/2010 | Ording et al. |
| 7,812,827 | B2 | 10/2010 | Hotelling et al. |
| 7,821,502 | B2 | 10/2010 | Hristov |
| 7,825,885 | B2 | 11/2010 | Sato et al. |
| 7,825,905 | B2 | 11/2010 | Philipp |
| 7,839,391 | B2 | 11/2010 | Varian et al. |
| 7,843,429 | B2 | 11/2010 | Pryor |
| 7,844,913 | B2 | 11/2010 | Amano et al. |
| 7,844,915 | B2 | 11/2010 | Platzer et al. |
| 7,864,160 | B2 | 1/2011 | Geaghan et al. |
| 7,868,874 | B2 | 1/2011 | Reynolds |
| 7,872,640 | B2 | 1/2011 | Lira |
| 7,874,923 | B2 | 1/2011 | Mattice et al. |
| 7,907,124 | B2 | 3/2011 | Hillis et al. |
| 7,907,125 | B2 | 3/2011 | Weiss et al. |
| 7,920,129 | B2 | 4/2011 | Hotelling et al. |
| 7,924,271 | B2 | 4/2011 | Christie et al. |
| 7,932,898 | B2 | 4/2011 | Philipp et al. |
| 7,948,477 | B2 | 5/2011 | Hotelling |
| 7,956,847 | B2 | 6/2011 | Christie |
| 7,995,030 | B2 | 8/2011 | Joung et al. |
| RE42,738 | E | 9/2011 | Williams |
| 8,031,180 | B2 | 10/2011 | Miyamoto et al. |
| RE44,103 | E | 3/2013 | Williams |
| 1,061,578 | A1 | 5/2013 | Wischhusen et al. |
| 2001/0035880 | A1 | 11/2001 | Musatov et al. |
| 2001/0045949 | A1 | 11/2001 | Chithambaram et al. |
| 2002/0015024 | A1 | 2/2002 | Westerman et al. |
| 2002/0015064 | A1 | 2/2002 | Robotham et al. |
| 2002/0018051 | A1 | 2/2002 | Singh |
| 2002/0036618 | A1 | 3/2002 | Wakai et al. |
| 2002/0056575 | A1 | 5/2002 | Keely et al. |
| 2002/0067346 | A1 | 6/2002 | Mouton |
| 2002/0130839 | A1 | 9/2002 | Wallace et al. |
| 2002/0152045 | A1 | 10/2002 | Dowling et al. |
| 2002/0158838 | A1 | 10/2002 | Smith et al. |
| 2002/0186210 | A1 | 12/2002 | Itoh |
| 2002/0191029 | A1 | 12/2002 | Gillespie et al. |
| 2002/0194589 | A1 | 12/2002 | Cristofalo et al. |
| 2003/0016252 | A1 | 1/2003 | Noy et al. |
| 2003/0076306 | A1 | 4/2003 | Zadesky et al. |
| 2003/0076343 | A1 | 4/2003 | Fishkin et al. |

(56) References Cited

U.S. PATENT DOCUMENTS

| | | | |
|---|---|---|---|
| 2003/0085870 | A1 | 5/2003 | Hinckley |
| 2003/0095096 | A1 | 5/2003 | Robbin et al. |
| 2003/0095135 | A1 | 5/2003 | Kaasila et al. |
| 2003/0095697 | A1 | 5/2003 | Wood et al. |
| 2003/0098858 | A1 | 5/2003 | Perski et al. |
| 2003/0122787 | A1 | 7/2003 | Zimmerman et al. |
| 2003/0132959 | A1 | 7/2003 | Simister et al. |
| 2003/0159567 | A1 | 8/2003 | Subotnick |
| 2003/0160832 | A1 | 8/2003 | Ridgley et al. |
| 2003/0167119 | A1 | 9/2003 | Cherveny |
| 2003/0174149 | A1 | 9/2003 | Fujisaki et al. |
| 2003/0184525 | A1 | 10/2003 | Tsai |
| 2003/0184593 | A1 | 10/2003 | Dunlop |
| 2003/0193481 | A1 | 10/2003 | Sokolsky |
| 2003/0210286 | A1 | 11/2003 | Gerpheide et al. |
| 2003/0231168 | A1 | 12/2003 | Bell et al. |
| 2004/0012572 | A1 | 1/2004 | Sowden et al. |
| 2004/0021676 | A1 | 2/2004 | Chen et al. |
| 2004/0021694 | A1 | 2/2004 | Doar |
| 2004/0021698 | A1 | 2/2004 | Baldwin et al. |
| 2004/0027398 | A1 | 2/2004 | Jaeger |
| 2004/0034801 | A1 | 2/2004 | Jaeger |
| 2004/0056837 | A1 | 3/2004 | Koga et al. |
| 2004/0080541 | A1 | 4/2004 | Saiga et al. |
| 2004/0100479 | A1 | 5/2004 | Nakano et al. |
| 2004/0108995 | A1 | 6/2004 | Hoshino et al. |
| 2004/0119700 | A1 | 6/2004 | Ichikawa |
| 2004/0155871 | A1 | 8/2004 | Perski et al. |
| 2004/0155888 | A1 | 8/2004 | Padgitt et al. |
| 2004/0160420 | A1 | 8/2004 | Baharav et al. |
| 2004/0161132 | A1 | 8/2004 | Cohen et al. |
| 2004/0167919 | A1 | 8/2004 | Sterling et al. |
| 2004/0189720 | A1 | 9/2004 | Wilson et al. |
| 2004/0196270 | A1 | 10/2004 | Chiu et al. |
| 2004/0215643 | A1 | 10/2004 | Brechner et al. |
| 2004/0224638 | A1 | 11/2004 | Fadell et al. |
| 2004/0263486 | A1 | 12/2004 | Seni |
| 2005/0012723 | A1 | 1/2005 | Pallakoff |
| 2005/0014364 | A1 | 1/2005 | Chen et al. |
| 2005/0024341 | A1 | 2/2005 | Gillespie et al. |
| 2005/0030255 | A1 | 2/2005 | Chiu et al. |
| 2005/0041385 | A1 | 2/2005 | Kikinis et al. |
| 2005/0046621 | A1 | 3/2005 | Kaikuranta |
| 2005/0052427 | A1 | 3/2005 | Wu et al. |
| 2005/0057524 | A1 | 3/2005 | Hill et al. |
| 2005/0073324 | A1 | 4/2005 | Umeda et al. |
| 2005/0088418 | A1 | 4/2005 | Nguyen |
| 2005/0088443 | A1 | 4/2005 | Blanco et al. |
| 2005/0093868 | A1 | 5/2005 | Hinckley |
| 2005/0110769 | A1 | 5/2005 | DaCosta et al. |
| 2005/0114788 | A1 | 5/2005 | Fabritius |
| 2005/0145807 | A1 | 7/2005 | Lapstun et al. |
| 2005/0168353 | A1 | 8/2005 | Dement et al. |
| 2005/0168488 | A1 | 8/2005 | Montague |
| 2005/0190144 | A1 | 9/2005 | Kong |
| 2005/0193015 | A1 | 9/2005 | Logston et al. |
| 2005/0193351 | A1 | 9/2005 | Huoviala |
| 2005/0195154 | A1 | 9/2005 | Robbins et al. |
| 2005/0198588 | A1 | 9/2005 | Lin et al. |
| 2005/0212754 | A1 | 9/2005 | Marvit et al. |
| 2005/0237308 | A1 | 10/2005 | Autio et al. |
| 2005/0270269 | A1 | 12/2005 | Tokkonen |
| 2005/0270273 | A1 | 12/2005 | Marten |
| 2005/0275618 | A1 | 12/2005 | Juh et al. |
| 2006/0001650 | A1 | 1/2006 | Robbins et al. |
| 2006/0001652 | A1 | 1/2006 | Chiu et al. |
| 2006/0007174 | A1 | 1/2006 | Shen |
| 2006/0007176 | A1 | 1/2006 | Shen |
| 2006/0007178 | A1 | 1/2006 | Davis |
| 2006/0012575 | A1 | 1/2006 | Knapp et al. |
| 2006/0022955 | A1 | 2/2006 | Kennedy |
| 2006/0022956 | A1 | 2/2006 | Lengeling et al. |
| 2006/0025218 | A1 | 2/2006 | Hotta |
| 2006/0026521 | A1 | 2/2006 | Hotelling et al. |
| 2006/0028428 | A1 | 2/2006 | Dai et al. |
| 2006/0031786 | A1 | 2/2006 | Hillis et al. |
| 2006/0033751 | A1 | 2/2006 | Keely et al. |
| 2006/0038796 | A1 | 2/2006 | Hinckley et al. |
| 2006/0044259 | A1 | 3/2006 | Hotelling et al. |
| 2006/0047386 | A1 | 3/2006 | Kanevsky et al. |
| 2006/0048073 | A1 | 3/2006 | Jarrett et al. |
| 2006/0049920 | A1 | 3/2006 | Sadler et al. |
| 2006/0055662 | A1 | 3/2006 | Rimas-Ribikauskas et al. |
| 2006/0055669 | A1 | 3/2006 | Das |
| 2006/0061551 | A1 | 3/2006 | Fateh |
| 2006/0077544 | A1 | 4/2006 | Stark |
| 2006/0082549 | A1 | 4/2006 | Hoshino et al. |
| 2006/0084852 | A1 | 4/2006 | Mason et al. |
| 2006/0092142 | A1 | 5/2006 | Gillespie et al. |
| 2006/0094502 | A1 | 5/2006 | Katayama et al. |
| 2006/0097991 | A1 | 5/2006 | Hotelling et al. |
| 2006/0101354 | A1 | 5/2006 | Hashimoto et al. |
| 2006/0125799 | A1 | 6/2006 | Hillis et al. |
| 2006/0132460 | A1 | 6/2006 | Kolmykov-Zotov et al. |
| 2006/0156249 | A1 | 7/2006 | Blythe et al. |
| 2006/0164399 | A1 | 7/2006 | Cheston et al. |
| 2006/0181510 | A1 | 8/2006 | Faith |
| 2006/0181519 | A1 | 8/2006 | Vernier et al. |
| 2006/0187215 | A1 | 8/2006 | Rosenberg et al. |
| 2006/0190833 | A1 | 8/2006 | SanGiovanni et al. |
| 2006/0197753 | A1 | 9/2006 | Hotelling |
| 2006/0202953 | A1 | 9/2006 | Pryor et al. |
| 2006/0207806 | A1 | 9/2006 | Philipp |
| 2006/0210958 | A1 | 9/2006 | Rimas-Ribikauskas et al. |
| 2006/0227114 | A1 | 10/2006 | Geaghan et al. |
| 2006/0227116 | A1 | 10/2006 | Zotov et al. |
| 2006/0236263 | A1 | 10/2006 | Bathiche et al. |
| 2006/0238495 | A1 | 10/2006 | Davis |
| 2006/0250377 | A1 | 11/2006 | Zadesky et al. |
| 2006/0253793 | A1 | 11/2006 | Zhai et al. |
| 2006/0267959 | A1 | 11/2006 | Goto et al. |
| 2006/0274046 | A1 | 12/2006 | Hillis et al. |
| 2006/0274055 | A1 | 12/2006 | Reynolds et al. |
| 2006/0288313 | A1 | 12/2006 | Hillis |
| 2006/0294472 | A1 | 12/2006 | Cheng et al. |
| 2007/0008066 | A1 | 1/2007 | Fukuda |
| 2007/0024646 | A1 | 2/2007 | Saarinen et al. |
| 2007/0028191 | A1 | 2/2007 | Tsuji |
| 2007/0034423 | A1 | 2/2007 | Rebeschi et al. |
| 2007/0035513 | A1 | 2/2007 | Sherrard et al. |
| 2007/0046646 | A1 | 3/2007 | Kwon et al. |
| 2007/0055967 | A1 | 3/2007 | Poff et al. |
| 2007/0064004 | A1 | 3/2007 | Bonner et al. |
| 2007/0067745 | A1 | 3/2007 | Choi et al. |
| 2007/0075965 | A1 | 4/2007 | Huppi et al. |
| 2007/0109275 | A1 | 5/2007 | Chuang |
| 2007/0109279 | A1 | 5/2007 | Sigona |
| 2007/0120835 | A1 | 5/2007 | Sato |
| 2007/0132789 | A1 | 6/2007 | Ording et al. |
| 2007/0146337 | A1 | 6/2007 | Ording et al. |
| 2007/0150826 | A1 | 6/2007 | Anzures et al. |
| 2007/0150842 | A1 | 6/2007 | Chaudhri et al. |
| 2007/0152978 | A1 | 7/2007 | Kocienda et al. |
| 2007/0152979 | A1 | 7/2007 | Jobs et al. |
| 2007/0152984 | A1 | 7/2007 | Ording et al. |
| 2007/0155434 | A1 | 7/2007 | Jobs et al. |
| 2007/0156364 | A1 | 7/2007 | Rothkopf |
| 2007/0157094 | A1 | 7/2007 | Lemay et al. |
| 2007/0174257 | A1 | 7/2007 | Howard |
| 2007/0185876 | A1 | 8/2007 | Mendis et al. |
| 2007/0236475 | A1 | 10/2007 | Wherry |
| 2007/0247435 | A1 | 10/2007 | Benko et al. |
| 2007/0252821 | A1 | 11/2007 | Hollemans et al. |
| 2007/0256026 | A1 | 11/2007 | Klassen et al. |
| 2007/0257891 | A1 | 11/2007 | Esenther et al. |
| 2007/0262964 | A1 | 11/2007 | Zotov et al. |
| 2007/0273560 | A1 | 11/2007 | Hua et al. |
| 2008/0005703 | A1 | 1/2008 | Radivojevic et al. |
| 2008/0006454 | A1 | 1/2008 | Hotelling |
| 2008/0016096 | A1 | 1/2008 | Wilding et al. |
| 2008/0034029 | A1 | 2/2008 | Fang et al. |
| 2008/0046425 | A1 | 2/2008 | Perski |
| 2008/0048978 | A1 | 2/2008 | Trent et al. |
| 2008/0052945 | A1 | 3/2008 | Matas et al. |

(56) References Cited

U.S. PATENT DOCUMENTS

| | | | |
|---|---|---|---|
| 2008/0062207 | A1 | 3/2008 | Park |
| 2008/0084400 | A1 | 4/2008 | Rosenberg |
| 2008/0088595 | A1 | 4/2008 | Liu et al. |
| 2008/0088602 | A1 | 4/2008 | Hotelling |
| 2008/0094369 | A1 | 4/2008 | Ganatra et al. |
| 2008/0094370 | A1 | 4/2008 | Ording et al. |
| 2008/0104544 | A1 | 5/2008 | Collins et al. |
| 2008/0138589 | A1 | 6/2008 | Wakabayashi et al. |
| 2008/0143683 | A1 | 6/2008 | Hotelling |
| 2008/0158167 | A1 | 7/2008 | Hotelling et al. |
| 2008/0158198 | A1 | 7/2008 | Elias |
| 2008/0168395 | A1 | 7/2008 | Ording et al. |
| 2008/0168404 | A1 | 7/2008 | Ording |
| 2008/0180404 | A1 | 7/2008 | Han et al. |
| 2008/0204426 | A1 | 8/2008 | Hotelling et al. |
| 2008/0231603 | A1 | 9/2008 | Parkinson et al. |
| 2008/0231610 | A1 | 9/2008 | Hotelling et al. |
| 2008/0284925 | A1 | 11/2008 | Han |
| 2008/0288856 | A1 | 11/2008 | Goranson et al. |
| 2009/0244020 | A1 | 10/2009 | Sjolin |
| 2009/0259969 | A1 | 10/2009 | Pallakoff |
| 2009/0284478 | A1 | 11/2009 | De La Torre Baltierra et al. |
| 2009/0307623 | A1 | 12/2009 | Agarawala et al. |
| 2010/0097346 | A1 | 4/2010 | Sleeman |
| 2010/0172624 | A1 | 7/2010 | Watts |
| 2011/0022991 | A1 | 1/2011 | Hillis et al. |
| 2011/0025912 | A1 | 2/2011 | Regler |

FOREIGN PATENT DOCUMENTS

| | | | |
|---|---|---|---|
| CN | 1455615 | A | 11/2003 |
| CN | 1139235 | C | 2/2004 |
| CN | 1695105 | A | 11/2005 |
| CN | 17541 | | 3/2006 |
| DE | 3615742 | A1 | 11/1987 |
| DE | 4434773 | A1 | 4/1996 |
| DE | 4445023 | A1 | 6/1996 |
| DE | 19722636 | A1 | 12/1998 |
| DE | 10022537 | A1 | 11/2000 |
| DE | 102008052485 | A1 | 4/2010 |
| EP | 0156593 | A2 | 10/1985 |
| EP | 0178157 | | 4/1986 |
| EP | 0178157 | B1 | 4/1986 |
| EP | 0269364 | A2 | 6/1988 |
| EP | 0439340 | B1 | 7/1991 |
| EP | 0450196 | A1 | 10/1991 |
| EP | 0498540 | B1 | 1/1992 |
| EP | 0498540 | A2 | 8/1992 |
| EP | 0507269 | B1 | 10/1992 |
| EP | 0609021 | A2 | 8/1994 |
| EP | 0615209 | B1 | 9/1994 |
| EP | 0622722 | A2 | 11/1994 |
| EP | 0658894 | | 6/1995 |
| EP | 0658894 | A1 | 6/1995 |
| EP | 0658894 | B1 | 6/1995 |
| EP | 0674288 | A1 | 9/1995 |
| EP | 0701220 | | 3/1996 |
| EP | 0731407 | A1 | 9/1996 |
| EP | 0731407 | B1 | 9/1996 |
| EP | 0551778 | B1 | 1/1997 |
| EP | 0757437 | A2 | 2/1997 |
| EP | 0757437 | B1 | 2/1997 |
| EP | 0827064 | A2 | 3/1998 |
| EP | 0827094 | A2 | 3/1998 |
| EP | 0880091 | A2 | 11/1998 |
| EP | 0917077 | A2 | 5/1999 |
| EP | 0944218 | A1 | 9/1999 |
| EP | 0982732 | A1 | 3/2000 |
| EP | 1026713 | A1 | 8/2000 |
| EP | 1026713 | B1 | 8/2000 |
| EP | 1028425 | A2 | 8/2000 |
| EP | 0880091 | B1 | 12/2004 |
| EP | 1507228 | A1 | 2/2005 |
| EP | 1517228 | A2 | 3/2005 |
| FR | 2662528 | A1 | 11/1991 |
| FR | 2686440 | A1 | 7/1993 |
| GB | 2072389 | | 9/1981 |
| GB | 2072389 | A | 9/1981 |
| GB | 2315186 | A | 1/1998 |
| GB | 2315186 | B | 1/1998 |
| GB | 2319591 | A | 5/1998 |
| GB | 2347200 | A | 8/2000 |
| GB | 2351215 | A | 12/2000 |
| GB | 2448319 | A | 10/2008 |
| JP | 50-127328 | | 10/1975 |
| JP | 51-022325 | | 2/1976 |
| JP | 57-175228 | | 10/1982 |
| JP | 59-087583 | | 5/1984 |
| JP | 60-123927 | | 7/1985 |
| JP | 61-028122 | | 2/1986 |
| JP | 61117619 | A2 | 6/1986 |
| JP | 61124009 | A2 | 6/1986 |
| JP | 63106826 | A2 | 5/1988 |
| JP | 63181022 | A2 | 7/1988 |
| JP | 63298518 | A2 | 12/1988 |
| JP | 1-142818 | | 6/1989 |
| JP | 2-40614 | | 2/1990 |
| JP | 2-140822 | | 5/1990 |
| JP | 2-144716 | | 6/1990 |
| JP | 3-271976 | B2 | 12/1991 |
| JP | 4-32920 | A | 2/1992 |
| JP | 04032920 | A | 2/1992 |
| JP | 4-128330 | B2 | 4/1992 |
| JP | 5-41135 | A | 2/1993 |
| JP | 05041135 | A2 | 2/1993 |
| JP | 5-80938 | A | 4/1993 |
| JP | 5-101741 | A | 4/1993 |
| JP | 05080938 | A2 | 4/1993 |
| JP | 05101741 | A2 | 4/1993 |
| JP | 5-189110 | A | 7/1993 |
| JP | 05189110 | A2 | 7/1993 |
| JP | 5-205565 | A | 8/1993 |
| JP | 5-211021 | A | 8/1993 |
| JP | 5-217464 | A | 8/1993 |
| JP | 05205565 | A2 | 8/1993 |
| JP | 05211021 | A2 | 8/1993 |
| JP | 05217464 | A2 | 8/1993 |
| JP | 5-233141 | A | 9/1993 |
| JP | 05233141 | A | 9/1993 |
| JP | 5-265656 | A | 10/1993 |
| JP | 5-274956 | A | 10/1993 |
| JP | 05265656 | A2 | 10/1993 |
| JP | 05274956 | A2 | 10/1993 |
| JP | 5-289811 | A | 11/1993 |
| JP | 5-298955 | A | 11/1993 |
| JP | 05289811 | A | 11/1993 |
| JP | 05298955 | A2 | 11/1993 |
| JP | 5-325723 | A | 12/1993 |
| JP | 05325723 | A2 | 12/1993 |
| JP | 6-089636 | A | 3/1994 |
| JP | 06089636 | A2 | 3/1994 |
| JP | 6-096639 | A | 4/1994 |
| JP | 6-111685 | A | 4/1994 |
| JP | 6-111695 | A | 4/1994 |
| JP | 06096639 | A2 | 4/1994 |
| JP | 06111685 | A2 | 4/1994 |
| JP | 06111695 | A2 | 4/1994 |
| JP | 6-139879 | A | 5/1994 |
| JP | 06139879 | A2 | 5/1994 |
| JP | 6-6161661 | | 6/1994 |
| JP | 6-187078 | A | 7/1994 |
| JP | 6-208433 | A | 7/1994 |
| JP | 06187078 | A | 7/1994 |
| JP | 06208433 | A | 7/1994 |
| JP | 6-267382 | A | 9/1994 |
| JP | 06267382 | A2 | 9/1994 |
| JP | 6-283993 | A | 10/1994 |
| JP | 06283993 | A2 | 10/1994 |
| JP | 6-333459 | A | 12/1994 |
| JP | 06333459 | A2 | 12/1994 |
| JP | 7-107574 | A | 4/1995 |
| JP | 07107574 | A2 | 4/1995 |
| JP | 7-201249 | A | 8/1995 |

(56) References Cited

FOREIGN PATENT DOCUMENTS

| | | | |
|---|---|---|---|
| JP | 7-201256 | A | 8/1995 |
| JP | 7-230352 | | 8/1995 |
| JP | 07201249 | A2 | 8/1995 |
| JP | 07201256 | A | 8/1995 |
| JP | 7-253838 | A | 10/1995 |
| JP | 7-261922 | A | 10/1995 |
| JP | 07253838 | A2 | 10/1995 |
| JP | 7261899 | A | 10/1995 |
| JP | 07261899 | A2 | 10/1995 |
| JP | 07261922 | A2 | 10/1995 |
| JP | 7287689 | | 10/1995 |
| JP | 7-296670 | A | 11/1995 |
| JP | 07296670 | A | 11/1995 |
| JP | 7-319001 | A | 12/1995 |
| JP | 07319001 | A2 | 12/1995 |
| JP | 8-016292 | A | 1/1996 |
| JP | 08016292 | A2 | 1/1996 |
| JP | 8-115158 | A | 5/1996 |
| JP | 08115158 | A2 | 5/1996 |
| JP | 8-203387 | A | 8/1996 |
| JP | 08203387 | A2 | 8/1996 |
| JP | 8-293226 | A | 11/1996 |
| JP | 8-298045 | A | 11/1996 |
| JP | 8-299541 | A | 11/1996 |
| JP | 8-316664 | A | 11/1996 |
| JP | 08293226 | A2 | 11/1996 |
| JP | 08298045 | A2 | 11/1996 |
| JP | 08299541 | A2 | 11/1996 |
| JP | 08316664 | A2 | 11/1996 |
| JP | 9-044289 | A | 2/1997 |
| JP | 09044289 | A2 | 2/1997 |
| JP | 9-069023 | A | 3/1997 |
| JP | 09069023 | A2 | 3/1997 |
| JP | 9-128148 | A | 5/1997 |
| JP | 09128148 | A2 | 5/1997 |
| JP | 9-218747 | A | 8/1997 |
| JP | 09218747 | A2 | 8/1997 |
| JP | 9-230993 | A | 9/1997 |
| JP | 9-231858 | A | 9/1997 |
| JP | 9-251347 | A | 9/1997 |
| JP | 09230993 | A2 | 9/1997 |
| JP | 09231858 | A2 | 9/1997 |
| JP | 09251347 | A2 | 9/1997 |
| JP | 09288926 | | 11/1997 |
| JP | 09288926 | A2 | 11/1997 |
| JP | 10-074429 | | 3/1998 |
| JP | 10-074429 | A | 3/1998 |
| JP | 10074429 | A2 | 3/1998 |
| JP | 10-198507 | A | 7/1998 |
| JP | 63-167923 | | 7/1998 |
| JP | 10198507 | A2 | 7/1998 |
| JP | 10-227878 | A | 8/1998 |
| JP | 10227878 | A2 | 8/1998 |
| JP | 10-326149 | A | 12/1998 |
| JP | 10326149 | A2 | 12/1998 |
| JP | 11-505641 | | 5/1999 |
| JP | 11-184607 | A | 7/1999 |
| JP | 11-194863 | A | 7/1999 |
| JP | 11-194872 | A | 7/1999 |
| JP | 11-194882 | A | 7/1999 |
| JP | 11-194883 | A | 7/1999 |
| JP | 11-194891 | | 7/1999 |
| JP | 11-195353 | A | 7/1999 |
| JP | 11-203045 | A | 7/1999 |
| JP | 11184607 | A2 | 7/1999 |
| JP | 11194863 | A2 | 7/1999 |
| JP | 11194872 | A2 | 7/1999 |
| JP | 11194882 | A2 | 7/1999 |
| JP | 11194883 | A2 | 7/1999 |
| JP | 11194891 | A2 | 7/1999 |
| JP | 11195353 | A2 | 7/1999 |
| JP | 11203045 | A2 | 7/1999 |
| JP | 2000-137555 | A | 5/2000 |
| JP | 2000-163031 | | 6/2000 |
| JP | 2000-163193 | A | 6/2000 |
| JP | 2000-163443 | A | 6/2000 |
| JP | 2000-163444 | A | 6/2000 |
| JP | 2000-222130 | A | 8/2000 |
| JP | 2001-137564 | A | 5/2001 |
| JP | 3-194819 | B2 | 8/2001 |
| JP | 2002-342033 | A | 11/2002 |
| JP | 2005-44036 | | 2/2005 |
| JP | 2005-234291 | | 9/2005 |
| JP | 2009-544996 | A | 12/2009 |
| JP | 4542637 | | 9/2010 |
| KR | 2002-0095992 | A | 12/2002 |
| KR | 2004-0071767 | | 8/2004 |
| KR | 2007-0064869 | A | 6/2007 |
| WO | WO-91/03039 | A1 | 3/1991 |
| WO | WO-93/14589 | A1 | 7/1993 |
| WO | WO 94/17494 | | 8/1994 |
| WO | WO-94/17494 | A2 | 8/1994 |
| WO | WO-94/29788 | | 12/1994 |
| WO | WO 95/00897 | | 1/1995 |
| WO | WO-95/00897 | A1 | 1/1995 |
| WO | 95/04327 | | 2/1995 |
| WO | WO 95/04327 | | 9/1995 |
| WO | WO 95/27334 | | 10/1995 |
| WO | WO-96/07966 | | 3/1996 |
| WO | WO-96/18179 | | 6/1996 |
| WO | 96/35288 | | 11/1996 |
| WO | WO-98/06054 | | 2/1998 |
| WO | WO-98/07112 | A2 | 2/1998 |
| WO | WO 98/14863 | | 4/1998 |
| WO | WO-98/14863 | A2 | 4/1998 |
| WO | WO-98/30967 | | 7/1998 |
| WO | 99/22338 | | 5/1999 |
| WO | WO-99/22338 | A1 | 5/1999 |
| WO | WO-99/28812 | A1 | 6/1999 |
| WO | WO 99/38149 | | 7/1999 |
| WO | WO-99/38149 | A1 | 7/1999 |
| WO | WO-99/40562 | | 8/1999 |
| WO | WO 99/49443 | | 9/1999 |
| WO | WO-99/49443 | A2 | 9/1999 |
| WO | WO-99/57630 | A1 | 11/1999 |
| WO | WO-00/44018 | | 7/2000 |
| WO | WO-01/29702 | | 4/2001 |
| WO | WO-02/01338 | | 1/2002 |
| WO | WO-03/054681 | A1 | 7/2003 |
| WO | WO-03/060622 | | 7/2003 |
| WO | WO-03/081458 | | 10/2003 |
| WO | 2005/052773 | | 6/2005 |
| WO | WO-2006/003591 | | 6/2005 |
| WO | WO-2005/073834 | | 8/2005 |
| WO | WO-2005/114369 | | 12/2005 |
| WO | WO-2006/020305 | | 2/2006 |
| WO | WO-2006/067711 | A2 | 6/2006 |
| WO | WO-2008/030563 | A2 | 3/2008 |
| WO | WO-2008/085848 | A1 | 7/2008 |
| WO | WO-2008/085871 | A1 | 7/2008 |
| WO | WO-2008/085877 | A1 | 7/2008 |
| WO | WO-2008/086218 | | 7/2008 |
| WO | WO-2010/026106 | | 3/2010 |
| WO | WO-2010/041826 | | 4/2010 |
| WO | WO-2010/134729 | | 11/2010 |
| WO | WO-2011/045805 | | 4/2011 |

OTHER PUBLICATIONS

Hilary Lyndsay Williams, "Portable Computers", U.S. Appl. No. 12/268,336, filed Nov. 10, 2008.

Hilary Lyndsay Williams, "Portable Computers", U.S. Appl. No. 12/268,254, filed Nov. 10, 2008.

Ed Brown, William A.S. Buxton and Kevin Murtagh, "Windows on Tablets as a Means of Achieving Virtual Input Devices," Proc. of the IFIP TC 13, Cambridge, U.K., Aug. 27-31,1990.

"Technology," Wacom Co., Ltd., Saitama, Japan, 2002.

Subutai Ahmad "A Usable Real-Time 3D Hand Tracker," In Proceedings 28th Asilomar Conference on Signals, Systems and Computers, pp. 1257-1261, 1995.

"Triax custom controllers due; video game controllers," HFD—The Weekly Home Furnishings Newspaper, vol. 67, No. 1, p. 122, Jan. 4, 1993.

(56) References Cited

OTHER PUBLICATIONS

Travis Butler, "Portable MP3: The Nomad Jukebox," TidBITS # 562, 2001.
Franklin Tessler, "Touchpads," Macworld, v. 13, No. 2, p. 68, Mac Publishing, Feb. 1996.
Richard Nass, "Touchpad input device goes digital to gie portable systems a desktop 'mouse-like' feel," Electronic Design, vol. 44, No. 18, p. 51, Sep. 3, 1996.
Easy Lai, "Touchpad," Notebook PC Manual, Beijing Acer Information Co., Ltd., Beijing, China, Feb. 16, 2005.
"Tips for Typing," FingerWorks, Newark, NJ, retreived from http://wwvv.fingerworks.com/mini_typing.html on Jan. 10, 2008.
Kenneth B. Evans, Peter P. Tanner and Marceli Wein, "Tablet-Based Valuators That Provide One, Two, or Three Degrees of Freedom," Computer Graphics, v. 15, No. 3, Aug. 1981.
"Synaptics TouchPad Interfacing Guide," Synaptics, Inc., San Jose, CA, Jan. 22, 2001, second edition.
Michael Chen, S. Joy Mountford and Abigail Sellen, "A Study in Interactive 3-D Rotation Using 2-D Control Devices," Computer Graphics, v. 22, No. 4, Aug. 1988, pp. 121-129.
Jun Rekimoto, "SmartSkin: An Infrastructure for Freehand Manipulation on Interactive Surfaces," Proc. of the SIGCHI, pp. 113-120, Minneapolis, USA, 2002.
Franklin N. Tessler, "Smart input: how to choose from the new generation of innovative input devices," Macworld, v. 13, No. 5, p. 98, May 1996.
Lars G. Soderholm, "Sensing Systems for 'Touch and Feel'," Design News, Aug. 5, 1989.
"Design News: Product News," Design News, Cahners Publication, issue 11, Jun. 9, 1997.
"Design News: Product News," Design News, Cahners Publication, issue 9, May 5, 1997.
"Preview of Exhibitor Booths at the Philadelphia Show," The Air Conditioning, Heating and Refrigeration News, Business News Publishing Co., Jan. 13, 1997.
Franklin Tessler, "Point Pad," Macworld, Oct 1995, v. 12, No. 10, p. 87.
"Personal Jukebox (PJB): Systems Research Center and PAAD," Compaq Computer Corp., Oct. 13, 2000, http://research.compaq.com/SRC/pjb/.
"New & Improved: Touchpad Redux," PC Magazine, Sep. 10, 1996.
"National Design Engineering Show Conference," Design News, Cahners Publication, issue 5, Mar. 4, 1996.
"MultiTouch Overview," FingerWorks, Newark, NJ, retrieved from http://www.fingerworks.com/multoverview.html on Jan. 10, 2008.
"The Laser Focus World Buyers Guide," Laser Focus World, Nashua, NH, PennWell Publishing Company, Dec. 1995.
Marty Petersen, "Koalapad touch tablet & Micro Illustrator software," InfoWorld Media Group, Oct. 10, 1983.
William Buxton, Ralph Hill and Peter Rowley, "Issues and Techniques in Touch-Sensitive Tablet Input" Computer Graphics, 19(3), Proceedings of SIGGRAPH'85, pp. 215-223, 1985.
"Intellivision Intelligent Television Master Component Service Manual," Sylvania, Mattel, Inc., 1979.
T.L. Petruzzellis, "Force-sensing resistors," Electronics Now, vol. 64, issue 3, p. 65, Mar. 1993.
"Mouse Emulation," FingerWorks, Newark, NJ, retrieved from http://www.fingerworks.com/gesture_guide_mouse.html on Jan. 10, 2008.
"Gesture Recoginition," FingerWorks, Newark, NJ, retrieved from http://www.fingerworks.com/gesture_recognition.html on Jan. 10, 2008.
"LogiCad3D Product Overview—ErgoCommander?", LogiCad3D a Logitech company, Fremont, CA, retreived from www.logicad3d.com/products/ErgoCommander.htm on Apr. 8, 2002.
Minoru Kobayashi "Design of dynamic soundscape: mapping time to space for audio browsing with simultaneous listening," Thesis Massachusetts Institute of Technology, 1996.
Shinji Kobayashia and Katsumi Miyazawa, "Development of the touch switches with the click response," Koukuu Denshi Gihou No. 17: pp. 44-48, Mar. 1994.
Minoru Kobayashi and Chris Schmandt, "Dynamic Soundscape: mapping time to space for audio browsing," Proceedings of CHI '97, Mar. 22-27, 1997.
"Design News: Literature Plus," Design News, Cahners Publication, issue 24, Dec. 18, 1995.
David H. Ahl "Controller Update," Creative Computing, vol. 9, No. 12, Dec. 1983.
"Sony presents 'Choice Without Compromise' at IBC '97," M2 Presswire, M2 Communications Ltd., Jul. 24, 1997.
C. Cohen, "A Brief Overview of Gesture Recognition," 1999 retrieved from http://homepages.inf.ed.ac.uk/rbf/CVonline/LOCAL_COPIES/COHEN/gesture_overview.htm on Jan. 10, 2008.
"BeoConn 6000 User Guide," Bang & Olufsen, Struer, Denmark, 2000.
"Atari VCS/2600 Peripherals," retrieved from classicgaming.com on Feb. 28, 2007.
"Alps Electric introduces the GlidePoint Wave Keyboard; combines a gently curved design with Alps' advanced GlidePoint technology," Business Wire, Oct. 21, 1996.
"Alps Electric Ships GlidePoint Keyboard for the Macintosh; Includes a Glidepoint Touchpad, Erase-Eaze Backspace Key and Countoured Wrist Rest," Business Wire, Jul. 1, 1996.
Marc Spiwak, "A pair of unusual controllers," Popular Electronics, vol. 14, issue 4, Apr. 1997.
Marc Spiwak, "A great new wireless keyboard," Popular Electronics, vol. 14, issue 12, Dec. 1997.
Forrest Mims, "A few quick pointers; mouses, touch screens, touch pads, light pads, and the like can make your system easier to use," Computers&Electronics, v.22, p. 64, 1984.
Brochure, "BeoCom 6000: Sales Training," Bang & Olufsen, Struer, Denmark, 2000.
"Der Klangmeister", Connect Magazine, Aug. 1998.
"Product Overview: iGesture Products for Everyone (learn in minutes)," FingerWorks, NewarK, NJ, retrieved from http://www.fingerworks.com/ on Aug. 30, 2005.
"Caz Pocket Computers Collection: BellSouth -IBM Simon -PDA cellphone," retreived from http://cdecas.free.fr/computers/pocket/simon.php on Nov. 21, 2008.
"IBM Simon," Wikipedia article, retrieved from from http://en.wikipedia.org/wiki/IBM_Simon last viewed on Nov. 21, 2008.
Chris O'Malley, "BellSouth's communicative Simon is a milestone in the evolution of the PDA", Byte.com, Dec. 1994, retrieved from http://www.byte.com/art/9412/sec11/art3.htm.
"IBM's plans to ship Simon put on hold for time being," Business Services Industry, Mobile Phone News, Apr. 4, 1994, retrieved from http://findarticles.com/p/articles/mi_m345.
Amon, C.H.; Nigen, J.S.; Siewiorek, D.P.; Smailagic, A.; and Stivoric, J., "Concurrent Design and Analysis of the Navigator Wearable Computer System: The Thermal Perspective," IEEE Transactions on Components, Packaging, and Manufacturing Technology, Part A, Sep. 1995, pp. 567-577, vol. 18, No. 3.
U.S. ITC, In the Matter of Certain Portable Electronic Devices and Related Software: Order No. 57: Construing the Terms of the Asserted Claims of the Patents at Issue, Jun. 26, 2012, pp. 63-97.
Jun Rekimoto, "Tilting Operations for Small Screen Interfaces (Tech Note)," 1996.
Z. Szalavari; and M. Gervautz; "The Personal Interaction Panel—A Two- Handed Interface for Augmented Reality," Computer Graphics Forum, Sep. 1997, pp. C335-C346, vol. 16, No. 3.
Apple, Newton—Apple MessagePad Handbook, 1995, pp. 1-358.
Newton MessagePad 2000 User's Manual, pp. 1-278 (1997).
Kenneth P. Fishkin; Thomas P. Moran; and Beverly L. Harrison; "Embodied User Interfaces: Towards Invisible User Interfaces," Proceedings of EHCI 98, (Heraklion, Crete, Sep. 13-18, 1998.
Steve Nasiri; Shang-Hung Lin; Davids Sachs; and Joseph Jiang; "Motion Processing: The Next Breakthrough Function in Handsets," Mobile Dev&Design, 2010, pp. 1-10.
Lynellen D.S. Perry; Christopher M. Smith; and Steven Yang; "An Investigation of Current Virtual Reality Interfaces," Crossroads The ACM Student Magazine, Mar. 1992.

(56) References Cited

OTHER PUBLICATIONS

G.W. Fitzmaurice, "Situated Information Spaces and Spatially Aware Palmtop Computers," Communications of the ACM, Jul. 1993, pp. 39-49, vol. 36, No. 7.
R. Azuma; and G. Bishop; "Improving Static and Dynamic Registration in an Optical See-through HMD," SIGGRAPH 94, Jul. 24-29, 1994, Orlando, Florida.
E. Foxlin; M. Harrington; and G. Pfeifer; "Constellation: A Wide-Range Wireless Motion-Tracking System for Augmented Reality and Virtual Set Applications," Proceedings of SIGGRAPH 98, Jul. 19-24, 1998, Orlando, Florida.
T.W. Bleser; J.L. Sibert; and J.P. McGee, "Charcoal Sketching: Returning Control to the Artist," The Interaction Technique Notebook, 1988.
D. Small; and H. Ishii, "Design of Spatially Aware Graspable Displays," CHI 97, Mar. 22-27, 1997, pp. 367-368.
M.A. Viredaz, WRL Technical Note TN-54—The Memory Daughter-Card Version 1.5 User's Manual, Jul. 1998.
M.A. Viredaz, WRL Technical Note TN-55—The Itsy Pocket Computer Version 1.5 User's Manual, Jul. 1998.
Bartlett et al., WRL Research Report 2000/6—The Itsy Pocket Computer, Oct. 2000.
K. Kawachiya and H. Ishikawa, "NaviPoint: An Input Device for Mobile Information Browsing," CHI '98, Apr. 18-23, 1998.
G. Levin; and P. Yarin, "Bringing Sketching Tools to Keychain Computers with an Acceleration-Based Interface," Proceedings of CHI1998 Extended Abstracts, ACM, New York, 1998, pp. 268-269.
A. Schmidt; M. Beigl; and H.W. Gellerson; "There is More to Context than Location," 1998.
Want et al., "An Overview of the PARCTAB Ubiquitous Computing Experiment," IEEE Personal Communications, Dec. 1995, pp. 28-43.
di Massimo Truscelli, "Radius Full Page Pivot," MCmicrocomputer, Apr. 1992, No. 117, pp. 136-140.
G.W. Fitzmaurice; S. Zhai; and M.H. Chignell, "Virtual Reality for Palmtop Computers," ACM Transactions on Information Systems, Jul. 1993, pp. 197-218, vol. 11, No. 3.
Order No. 58: Initial Determination Granting Motion to Terminate Investigation with Respect to Certain Claims; ITC Inv. No. 337-TA-797.
W.A. Hoff; K. Nguyen; and T. Lyon, "Computer Vision-Based Registration Techniques for Augmented Reality," 1996.
J. Woodfill and B. Von Herzen, "Real-Time Stereo Vision on the PARTS Reconfigurable Computer," 1997.
R. Holloway and A. Lastra; "Virtual Environments: A Survey of the Technology," 1993.
A.L. Zwern and G.L. Goodrich, "Virtual Computer Monitor for Visually-Impaired Users," 1996.
G.F. Welch, "Hybrid Self-Tracker: An Inertial/Optical Hybrid Three-Dimensional Tracking System," 1995.
Geoff Walker, "Touch screen highlights from the SID 2006 show floor," Jun. 2006, pp. 19-26.
Geoff Walker, "A Cornucopia of Touch Technology," 2006.
G.L. Barret, "Filters and Other Touch Screen Enhancements," iTouch International, pp. 1-8.
"Noise Frequencies in Capacitive Touch Screens," IBM Retail Store Solutions, pp. 1-8.
J.F. Bartlett, "Rock 'n' Scroll is here to stay [user interface]," Computer Graphics and Applications, IEEE, May/Jun. 2000, vol. 20, Issue 3.
B.L. Harrison; K.P. Fishkin; A. Gujar; C. Mochon; and R. Want, "Squeeze Me, Hold Me, Tilt Me! An Exploration of Manipulative User Interfaces," CHI '98, Los Angeles, CA USA, Apr. 1998, pp. 17-24.
G. Kurtenbach; G. Fitzmaurice; T. Baudel; and B. Buxton, "The Design of a GUI Paradigm based on Tablets, Two-hands, and Transparency," CHI '97, Mar. 22-27, 1997.
C. Kitchin, Using Accelerometers in Low g Applications, Analogue Devices Application Note AN-374, 1995.
E. Foxlin and N. Durlach, An Inertial Head-Orientation Tracker With Automatic Drift Compensation for Use With HMDs, VRST 94, Singapore, Aug. 23-26, 1994.
B. MacIntyre and S. Feiner, Future Multimedia User Interfaces, 1996.
Krueger, Videoplace—An Artificial Reality, CHI '85 Proceedings of the SIGCHI conference on Human factors in computing systems, pp. 35-40.
Rubine, "Automatic Recognition of Gestures" pp. 1-266.
Westerman, "Hand Tracking, Finger Identification, and Chordic Manipulation on a Multi-Touch Surface" pp. 1-333.
Verplaetse, "Inertial Proprioceptive Devices—Self-Motion-Sensing Toys and Tools," IBM Systems Journal, 1996, pp. 639-650, vol. 35, Nos. 3 & 4, C.
I. Sutherland, "A Head Mounted Three Dimensional Display," proceedings FJCC 1968.
J. H. Bohn, "Computer Aided Design I," 1997.
"Frontiers of Engineering, Reports on Leading Edge Engineering from the 1996 NAE Symposium on Frontiers of Engineering," 1997.
Helms et al., "Virtual Environment Technology for MOUT Training," 1997.
G.A. Henault, "A Computer Simulation Study and Component Evaluation for a Quaternion Filter for Sourceless Tracking of Human Limb Segment Motion," 1997.
"Advanced Technology for Portable Personal Visualization," 1992.
J.D. Foley; A. Van Dam; and S.K. Feiner, "Computer Graphics Principles and Practice," 1995.
"Kitchen Computer IBM Technical Disclosure Bulletin," 1994, pp. 223-225, vol. 37, No. 12.
J.H. Bohn, Computer-Aided Design I—Term Papers, 1997.
"Image Orientation Sensing and Correction for Notepads," Research Disclosure No. 34788, 1993, p. 217.
Analog Devices, Inc., Analog Devices—Programmable Capacitance-to-Digital Converter with Environmental Compensation, 2005.
Meyer, H.U.; Sylvac SA, Crissier; "An Integrated Capacitive Position Sensor," Instrumentation and Measurement Technology Conference, IMTC/95.Proceedings. 'Integrating Intelligent Instrumentation and Control'., IEEE, 1995.
D. Strickland; A. Patel; C. Stovall; J. Palmer; and D. McCalister, Self Tracking of Human Motion for Virtual Reality Systems, 1994, pp. 8-10.
Computer Graphics Forum, 1995, pp. 29-41, vol. 14, Issue 3.
P.A. Millman; M. Stanley; and J.E. Colgate, Design of a High Performance Haptic Interface to Virtual Environments, Virtual Reality Annual International Symposium, 1993.
D. Kim; S.W. Richards; and T.P. Caudell, An Optical Tracker for Augmented Reality, Virtual Reality Annual International Symposium, 1997.
Second Annual Symposium on the Frontiers of Engineering, National Academies Press 1997.
M. Kruger, Addition of Olfactory Stimuli to Virtual Reality Simulations for Medical Training Application, 1996.
T. Higgins; P. Main; and J. Lang, Imaging the Past: Electronic Imaging and Computer Graphics in Museums and Archaeology, 1997.
Proceedings on the First International Symposium of Wearable Computers, IEEE, 1997.
M.W. Kruger, Artificial Reality, 1983.
M.W. Kruger, Artificial Reality II, 1991.
L. Borman and B. Curtis, Human Factors in Computing Systems, CHI '85 Conference Proceedings, Apr. 14-18, 1985, San Francisco.
James D. Foley et al., Computer Graphics—Principles and Practice, 2nd Edition, 1990.
James D. Foley et al., Computer Graphics—Principles and Practice, 2nd Edition, 1996.
R.M. Baecker; W.A.S. Buxton; J. Grudin and S. Greenberg, Readings in Human-Computer Interaction: Toward the Year 2000, 1995.
J.D. Foley et al., Introduction to Computer Graphics, 1994.
J. Zukowski, Java AWT Reference (Java 1.1), 1997.
B. Laurel, The Art of Human-Computer Interface Design, 1990.
D.A. Norman and S.W. Draper, User Centered System Design, 1986.
Analog Devices, ADXL05 Data Sheet, 1996.
Anthony Lawrence, "Modern Inertial Technology," Springer-Verlag, New York, 1993.

(56) References Cited

OTHER PUBLICATIONS

Teresa Anne Marin, Toward an Understanding of Musical Gesture: Mapping Expressive Intention with the Digital Baton, MIT Masters Thesis, Jun. 1996.
C.J. Verplaestse, Inertial-Optical Motion-Estimating Camera for Electric Cinematography, MIT Masters Thesis, Jun. 1997.
PenPoint API Reference, vols. 1 & 2, Addison-Wesley, 1992.
PenPoint Architectural Reference, vols. 1 & 2, Addison-Wesley, 1992.
Robert Carr and Dan Shafer, "The Power of PenPoint," Addison-Wesley , 1991.
Eric Azinger, "Radius Display Can Fit Different Orientations," InfoWorld, Jul. 22, 1991, p. 69, vol. 13, No. 29.
"IBM Technical Disclosure Bulletin, vol. 36 No. 1, Jan. 1, 1993, p. 414 "Reminder Pen"".
Order No. 58: Initial Determination Granting Motion to Terminate Investigation with Respect to Certain Claims; ITC Inv. No. 337-TA-797, Jun. 26, 2012.
G.L. Barret, "Filters and Other Touch Screen Enhancements," iTouch International, pp. 1-8, Archived by archive.org on Nov. 22, 2006, http://web.archive.org/web/20061122003733/http://www.touchinternational.com/literature/whitepapers/filtersandothertouchscreenenhancements.pdf (Available online at http://touchinternational.com/literature/whitepapers/FiltersandOtherTouchScreenEnhancements.pdf, last visited Mar. 13, 2013).
"Noise Frequencies in Capacitive Touch Screens," IBM Retail Store Solutions, pp. 1-8, PDF document created Jul. 26, 2004. (Available online at https://www-304.ibm.com/support/docview.wss?uid=pos1R1003106&aid=1, last visited Mar. 13, 2014).
Krueger, Videoplace—An Artificial Reality, CHI '85 Proceedings of the SIGCHI conference on Human factors in computing systems, ACM, vol. 16, Issue 4, Apr. 1985, pp. 35-40.
Rubine, "Automatic Recognition of Gestures," Doctoral Dissertation, Carnegie Mellon University, Pittsburgh, PA, Dec. 1991, pp. 1-266.
Westerman, "Hand Tracking, Finger Identification, and Chordic Manipulation on a Multi-Touch Surface," PhD thesis, University of Delaware, Spring 1999, pp. 1-333.
Jenifer Tidwell, "Designing Interfaces: Patterns for Effective Interaction Design," O'Reilly Media, Inc., Sebastopol, CA, USA, First Edition, Nov. 2005.
R.M. Baecker and W.A.S. Buxton, Readings in Human-Computer Interaction: A Multidisciplinary Approach, Morgan Kaufmann Publishers Inc, Los Altos, CA, 1987.
IBM Technical Disclosure Bulletin, "Personal Computer Environmental Control Via a Proximity Sensor," Aug. 1993, US.
Hilary Lyndsay Williams, "Multi-Functional Cellular Telephone", U.S. Appl. No. 13/188,239, filed Jul. 21, 2011.
Office Action dated Feb. 4, 2011 in co-pending Reissue U.S. Appl. No. 12/255,557, filed Oct. 21, 2008.
Aboelsaadat et al., "An Empirical Comparison of Transparency on One and Two Layer Displays," People and Computers XVIII: Proceedings of the British HCI Conference, pp. 1-20, 2004.
Ahmad, "A Usable Real-Time 3D Hand Tracker," in Proceedings 28th Asilomar Conference on Signals, Systems and Computers, Interval Research Corporation, vol. 2, pp. 1257-1261, Palo Alto, CA, 1995, 5 pages.
Author Unknown, "Chart of Spatial Keyframing, Traditional Interfaces, interface Techniques, 3D Control and Visulation and Ongoing Work," 1 page, 2007.
Author Unknown, "Error and Coupling: Extending Common Ground to Improve the Provision of Visual Information for Collaborative Tasks," Proceedings from the Conference of the International Communication Association, pp. 1-35, 2008.
Baecker et al., "The University of Toronto Dynamic Graphics Project," Computer Systems Research Institute, University of Toronto, Proceedings of the ACM CHI '91 Human Factors in Computing Systems Conference, pp. 467-468, 1991, 2 pages.
Barret et al., "Filters and Other Touch Screen Enhancements," 8 pages iTouchInternational, Dec. 2, 2011.
Bederson et al., "Jazz: An Extensible Zoomable User Interface Graphics Toolkit in Java," Proceedings of the 13th Annual ACM Symposium on User Interface Software and Technology, Nov. 6-8, 2000, ACM Press, 11 pages.
Birnholtz et al., "Using Motion Tracking Data to Augment Video Recordings in Experimental Social Science Research," Third International Conference on E-Social Science, Oct. 7-9, 2007, Ann Arbor, Michigan, 10 pgs.
Browne et al., "Designing a Collaborative Finger Painting Application for Children," CS-TR- 4184, Human-Computer Interaction Lab, University of Maryland, College Park, MD, Oct. 6, 2000, 8 pages.
Buxton et al., "A Microcomputer-based Conducting System," 14 pages, Structured Sound Synthesis Project, Computer Systems Research Group, University of Toronto, Toronto, Ontario, CA, Computer Music Journal, 4(1):8-21, Spring 1980.
Buxton et al., "The Use of Hierarchy and Instance in a Data Structure for Computer Music," Computer Music Journal, vol. II, No. 4, pp. 10-20, Dec. 1978, 11 pages.
Buxton et al., "An introduction to the SSSP Digital Synthesizer," 11 pages, vol. II, No. 4, pp. 28-38, Computer Music Journal, Menlo Park, CA, Dec. 1978.
Cao et al., "Evaluation of an On-line Adaptive Gesture Interface with Command Prediction," Proceedings of Graphics Interface, pp. 187-194, 8 pages, University of Toronto, 2005.
Carpendale, "Roles of Orientation in Tabletop Collaboration: Comprehension, Coordination and Communication," Computer Supported Cooperative Work (CSCW), Univserity of Calgary, Alberta, Canada, Dec. 2004, 33 pages.
CENA, "DigiStrips humaniser les interfaces," 1 page, Toulouse, France, 2001.
Dietz et al., "Submerging Technologies," 1 page, Proceeding ACM SIGGRAPH 2006, Emerging Technologies Article No. 30, Mitsubishi Electric Research Labs, 2006.
DSNA, "Activity related to VIGIESTRIPS: study of a support of flight plan information devised for the benefit of the Watchtower," 2011, 4 pages, mhtml:file://S:\DFSR_DATA/Data01\051900\Prior Art\915\00—Michael Kobayashi\10.1 . . . , Accessed Oct. 12, 2011.
DSNA, "Vigiestrips Making Strips a part of A-SMGCS," 14 pages, CENA, 2004.
Esteban at al., "Visual construction of highly interactive applications," Visual Database Systems 3, IFIP—The International Federation for Information Processing, pp. 304-316, CENA/PII/95.641/O Version 1, 15 pages, 1995.
Fedorkow et al., "A Computer-Controlled Sound Distribution System for the Performance of Electroacoustic Music," Computer Music Journal, vol. II, No. 3, pp. 33-42, 10 pages, Dec. 1978.
Fryberger et al., "An Innovation in Control Panels for Large Computer Control Systems," 4th IEEE Particle Accelerator Conference, Chicago, IL, Mar. 1-3, 1971, pp. 414-417, 4 pages.
Fukuchi et al., "Interaction Techniques for SmartSkin," Proceedings of UIST, 2 pages, 2002.
Fukuchi et al., "Marble Market: Bimanual Interactive Game with a Body Shape Sensor," Entertainment Computing—ICEC 2007, Lecutre Notes in Computer Science, 4740:374-380, 8 pgs. 2007.
Fukuchi et al., "SmartSkin," Proceedings of Entertainment Computing 2003, IPSJ Symposium Series vol. 2003, No. 1, pp. 70-74—(Only summary in English), 5 pages, 2003.
Fukuchi, "Multi-Track Scratch Player on a Multi-Touch Sensing Device," Entertainment Computing—ICEC 2007, Lecture Notes in Computer Science, 4740:211-218, 8 pgs, 2007.
Gross, "Grids in Design and CAD," Reality and Virtual Reality: Mission-Method-Madness: ACADIA Conference Proceedings, pp. 33-43, ACADIA, Los Angeles, California, 11 pages, 1991.
Gujar et al., "Talking Your Way Around a Conference: A speech interface for remote equipment control," CASCON '95 Proceedings of the 1995 Conference of the Centre for Advanced Studies on Collaborative Research, p. 26, 7 pages, University of Toronto, Toronto, Ontario, Canada, 1995.
Han et al., "Multi-Touch Interaction Research Animation Theater," Computer Animation Festival, Electronic Art and Animation Catalogue, pp. 244, 1 page, New York University, 2006.

(56) References Cited

OTHER PUBLICATIONS

Han, "Media Mirror," SIGGRAPH '05 Sketches, Article No. 4, 1 page, Media Research Laboratory, New York University, 2005.
Han, "Multi-Touch Interaction Wall," SIGGRAPH '06, Emerging Technologies, Article 25, 1 page, Courant Institute of Mathematical Sciences, New York University, Aug. 2006.
Han, "Multi-Touch Sensing through Frustrated Total Internal Reflection," 1 page, Media Research Laboratory, New York University, 2005.
Herot et al., "One-Point Touch Input of Vector Information for Computer Displays," SIGGRAPH '78 Proceedings of the 5th Annual Conference on Computer Graphics and Iteractive Techniques, ACM, pp. 210-216, 7 pages, 1978.
Hinrichs et al., "Interface Currents: Supporting Fluent Collaboration on Tabletop Displays," Smart Graphics, Lecture Notes, Computer Science, 3638:185-197, 12 pages, Otto-von-Guericke University, Magdeburg, Germany, 2005.
HTC, "Touch Pro," Quick Start Guide, 41 pages, 2008.
HTC, "Your HTC 7 Pro," Quick Guide, 2 pages, 2011.
HTC, "Your HTC 7 Trophy," Quick Guide, 2 pages, 2010.
HTC, "Your HTC Radar 4G," Quick Guide, 2 pages, 2011.
HTC, "Your HTC Sensation 4G," User Guide, 191 pages, 2011.
HTC, "Your HTC Wildfire S," Quick Guide, 2 pages, 2011.
Hudson et al., "Animation Support in a User Interface Toolkit: Flexible, Robust, and Reusable Abstractions," Proceedings of the ACM Symposium on User Interface Software and Technology, pp. 57-67, Graphics Visualization and Usability Center, College of Computing, 10 pages, Georgia Institute of Technology, Atlanta, GA, 1993.
IBM Retail Store Solutions, "Noise Frequencies in Capacitive Touch Screens," 8 pages, 2004.
Integrated—Google Search, Dictionary "in-te-grat-ed," 2 pages https://www.google.com/search?source=jg&hl=en&rlz-&q=define+integr . . . , Accessed Mar. 21, 2012.
Internet.com, "Flash Kit," A Flash Developer Resource Site, 3 pages, Aug. 28, 2005.
Karlson et al., "AppLens and LaunchTile: Two Designs for One-Handed Thumb Use on Small Devices," Human-Computer Interaction Lab, University of Maryland, Proceedings of the SIG CHI Conference on Human Factors in Computing Systems, 2005, 10 pages.
Keskin et al., "Real Time Hand Tracking And 3D Gesture Recognition For Interactive Interfaces Using HMM," 4 pages, Computer Engineering Dept. Bogazici University, 2003.
Kitchin, "Using Accelerometers in Low g Applications," 6 pages, Analog Devices, Norwood, MA, 1995.
Kruger, et al., "How People Use Orientation on Tables: Comprehension, Coordination and Communication," Group '03 Proceedings of the 2003 International ACM SIGGROUP Conference on Supporting Group Work, pp. 369-378, 10 pages, Univ. of Calgary, Department of Science, Calgary, Alberta, 2003.
Levin et al., "Bringing Sketching Tools to Keychain Computers with an Acceleration-Based Interface," CHI EA '99 CHI '99 Extended Abstracts on Human Factors in Computing Systems, ACM, 2 pages, MIT Media Laboratory, Cambridge, MA, 1999.
Mackay et al., "Reinventing the Familiar: Exploring an Augmented Reality Design Space for Ait Traffic Control," CHI '98 Proceedings of the SIGCHI Conference on Human Factors in Computing Systems, ACM Press/Addison-Wesley Publishing Co., 8 pages, 1998.
McGuffin et al., "Expand-Ahead: A Space-Filling Strategy for Browsing Trees," IEEE Symposium on Information Visualization, 8 page, University of Toronto, 2004.
McGuffin et al., "Interactive Visualization of Genealogical Graphs," IEEE Symposium on Information Visualization, Oct. 23-25, 2005, 8 pages.
Moscovich at al., "A Multi-finger Interface for Performance Animation of Deformable Drawings," Demonstration at UIST 2005 Symposium on User Interface Software and Technology, Seattle, Washington, Oct. 2005, 2 pages.
Moscovich et al., "Multi-finger Cursor Techniques," Proceedings of Graphics Interface 2006, Quebec City, Canada, Jun. 2006, 7 pages, Department of Computer Science, Providence, RI, 2006.
Narayanaswamy el al., "User Interface for a PCS Smart Phone," IEEE International Conference on Multimedia Computing and Systems, vol. 1, 1999, 5 pages.
Nasiri et al., "Motion Processing: The Next Breakthrough Function in Handsets," 10 pages, InvenSense, Inc., Sunnyvale, CA, 2010.
Oka at al., "Real-time Tracking of Multiple Fingertips and Gesture Recognition for Augmented Desk Interface Systems," Proceedings of Fifth IEEE International Conference on Automated Face and Gesture Recognition, May 20-21, 2002, 6 pages, Institute of Industrial Science, University of Tokyo, Tokyo, Japan.
Owen et al., "When It Gets More Difficult, Use Both Hands- Exploring Bimanual Curve Manipulation," Proceedings of Graphics Interface 2005, pp. 17-24, Canadian Human-Computer Communications Society, 8 pages, Alias, Toronto, Ontario, Canada, 2005.
Perlin at al., "PAD: An Alternative Approach to the Computer Interface," Proceedings of the 20th Annual Conference on Computer Graphics and Interactive Techniques, pp. 57-64, Courant Institute of Mathematical Sciences, NYU. pp. 1-11, New York, NY, 1993.
Perry at al., "An investigation of Current Virtual Reality Interfaces," 17 pages, Crossroads 3(3):23-28, The ACM Student Magazine, Mar. 1997.
Railane et al., "Tackling the Problem of Flight Integration," 10 pages, Toulouse, France, 2007.
Reetz et al., "Superflick: a Natural and Efficient Technique for Long-Distance Object Placement on Digital Tables," Proceedings of Graphics Interface 2006, pp. 163-170, Canadian Information Processing Society, 8 pages, University of Saskatchewan, Saskatoon, Canada, Jul. 6, 2006.
Rekimoto et al., "Augmented Surfaces: A Spatially Continuous Work Space for Hybrid Computing Environments," Proceedings of the SIG CHI Conference on Human Factors in Computing Systems, pp. 378-385, 8 pages, 1999.
Rekimoto, "Tilting Operations for Small Screen Interfaces," Proceedings of the 9th Annual ACM Symposium on User Interface Software and Technology, pp. 167-168, 2 pages, Sony Computer Science Laboratory, inc., Tokyo, Japan, 1996.
Rosenberg at al., "Real-Time Stereo Vision using Semi-Global Matching on Programmable Graphics Hardware," ACM SIGGRAPH 2006 Sketches, p. 89, 1 page, New York University, Jul. 30, 2006.
Salaun et al., "Innovative HMI for the busiest airport towers," Air Traffic Technology International 2006, pp. 92-95, 4 pages, 2006.
Schmidt at al., "There is more to Context than Location," Computer and Graphics, 23(6):893-901, 10 pages, University of Karlsruhe, Karlsruhe, Germany, Dec. 1999.
Shapetape, "9 Photographic Illustrations," Proceedings of 1999 ACM Symposium on Interactive 3D Graphics (I3DG'99), 1999, 1 page.
Singh et al., "Numeric Paper Forms for NGOs," in International Conference on Information and Communication Technologies and Development (ICTD), IEEE, pp. 1-11, 2009.
Smith at al., "Croquet: A Menagerie of New User Interfaces," Proceedings of Second International Conference on Creating, Connecting, and Collaborating through Computing, 2004, pp. 4-11, 8 pages.
TMobile, "HTC Sensation 4G," Start Guide, 21 pages, 2011.
Toccata, "Demonstrating Interaction Techniques for an ATC Workstation," 1 page, CENA, Toulouse, France, 2001.
Tsang et al., "Boom Chameleon: Simultaneous capture of 3D viewpoint, voice and gesture annotations on a spatially-aware display," Proceedings of the 15th Annual ACM Symposium on User Interface Software and Technology, pp. 111-120, 10 pages, Toronto, Canada, 2002.
Tsang et al., "Temporal Thumbnails: Rapid Visualization of Time-Based Viewing Data," Proceedings of the Working Conference on Advanced Visual Interfaces, 'ages 175-178, 8 pages, University of Toronto, 2004.
Verizon, "HTC Rhyme," Getting Started Guide. 66 pages, 2011.
Virgin Mobile, "HTC Wildfire S," User Manual, 172 pages, 2011.
Wallace, "The Semantics of Graphic Input Devices," ACM SIGPLAN Notices 11, No. 6, pp. 61-65, 5 pages, University of North Carolina, Chapel Hill, NC, 1976.
Welch, "Hybrid Self-Tracker: An Inertial/Optical Hybrid Three-Dimensional Tracking System," 21 pages, Technical Report TR 95-048, University of North Carolina Chapel Hill, Chapel Hill, NC, 1995.

(56) References Cited

OTHER PUBLICATIONS

Wigdor at al., "Empirical Investigation into the Effect of Orientation on Text Readability in Tabletop Displays," ECSCW 2005, pp. 205-224, Springer Netherlands, 21 pages, 2005.
Wigdor at al., "Table-Centric Interactive Spaces for Real-Time Collaboration," images, 1 pg., Mitsubishi Electric Research Laboratories, Proceedings of the Working Conference on Advanced Visual Interfaces, ACM, May 1, 2006.
Wigdor et al., "Table-Centric Interactive Spaces for Real-Time Collaboration: Solutions, Evaluation, and Application Scenarios," Proceedings of the Working Conference on Advanced Visual Interfaces, ACM 2006, 6 pgs.
Wilson at al., "FlowMouse: A Computer Vision-Based Pointing and Gesture Input Device," Human-Computer Interaction-INTERACT 2005, pp. 565-578, Springer, Berlin, 14 pages, Microsoft Research, Redmond, WA, 2005.
Ahl, "Controller Update," Creative Computing, vol. 9, No. 12, Dec. 1983, 6 pages.
Author Unknown, "Alps Electric Introduces the GlidePoint Wave Keyboard; Combines a Gently Curved Design with Alps' Advanced GlidePoint Technology," Business Wire, Oct. 21, 1996, 3 pages, http://www.encyclopedia.com/printable.aspx?id=1G1:18786732 accessed Jun. 6, 2007.
Author Unknown, "Alps Electric Ships GlidePoint Keyboard for the Macintosh; Includes a Glidepoint Touchpad, Erase-Eaze Backspace Key and Contoured Wrist Rest," Business Wire, Jul. 1, 1996, 2 pages.
Author Unknown, "Atari VCS/2600 Periperals," retrieved from classicgaming.com on Feb. 28, 2007, 15 pages, http:www.classicgaming.com/gamingmuseum/2600p.html accessed Feb. 28, 2007.
Author Unknown, "BeoCom 6000 User Guide," Bang & Olufsen, Struer, Denmark, 2000, 53 pages.
Author Unknown, "BeoCom 6000: Sales Training," Brochure, Bang & Olufsen, Struer, Denmark 2000, 5 pages.
Author Unknown, "Der Klangmeister," Connect Magazine, Aug. 1998, 6 pages, German with English Translation.
Author Unknown, "Design News: Literature Plus," Design News, Cahners Publication, Issue 24, Dec. 18, 1995, 30 pages.
Author Unknown, "Design News: Product News," Cahners Publication, Issue No. 11, Jun. 9, 1997, 34 pages.
Author Unknown, "Design News: Product News," Cahners Publication, Issue No. 9, May 5, 1997, 56 pages.
Author Unknown, "Design News: National Design Engineering Show Conference, Mar. 18-21, 1996, McCormick Place, Chicago," Cahners Publication, Issue No. 5, Mar. 4, 1996, 87 pages.
Author Unknown, "IBM's Plans to Ship Simon Put on Hold for Time Being," Business Services Industry, Mobile Phone News, Apr. 4, 1994, 5 pages, retrieved from http://findarticles.com/p/articles/mi_m3457/is_n14_v12/ai_14973288, on Nov. 21, 2008.
Author Unknown, "JavaScript Language Reference," retrieved from http://msdn.microsoft.com/en-us/library/ie/dlet7k7c(v=vs.94).aspx on Jun. 3, 2013, 1 page.
Author Unknown, "LogiCad3D Product Overview—ErgoCommander?," LogiCad3D a Logitech Company, Fremont, CA, retrieved from www.logicad3d.com/products/ErgoCommander.html on Apr. 8, 2002, 2 pages.
Author Unknown, "Personal Jukebox (PJB): Systems Research Center and PAAD," Compaq Computer Corp., Oct. 13, 2000, retrieved from http://research..compaq.com/SRC/pjb, 28 pages.
Author Unknown, Press Release—LG and Prada Partner to Develop Iconic Mobile Phone, Dec. 11, 2006, 1 page, retrieved from http://www.lg.com/us/press-release/lg-and-prada-partner-to-develop-iconic-mobile-phone on Jul. 18, 2013.
Author Unknown, "Press Release—Novell Raises the Bar for the Linux Desktop," retrieved from http://www.novell.com/news/press/2006/2/novell raises the bar for the linux desktop on Jul. 18, 2013, 2 pages.
Author Unknown, "Press Release—Novell Ships Desktop Linux for the Enterprise," retrieved from http://www.novell.com/news/press/2004/11/novell-ships-desktop-linux-for-the-enterprise on Jul. 18, 2013, 3 pages.
Author Unknown, "Sony Presents 'Choice Without Compromise' at IBC '97," M2 Presswire, M2 Communications Ltd., Jul. 24, 1997, 3 pages.
Author Unknown, "The Laser Focus World Buyers Guide," Laser Focus World, Nashua, NH, PennWell Publishing Company, Dec. 1995, 162 pages.
Author Unknown, "The News, Preview of Exhibitor Booths at the Philadelphia Show," The Air Conditioning, Heating and Refrigeration News, Business News Publishing Co., Jan. 13, 1997, 22 pages.
Bellsouth, "Caz Pocket Computers Collection: BellSouth—IBM Simon—PDA cellphone," retrieved from http://cdecas.free.fr/computers/pocket/simon.php on Nov. 21, 2008, 2 pages.
Author Unknown, website of DiamondTouch by Circle Twelve Inc., retrieved from htto://www.circletwelve.com/company.html on Jul. 22, 2013, 1 page.
Buxton, "Multi-Touch Systems that I Have Known and Loved," Microsoft Research, Original Jan. 2007, Version: Mar. 19, 2003, 23 pages, http://www.billbuxton.com/multitouchOverview.html, retrieved May 31, 2013.
Buxton, "New Screens to forget the past forms PC and TV are in a highway . . . ," retrieved from http://www.billbuston.com/laRecherche.html, Sep. 14, 2011; with Google Translation retrieved Jun. 3, 2013, 15 pages.
Chang et al., "Animation: From Cartoons to the User Interface," ACM, Nov. 3-5, 1993, UIST'93, 11 pages.
Cohen "A Brief Overview of Gesture Recognition," 1999, retrieved from http://homepages.inf.ed.ac.uk/rbf/Cvonline/LOCAL_COPIES/COHEN/gesture_overview.htm on Jan. 10, 2008, 14 pages.
Colbert, "Why the iPad will fail to win significant market share," TechRepublic Out Loud, 2010, 2 pages, http://www.techrepublic.com/blog/tr-out-loud/why-the-ipad-will-fail-to- . . . .
Dewid, "Scroll Control Box," IBM Technical Disclosure Bulletin, vol. 36, No. 4, Apr. 1993, 7 pages.
Dietz et al., "DiamondTouch: A MultiUser Touch Technology," Proceedings of the UIST 2001, the 14th Annual ACM symposium on User Interface Software and Technology, Nov. 11-14, 2001, Orlando, FL USA, pp. 219-226.
Esenther et al., "Multi-User Multi-Touch Games on DiamondTouch with the DTFlash Toolkit," Dec. 2005, Mitsubishi Electric Research Laboratories, http://www.merl.com, 6 pages.
Evans, et al., "Tablet-Based Valuators that Provide One, Two, or Three Degrees of Freedom," Computer Graphics, vol. 15, No. 3, Aug. 1981, 7 pages.
File History, U.S. Appl. No. 09/171,921, entitled Portable Computers, which was issued as U.S. Patent No. 6,956,564 was filed Oct. 29, 1998, 574 pages.
File History, U.S. Appl. No. 12/255,557, entitled Portable Computers, which is pending was filed Oct. 21, 2008, 517 pages.
File History, U.S. Appl. No. 12/268,254, entitled Portable Computers, which was issued as U.S. Patent No. RE 44103 was filed on Nov. 10, 2008, 444 pages.
File History, U.S. Appl. No. 12/268,336, entitled Portable Computers, which is pending was filed on Nov. 10, 2008, 534 pages.
File History, U.S. Appl. No. 13/188,239, entitled Portable Computers, which is allowed was filed on Jul. 21, 2011, 215 pages.
Fingerworks, "Gesture Recognition," retrieved from http://www.fingerworks.com/gesture_recognition.html on Jan. 10, 2008, 1 page.
Fingerworks, "Mouse Emulation," retrieved from http://www.fingerworks.com/gesture_guide_mouse.html on Feb. 15, 2009, 1 page.
Fingerworks, "MultiTouch Overview," retrieved from http://www.fingerworks.com/multioverview.html, Jan. 10, 2008, 1 page.
Fingerworks, "Product Overview: iGesture Products for Everyone (learn in minutes)," retrieved from http://www.fingerworks.com, Aug. 30, 2005, 6 pages.
Fingerworks, "Tips for Typing," retrieved from http://www.fingerworks.com/mini_typing.html. On Jan. 10, 2008, 2 pages.
Fingerworks, Zero-Force Ergonomic Keyboards with Touchpad Hand Gestures by FingerWorks, retrieved from http://www.dustyneuron.com/fingerworks/, on Jun. 3, 2013, 1 page.
Google Earth, "Navigating in Google Earth—Earth Help," retrieved from https://support.google.com/earth/answer/148186?hl=en on Jul. 18, 2013, 2 pages.

(56) References Cited

OTHER PUBLICATIONS

Grossman, "Apple's New Calling: The iPhone," Time, Jan. 10, 2007, 5 pages, http://www.time.com/time/printout/0,8816,1575743,00.html.
Grossman, "Invention Of the Year: The iPhone," Time, Nov. 1, 2007, 2 pages, http://www.time.com/time/specials/2007/printout/0,29239,1677329__1678542__1677891,00 . . . .
Headrush, "Creating Passionate Users: iPhone and the Dog Ears User Experience Model," 2007, 11 pages, http://headrush.typepad.com/creating_passionate_users/2001/01/iphone_and_the_.html.
Hilbert et al., "Extracting Usability Information From User Interface Events," ACM Computing Surveys, 2000, pp. 384-421, vol. 32, No. 4, ACM, New York.
IBM, "Image Orientation Sensing and Correction for Notepads," Mar. 19, 2005, ip.com, PriorArtDatabase, Mar. 1, 1993, 2 pages.
IBM, "Kitchen Computer," IBM Technical Disclosure Bulletin, vol. 37, No. 12, Dec. 1994, 5 pages.
IBM, "Personal Computer Environmental Control Via a Proximity Sensor," vol. 36, No. 8, pp. 343-346, Aug. 1, 1993, IBM Technical Disclosure Bulletin.
IBM, "Reminder Pen," IBM Technical Disclosure Bulletin, vol. 36, No. 1, Jan., 1993, 1 page.
Innovation Zen, "10 Reasons Why the iPhone Might Flop," 2007, 6 pages, http://innovationzen.com/blog/2007/01/18/10-reasons-why-the-iphone-might-flop/, retrieved Jul. 23, 2013.
Kim et al., "An Optical Tracker for Augmented Reality and Wearable Computers," IEEE 1997, Proceedings of the 1997 Virtual Reality Annual International Symposium, 5 pages.
Kobayashi et al., "Development of the Touch Switches with the Click Response," Koukuu Denshi Gihou No. 17, Mar. 1994, 10 pages.
Kobayashi et al., "Dynamic Soundscape: Mapping Time to Space for Audio Browsing," Proceedings of CHI '97, Mar. 22-27, 1997, pp. 194-201.
Lai, "Touchpad," Notebook PC Manual, Beijing Acer Information Co., Ltd., Beijing, China, Feb. 16, 2005, 3 pages.
Masui et al., "Elastic Graphical Interfaces for Precise Data Manipulation," CHI '95, 1995, 2 pages, ACM Press.
Mattel, Inc., "Sylvania Intellivision Intelligent Television Master Component Service Manual," Sylvania, 1979, 3 pages.
Mazuryk et al., "Two-Step Prediction and Image Deflection for Exact Head Tracking in Virtual Environments," Eurographics 1995, vol. 14, No. 3, 13 pages.
Millman, et al., "Design of a High Performance Haptic Interface to Virtual Environments," IEEE, 1993, 7 pages.
Mims, "A Few Quick Pointers, Mouses, Touch Screens, Touch Pads, Light Pads, and the Like Can Make Your System Easier to Use," Computers & Electroncis, vol. 22, p. 64, May 1984, 6 pages.
Mitsubishi Electric Research Lab, DiamondSpin Home Page, http://diamondspin.free.fr, 2013, 2 pages.
Nass, "Touchpad Input Device Goes Digital to Give Portable Systems a Desktop 'Mouse-Like' Feel," Electronic Design, No. 44, No. 18, p. 51, Sep. 3, 1996, Penton Publishing Inc. Electronic Design, 2 pages.
National Semiconductor, "Advance Information, FPD94128, 528-CH Small Format a-Si AMLCD Controller / Column Driver with Integrated Frame Buffer," May 2003, 4 pages, National Semiconductor Corporation.
Newton, "MessagePad 2000 User's Manual," 304 pages, 1997, Apple Computer, Inc., Cupertino, CA.
O'Malley, "BellSouth's Communicative Simon is a Milestone in the Evolution of the PDA," Byte.com, Dec. 1994, 5 pages, retrieved from http://www.byte.com/art/9412/sec11/art3.htm.
PCMag, "Apple iPhone Is that the Internet in Your Pocket?," 6 pages, retrieved Jul. 22, 2013 from http://www.pcmag.com/article2/0,2817,2152915,00.asp.
PCMag, "Apple iPhone Luscious Design and Interface," 6 pages, rerieved Jul. 22, 2013 from http://www.pcmag.com/article2/0,2817,2082435,00.asp.
PCMag, "Apple iPhone the iPhone Bottom Line," 5 pages, retrieved Jul. 22, 2013 from http://www.pcmag.com/article2/0,2817,2152919,00.asp.
Perenson, "New & Improved, Articles," PC Magazine, Sep. 10, 1996, 2 pages.
Petersen, "Koalapad Touch Tablet & Micro Illustrator Software," InfoWorld Media Group, Oct. 10, 1983, 3 pages.
Petruzzellis, "Force-Sensing Resistors," Electronics Now, Article, vol. 64, Issue No. 3, Mar. 1993, http://search.ebscohost.com/login.aspx?direct=true&db=aph&AN=9305190116&site=ehost-live&scope=site, 8 pages.
Platt, "Apple iPhone Debut to Flop, Product to Crash in Flames," Suckbusters, 2007, 19 pages, http://suckbusters2.blogspot.com/2007/06/apple-iphone-debut-to-flop-product-to.html.
Porges, "The Futurist: We Predict the iPhone will Bomb," TechCrunch, 2007, 4 pages, http://techcrunch.com/2007/06/07/the-futurist-we-predict-the-iphone-will-bomb/.
Prokopovic, "Electric-Field Contact-less Sensing System, Designer Reference Manual" Freescale Semiconductor, Sep. 2006, 52 pages.
Soderholm, Sensing Systems for 'Touch and Feel', Design News, Aug. 5, 1989, 6 pages.
Spiwak, "A Great New Wireless Keyboard," Popular Electronics, vol. 14, No. 12, Dec. 1997, 8 pages.
Spiwak, "A Pair of Unusual Controllers," Popular Electronics, vol. 14, Issue No. 4, Apr. 1997, 7 pages.
Synaptics, Inc., "Synaptics TouchPad Interfacing Guide," 510-000080-A, Second Edition, Jan. 22, 2001, 93 pages.
Tessler, "Point Pad," Macworld, Oct. 1995, vol. 12, No. 10, p. 87(1), 2 pages, Business & Company Resource Center—News/Magazine Display Page.
Tessler, "Smart Input: How to Choose from the New Generation of Innovative Input Devices," Macworld, vol. 13, No. 5, p. 98(7), May 1996, Business & Company Resource Center-News/Magazine Display Page, 10 pages.
Tessler, "Touchpads," Macworld, vol. 13, No. 2, p. 68(1), Mac Publishing, Feb. 1996, 4 pages.
Triax, Inc., "Triax Custom Controllers Due; Video Game Controllers," HFD—The Weekly Home Furnishings Newspaper, vol. 67, No. 1, 2 pages, Jan. 4, 1993.
Wacom Co., Ltd., "Technology," Saitama, Japan, 2002, 3 pages.
Website, "Common Uses of JavaScript on HP.com," Itsy Pocket Computer Movies available at HP Labs, 2009, Hewlett-Packard Development Company, L.P., 1 page retrieved on Jul. 19, 2013 from http://welcome.hp.com/country/us/en/noscript.html>summaryofsite-wide JavaScript functionality,</a>.
Wikipedia, "IBM Simon," rerieved from http://en.wikipedia.org/wiki/IBM_Simon_(phone) on Nov. 21, 2008, 1 page.
Ziegler, "The LG KE850: Touchable Chocolate," retrieved from http://www.engadget.com/topics/mobile/2006/12/15/the-lg-ke850-touchable-chocolate on Jul. 18, 2013, 3 pages.
Jul. 8, 2011, Complaint by Apple, "Certain Portable Electronic Devices and Related Software," ITC Inv. No. 337-TA-, 35 pages.
Aug. 12, 2011, "Order No. 1—Protective Order," No. 337-TA-797, 11 pages.
Sep. 7, 2011, "HTC's Response," No. 337-TA-797, 29 pages.
Sep. 14, 2011, "Trial Schedule," Order No. 4, Setting Procedural Schedule, Served on Sep. 14, 2011, 7 pages.
Nov. 10, 2011, "Joint Motion of Apple and HTC to Amend Protective Order," Order No. 1, No. 337-TA-797, 22 pages.
Nov. 14, 2010, "Apple's Identification Of Expert Witnesses," No. 337-TA-797, 173 pages.
Nov. 14, 2011, "HTC Identification of Expert Witnesses," No. 337-TA-797, 432 pages.
Dec. 2, 2011, "Order No. 18 Denying Joint Motion To Amend Protective Order," No. 337-TA-797, 5 pages.
Dec. 8, 2011, "Apple First Amended Complaint," No. 337-TA-797, 34 pages.
Dec. 21, 2011, "Apple Motion for Leave To File A Supplemental Identification of Expert Witnesses," No. 337-TA-797, 58 pages.
Dec. 22, 2011, "Joint Motion of Apple and HTC to Amend Protective Order," No. 337-TA-797, 87 pages.
Dec. 23, 2011, "HTC's Supplemental Notice of Prior Art regarding Newly Asserted Claims of U.S. RE '738," No. 337-TA-797, 9 pages.

(56) References Cited

OTHER PUBLICATIONS

Jan. 3, 2012, "HTC Opposition to Apple's Motion For Leave To File A Supplemental Identification Of Expert Witnesses," No. 337-TA-797, 77 pages.
Jan. 18, 2012, "Apple Claim Construction Brief," No. 337-TA-797, 146 pages.
Jan. 18, 2012, "Joint Motion To Amend The Joint Claim Construction Statement," No. 337-TA-797, 78 pages.
Jan. 19, 2012, "Order No. 25: Granting Joint Motion To Amend The Joint Claim Construction Statement," No. 337-TA-797, 3 pages.
Jan. 20, 2012, "Oder No. 26: Granting In Part Unopposed Joint Motion To Amend Protective Order," No. 337-TA-797, 21 pages.
Jan. 23, 2012, "HTC Response to First Amended Complaint," No. 337-TA-797, 31 pages.
Jan. 31, 2012, "Joint Motion of Apple and HTC To Extend Deadline For Technology Stipulation And Exchange Of Demonstrative Exhibits For Markman Hearing Request For Expedited Treatment," No. 337-TA-797, 6 pages.
Feb. 1, 2012, "Order No. 27: Granting Joint Motion to Extend Deadline For Technology Stipulation And Exchange Of Demonstrative Exhibits For The Markman Hearing," No. 337-TA-797, 3 pages.
Feb. 3, 2012, "Pre-Markman Hearing Statement Of Apple," No. 337-TA-797, 21 pages.
Feb. 3, 2012, "Pre-Markman Hearing Statement of HTC," No. 337-TA-797, 18 pages.
Feb. 3, 2012, "Pre-Markman Hearing Statement of Staff," No. 337-TA-797, 3 pages.
Feb. 6, 2012, "Order No. 28: Grantig Joint Unopposed Motion For Leave to File Joint Technology Stipulation One Day Out of Time," No. 337-TA-797, 4 pages.
Feb. 10, 2012, "Apple Markman Demonstrative Public Exhibit List," No. 337-TA-797, 6 pages.
Feb. 10, 2012, "Apple Markman Public Exhibit List," No. 337-TA-797, 9 pages.
Feb. 10, 2012, "Joint Markman Public Exhibit List," No. 337-TA-797, 7 pages.
Feb. 17, 2012, "HTC Tentative Witness List," No. 337-TA-797, 22 pages.
Mar. 30, 2012, "Apple's Motion To Terminate Investigation With Respect to Certain Claims of '915," No. 337-TA-797, 7 pages.
Apr. 26, 2012, "Apple Motion Under Protective Orders For Authorization To Produce Confidential Information In District Court Proceedings," No. 337-TA-797, 91 pages.
May 3, 2012, "Apple's Renewed Motion To Terminate Investigation With Respect to Certain Claims of '915," No. 337-TA-797, 8 pages.
May 15, 2012, "Order No. 52: Initial Determination Granting Renewed Motion To Terminate Investigation With Respect To Certain Claims of '915," No. 337-TA-797, 5 pages.
May 29, 2012, "Notice of Commission Determination Not To Review An Initial Determination Terminating The Investigation As To Certain Asserted Patent Claims," No. 337-TA-797, 3 pages.
Jun. 12, 2012, "Correction Regarding Termination Request for Certain Claims of '915," No. 337-TA-797, 5 pages.
Jun. 22, 2012, "Corrected Notice Of Commission Determination Not To Review An Initial Determination Terminating The Investigation As To Certain Asserted Patent Claims," No. 337-TA-797, 3 pages.
Jun. 25, 2012, "Apple's Unopposed Motion To Terminate Investigation With Respect To Certain Claims," No. 337-TA-797, 10 pages.
Jun. 26, 2012, Order No. 57: Construing the Terms of the Asserted Claims of the Patents at Issue, No. 337-TA-797, 140 pages.
Jun. 26, 2012, "Order No. 58: Initial Determination Granting Motion To Terminate Investigation With Respect To Certain Claims," No. 337-TA-797, 6 pages.
Sep. 5, 2012, "Joint Final Exhibit List," No. 337-TA-797, 31 pages.
Nov. 7, 2012, HTC Notice of Supplemental Authority, No. 337-TA-797, 16 pages.
Nov. 14, 2012, "Order No. 70: Regarding Potential Termination Based Upon Settlement," No. 337-TA-797, 3 pages.
Nov. 27, 2012, "Order No. 73: Denying Without Prejudice The Private Parties' Joint Motion To Terminate," No. 337-TA-797, 7 pages.
Dec. 14, 2012, "Notice of Commission Determination Not To Review An Initial Determination Extending the Target Date By Approximately Three Weeks," No. 337-TA-797, 3 pages.
Jan. 14, 2013, "Notice of Commission Determination Not To Review an Initial Determination Terminating The Investigation; Termination Of Investigation," No. 337-TA-797, 3 pages.
[Video] Agarawala et al., Keepin' It Real: Pushing the Desktop Metaphor with Physics, Piles and the Pen In BumpTop, CHI '06, Youtube, Jun. 2006, (Video) retrieved from http:www.youtube.com/watch?v=M0ODskdEPnQ&list=UUljQ7ysXfuQfLhx-CTOdUtw&index=32&feature=plpp.
[Video] Agarawala, "Bumptop," Ted.com, Mar. 2007, (Video), retrieved from http://www.ted.com/talks/lang/eng/anand_agarawala_demos_his bumptop_desktop.html.
[Video] Agueray, "TED: Ideas Worth Spreading," (Video), 2007.
[Video] Author Unknown, "BumpTop", Jun. 2006, (Video), retrieved from http:www.youtube.com/watch?v=oUVpSY4eBCc&list=UUljQ7ysXfuQfLhx-CTOdUtw&index=31&feature=plpp.
[Video] Author Unknown, "Creating Principle 3D Curves with Digital Tape Drawing," (Video), CHI 2002.
[Video] Author Unknown, "Two Handed Modeling," (Video) [date unavailable].
[Video] Balakrishnan et al., "Digital Tape Drawing," (Video), 1999.
[Video] Balakrishnan et al., "Exploring Interactive Curve and Surface Manipulation Using a Bend and Twist Sensitive Input Strip," (Video), 1999.
[Video] Balakrishnan et al., "ShapeTape Extra," (Video), 1999.
[Video] Balakrishnan et al., "Volumetric User Interfaces," (Video), 2007.
[Video] Balakrishnan et al., The Rockin Mouse—Integral 3D Manipulation on a Plane, (Video), CHI 1999.
[Video] Balakrishnan, "Suggestive Sketching," (Video), CHI 2004.
[Video] Balakrishnan, "Volumetric Selection Talk," (Video) UIST 2006.
[Video] Baudel, "Sketching with Ligne Claire," (Video), 1994.
[Video] Benko et al., "Precise Selection Techniques for Multi-Touch Screens," (Video), ACM SIGCHI 2006.
[Video] Bezerianos et al., "Interaction and Visualization Techniques for Very Large Scale High Resolution Displays," (Video), 2004.
[Video] Bezerianos et al., "Mnemonic Rendering Talk," (Video), UIST 2006.
[Video] Bezerianos et al., "Mnemonic Rendering: An Image-Based Approach for Exposing Hidden Changes in Dynamic Displays," (Video), UIST 2006.
[Video] Bezerianos et al., "The Vacuum: Facilitating the Manipulation of Distant Objects," (Video), CHI 2005.
[Video] Bolinsky, "TED: Ideas Worth Spreading," (Video), 2007.
[Video] BumpTop 1.0—3D Desktop Zen, YouTube, Apr. 2009, (Video) retrieved from http:www.youtube.com/watch?v=eqcmPJ-oVL0&list=UUljQ7ysXfuQfLhx-CTOdUtw&index=27&feature=plpp, (Video).
[Video] BumpTop 3D Desktop Prototype, YouTube, Jun. 2006 (Video), retrieved from http://www.youtube.com/watch?v=M0ODskdEPnQ.
[Video] BumpTop 3D Multi-Touch Desktop, YouTube, Sep. 2009, retrieved from http:/www.youtube.com/watch?v=6jhoWsHwU7w&list=UUljQ7ysXfuQfLhx-CTOdUtw&index=25&feature=plpp, (Video).
[Video] BumpTop for Mac 1.0!, YouTube, Jan. 2010, (Video), retrieved from http:/www.youtube.com/watch?v=GcbymyM3dWo&list=UUljQ7ysXfuQfLhx-CTOdUtw&index=24&feature=plpp.
[Video] BumpTop Mac Leaf through a pile, Vimeo, 2009, (Video), retrieved from http://vimeo.com/8823124.
[Video] BumpTop Multitouch Part 1, YouTube, Jun. 2009, (Video), retrieved from http://www.youtube.com/atch?v=PHUILmC3A1E&list=UUljQ7ysXfuQfLhx-CTOdUtw&iindex=26&feature=plpp.
[Video] BumpTop Touch, Multi-Touch Showcase, Vimeo, 2008, (Video) retrieved from http://vimeo.com/1144121.
[Video] Burtnyk et al., "Stylecam," (Video), UIST 2002.
[Video] Buxton et al., "Issues and Techniques in Touch-Sensitive Tablet Input," (Video), [date not available].
[Video] Buxton, "3D Modeling on Large Displays," (Video), 2001.

(56) References Cited

OTHER PUBLICATIONS

[Video] Buxton, "A Large Hemispheric Interactive Display for Visualization," (Video), 1994.
[Video] Buxton, "A Study in Two-Handed Input," (Video), 1986.
[Video] Buxton, "A Two-Handed Jog Shuttle Control for Digital Film and Animation," (Video), 1994.
[Video] Buxton, "An Informal Study of Selection-Positioning Tasks," (Video), 1982.
[Video] Buxton, "Bimanual Sweeps, Friskets and Stencils in a Digital Paint," (Video), 1995.
[Video] Buxton, "Bom Chameleon with Portfolio Wall," (Video), 2003.
[Video] Buxton, "Boom Chameleon—A Display for 3D Models," (Video), 1998.
[Video] Buxton, "Crosspad Integrated with Design Studio," (Video), 1999.
[Video] Buxton, "Digital Tape Drawing," (Video), 1995.
[Video] Buxton, "Etch—A Study in Marking-Based Interaction," (Video), 1983.
[Video] Buxton, "GEDIT—The Use of Single-Stroke Marks (Marking Menus)," (Video), 1982.
[Video] Buxton, "Portfolio Wall, PDAs and the Society of Devices," (Video), 1999.
[Video] Buxton, "Portfolio Wall," (Video), 1999.
[Video] Buxton, "Studio Paint Utilizing the Existing Skills of the Arist," (Video), 1994.
[Video] Buxton, "Templates on Touch Tablets to Support Virtual Devices," (Video), 1982.
[Video] Buxton, "The Active Desk Prototyping the Future," (Video), 1992.
[Video] Cao et al., "Interacting with Dynamically Defined Information Spaces Using a Handheld Projector and a Pen," (Video), UIST 2006.
[Video] Cao et al., "VisionWand: Interaction Techniques for Large Displays Using a Passive Wand Tracked in 3D," (Video), UIST 2003.
[Video] Fitzmaurice, et al., "A GUI Paradigm Using Tablets, Two-Hands and Transparency," (Video) [date unavailable].
[Video] Fitzmaurice, et al., "Bricks: Laying the Foundation for Graspable User Interfaces," (Video), 1995.
[Video] Fitzmaurice, et al., "Power Wall Stage with Tangible Props for Control," (Video), 1999.
[Video] Forlines, et al., "HybridPointing Talk," (Video) 2006.
[Video] Forlines, et al., "HybridPointing: Fluid Switching Between Absolute and Relative Pointing with a Direct Input Device," (Video), UIST 2006.
[Video] Grossman, "Tovi Grossman on CP24," (Video), 2007.
[Video] Grossman, "Tovi Grossman on Discovery Channel's Daily Planet," (Video), 2007.
[Video] Grossman, et al., "An Interface for Curve Manipulation Using a High Degree of Freedom Curve Input Device," (Video) CHI 2003.
[Video] Grossman, et al., "Hover Widgets: Using the Tracking State to Extend the Capabilities of Pen-Operated Devices," (Video), CHI 2006.
[Video] Grossman, et al., "Interaction Techniques for 3D Modeling on Large Displays," (Video), 2001.
[Video] Grossman, et al., "The Bubble Cursor: Enhancing Target Acquisition by Dynamic Resizing of the Cursor's Activation Area," (Video), CHI 2005.
[Video] Hinrichs, "Hinrichs Siggraph 2005 Videosketch," (Video), 2005.
[Video] ia Sheng et al., "Sculprox: An Interace for Virtual 3D Sculpting via Physical Proxy," (Video), Graphite 2006.
[Video] Khan, et al., "Bimanual 3D Painting," (Video), [date unavailable].
[Video] Malik et al., "Interacting with Large Displays from a Distance with Vision-Tracked Multi-Finger Gestural Input," (Video), UIST 2005.
[Video] Mate, "A Graphical Text Annotation and Editing System," (Video) [date unavailable].
[Video] McGGuffin et al., "Interactive Visualization of Genealogical Graphs," (Video), 2005.
[Video] McGuffin et al. "Using Deformations for Browsing Volumetric Data," (Video), 2003.
[Video] McGuffin et al., "Expand-Ahead: A Space-Filing Strategy for Browsing Trees," (Video), Infovis 2004.
[Video] Mitsubishi Electric Research Lab, FractualZoom Demo (Mandelbrot) at http://www.youtube.com/watch?v=JKWe9U5PHmQ, 2005.
[Video] Mitsubishi Electric Research Lab,"MERL video," 2005, retrieved from http://youtube.com/watch?v=t35HXAjNW6s.
[Video] Mitsubishi Electric Research Lab,"MSGE video," 2005, retrieved from http://video.google.com/videoplay?docid=-388651346883829414.
[Video] Moscovich et al., "Multi-Finger Cursor Techniques," (Video), 2005.
[Video] Moscovich, et al., "A Multi-Finger Manipulation Interface for Performance Animation of Deformable Drawings," (Video), 2005.
[Video ]Ramos et al., "Fluid Interaction Techniques for the Control and Annotation of Digital Video," (Video), UIST 2003.
[Video] Ramos et al., "Pointing Lenses," (Video), CHI 2007.
[Video] Ramos et al., "Pressure Marks," (Video), CHI 2007.
[Video] Ramos et al., "Zliding: Fluid Zooming and Sliding for High Precision Parameter Manipulation," (Video) UIST 2005.
[Video] Scott, "Scott Dissertation 2005 Storagebinvideo," (Video), 2005.
[Video] Singh et al., "Visualizing 3D Scenes Using Non-Linear Projections and Data Mining of Previous Camera Movements," (Video), 2004.
[Video] tabulaTouch, "TabulaMaps Running on a TabulaTouch—Interactive Multi-Touch Table," (Video), available on YouTube (http://www.youtube.com/watch?v=12oMmCyiJZA), 2006.
[Video] TactaPad, "TactaDrawSmall," (Video), 2005.
[Video] TactaPad, "TactaPadIntroSmall," (Video), 2005.
[Video] Tactex Controls, Inc., "Flip Keyboard," (Video), 1982.
[Video] Vogel et al., "Distant Freehand Pointing and Clicking on a Very Large, High Resolution Display," (Video) UIST 2005.
[Video] Vogel et al., "Interactive Public Ambient Displays: Transitioning from Implicit TO Explicit, Public to Personal, Interaction with Multiple Users," (Video), UIST 2004.
[Video] Vogel et al., "Occlusion-Aware Interlaces," (Video), CHI 2010.
[Video] William et al., "A Multi-Touch Three Dimensional Touch-Sensitive Tablet," (Video), 1985.
[Video] Wilson, "Robust Computer Vision-Based Detection of Pinching for One and Two-Handed Gesture Input," (Video), UIST 2006.
[Video] Wu et al., "Multi-Finger and Whole Hand Gestural Interaction Techniques for Multi-User Tabletop Displays," (Video), UIST 2003.
[Video] Zhao et al., "Simple vs. Compound Mark ierarchical Marking Menus," (Video), UIST 2004.
Aboelsaadat et al., "An Empirical Comparison of Transparency on One and Two Layer Displays,"pp. 1-20, [no date available].
Advance Information, "FPD94128, 528-CH Small Format a-Si AMLCD Controller/Column Driver with Integrated Frame Buffer," 2003, 4 pages, National Semiconductor Corporation.
Agarawala et al., "Keepin' It Real: Pushing the Desktop Metaphor with Physics, Piles and the Pen," CHI 2006, Apr. 22-27, 2006, 10 pages, Montreal, Quebec, Canada.
Agarawala, "Anand Agarawala Demos BumpTop," Video on TED.com, TED ideas worth spreading, Sep. 2011, 7 pages, http://www.ted.com/index.php/talks/anand_agarawala_demos_his_bumptop_desktop.html.
Agarawala, "Enriching the Desktop Metaphor with Physics, Piles and the Pen," Thesis, 2006, 102 pages, Association for Computing Machinery, Inc.
Ahmad, "A Usable Real-Time 3D Hand Tracker," 5 pages, Interval Research Corporation, Palo Alto, CA, [no date available].
Aliakseyeu et al., "A Computer Support Tool for the Early Stages of Architectural Design," Elsevier, Interacting with Computers 18, 2006, pp. 528-555.

(56) References Cited

OTHER PUBLICATIONS

Aliakseyeu et al., "Multi-Flick: An Evaluation of Flick-Based Scrolling Techniques for Pen Interfaces," CHI 2008 Proceedings: Pointing and Flicking, Apr. 5-10, 2008, pp. 1689-1698, Florence, Italy.
Amershi, et al., "Multiple Mouse Text Entry for Single-Display Groupware," CSCW 2010, Feb. 6-10, 2010, pp. 169-178, Savannah, GA.
Amon et al., "Concurrent Design and Analysis of the Navigator Wearable Computer System: The Termal Perspective," IEEE Transactions on Components, Packaging, and Manufacturing Technology-Part A, vol. 18, No. 3, Sep. 1995, pp. 567-577.
Analog Devices, "Programmable Capacitance-to-Digital Converter with Environmental Compensation," 2005, 64 pages, Preliminary Technical Data AD7142/AD7142-1.
Analog Devices,"Single Chip Accelerometer with Signal Conditioning," 1996, 20 pages.
Angel, "Interactive Computer Graphics," 1997, 566 pages, Addison-Wesley Publishing Company, Reading, MA.
Apple Inc., "Form 10-K Annual Report," Dec. 3, 2004, 132 pages EDGAR Online.
Apple, "Cocoa Event-Handling Guide," Data Management: Event Handling, Oct. 7, 2009, 108 pages, Apple, Inc.
ASMA, "Shaping the Future of 3-D," The Varsity Online, Dec. 3, 2002, 3 pgs., University of Toronto, http://www.dgp.toronto.edu/~ravin/press/Varsity20020924.htm[Sep. 14, 2011 12:53:03 PM].
AT&T, "HTC Freestyle," Quick Start, 2 pages, 2010.
AT&T, "HTC HD7S," Quick Start, 4 pages, 2011.
AT&T, "HTC Jetstream," Quick Start, 4 pages, 2011.
AT&T, "HTC Status," Quick Start, 4 pages, 2011.
AT&T, "HTC Titan," Quick Start, 4 pages, 2011.
AT&T, "HTC Vivid," Quick Start, 4 pages, 2011.
Author Unknown, "Chart of Spatial Keyframing, Traditional Interfaces, Interface Techniques, 3D Control and Visulation and Ongoing Work," 1 page [No Date Available].
Author Unknown, "Communication Arts," Interactive Annual 10, Sep./Oct. 2004, 215 pages, vol. 46, No. 5, Coyne & Blanchard, Menlo Park, USA.
Author Unknown, "Communication Arts," Interactive Annual 11, Sep./Oct. 2005, 212 pages, vol. 47, No. 5, Coyne & Blanchard, Meno Park, USA.
Author Unknown, "Communication Arts," Interactive Annual 12, Sep./Oct. 2006, 207 pages, vol. 48, No. 5, Coyne & Blanchard, Menlo Park, USA.
Author Unknown, "Communication Arts," Interactive Annual 9, Sep./Oct. 2003, 208 pages, vol. 45, No. 5, Coyne & Blanchard, Menlo Park, USA.
Author Unknown, "Communication Arts," Sep./Oct. 2001, 247 pages, vol. 43, No. 5, Coyne & Blanchard, Menlo Park, USA.
Author Unknown, "Error and Coupling: Extending Common Ground to Improve the Provision of Visual Information for Collaborative Tasks," pp. 1-35 [No Date Available].
Author Unknown, "Pressure Adds Depth to Displays," An MIT Enterprise Technology Review, 2004, 2 pages, Technology Research News, http://www.dpg.toronto.edu/-ravin/press/MIT-TechReview20040621.htm.
Author Unknown, Articles, "Hardware-Just Tilt to Enter Text, and Software-Digital Darwin," Innovation News, 2003, p. 24, Technology Review.
Azuma et al., "Improving Static and Dynamic Registration in an Optical See-through HMD," SIGGRAPH '94, 1994, 17 pages, ACM, Orlando, FL.
Bach, "The Desgin of the Unix Operating System," 1986, 489 pages, Prentice-Hall, Inc., Englewood Cliffs, NJ.
Bae et al., "EverybodyLovesSketch: 3D Sketching for a Broader Audience," UIST '09, 2009, pp. 59-68, ACM, Victoria, British Columbia, Canada.
Bae et al., "ILoveSketch: As-Natural-As-Possible Sketching System for Creating 3D Curve Models," UIST '08, 2008, pp. 151-160, ACM, Monterey, California.
Baecker et al., "Readings in Human-Computer Interaction: A Multidisciplinary Approach," 1987, 752 pages, Morgan Kaufmann Publishers, Inc., Los Altos, CA.
Baecker et al., "Readings in Human-Computer Interaction: Toward the Year 2000," Second Edition, 1995, 964 pages, Morgan Kaufmann Publishers, Inc., San Francisco, CA.
Baecker et al., "The University of Toronto Dynamic Graphics Project," 2 pages, Computer Systems Research Institute, University of Toronto.
Baguley, "Nokia's Small, Svelte, Internet-Savvy PDA," Jan. 31, 2006, 2 pp., PCWorld, http://www.pcworld.com/article/124456/nokias_small_svelte_internetsavvy_pda.html.
Balakrishman, et al., "Symmetric Bimanual Interaction," ACM CHI 2002 Conference, CHI Letters, vol. 2, No. 1, pp. 33-40, New York, NY.
Balakrishnan et al., "Digital Tape Drawing," to appear in Proceedings of ACM UIST '99 Symposium on User Interface Software and Technology, 1999, pp. 1-9, ACM.
Balakrishnan et al., "Exploring Bimanual Camera Control and Object Manipulation in 3D Graphics Interfaces," Proceedings of the 1999 ACM Conference on Human Factors in Computing Systems (CHI '99), 1999, pp. 56-63, ACM.
Balakrishnan et al., "Exploring Interactive Curve and Surface Manipulation Using a Bend and Twist Sensitive Input Strip," Proceedings of the 1999 ACM Symposium on Interactive 3D Graphics (I3DG'99), 1999, pp. 111-118, ACM.
Balakrishnan et al., "Performance Differences in the Fingers, Wrist, and Forearm in Computer Input Control," CHI 97, 1997, 8 pages, ACM, Atlanta, GA.
Balakrishnan et al., "The PadMouse: Facilitating Selection and Spatial Positioning for the Non-Dominant Hand," Proceedings of the 1998 ACM Conference on Human Factors in Computing Systems (CHI '98), 1998, pp. 9-16, ACM.
Balakrishnan et al., "The Rockin'Mouse: Integral 3D Manipulation on a Plane," Proceedings of the 1997 ACM Conference on Human Factors in Computing Systems (CHI '97), 1997, pp. 311-318, ACM.
Balakrishnan et al., "User Interfaces for Volumetric Displays," Computer, 2001, pp. 37-45, IEEE.
Balakrishnan et al., "Virtual Hand Tool With Force Feedback," Interactive Posters, Conference Companion, CHI '94, Apr. 24-28, 1994, 2 pages, Boston, MA.
Balakrishnan, "Beating" Fitts' Law: Virtual Enhancements for Pointing Facilitation, Int. J. Human-Computer Studies, 2004, vol. 61, pp. 857-874.
Balakrishnan, "Performance Differences in the Fingers, Wrist, and Forearm in Computer Input Control," Proceedings of the ACM Conference on Human Factors in Computing Systems (CHI '97), pp. 303-310, 1997, 9 pages.
Balakrishnan, "Publications," 2011, 15 pages, http://www.dgp.toronto.edu/~ravin/.
Balakrishnan, "The Role of Kinesthetic Reference Frames in Two-Handed Input Performance," UIST 1999, ACM Symposium on User Interface Software and Technology, CHI Letters, 1999, vol. 1, No. 1, pp. 171-178, ACM, New York.
Barret et al., "Filters and Other Touch Screen Enhancements," 8 pages, iTouchInternational [No Date Available].
Bartlett et al., "The Itsy Pocket Computer," 2000, 24 pages, Western Research Laboratory, Palo Alto, CA.
Bartlett et al., "The Itsy Pocket Computer," Oct. 19, 1998, 15 pages, http://www.hpl.hp.com/downloads/crl/itsy/talk-iswc98/sld001.html.
Bartlett, "Rock 'n' Scroll is Here to Stay" [Abstract only], Computer Graphics and Applications, IEEE, May/Jun., 2000, pp. 40-45, vol. 20, Issue 3, 1 page, as described in IEEE Xplore [http://ieeexplore.ieee.org/xpl/freeabs_all.jsp?amumber=844371[Feb. 5, 2011 15:34:48]].
Bartlett, "Rock 'n' Scroll is Here to Stay," May, 2000, 9 pages, Western Research Laboratory, Palo Alto, CA.
Bartlettet al., "Itsy: An Open Platform for Pocket Computing Research," Jul. 1998, 21 pages, http://www.hpl.hp.com/downloads/crl/itsy/talk-old/sld001.html.
Baxter, "Capacitive Sensors," Jun. 26, 2000, 17 pages.

(56) References Cited

OTHER PUBLICATIONS

Beck et al., "Two Devices for Operator Interaction In the Central Control Of The New CERN Accelerator," May 24, 1973, 18 pages, Geneva.
Bederson et al., "Jazz: An Extensible 2D+Zooming Graphics Toolkit in Java," HCIL Technical Report No. 99-07, May, 1999, 10 pages, Human-Computer Interaction Lab, University of Maryland, College Park, MD.
Bederson et al., "Jazz: An Extensible Zoomable User Interface Graphics Toolkit in Java," 11 pages, Human-Computer Interaction Lab, University of Maryland, College Park, MD [No Date Available].
Bederson et al., "Pad++: A Zooming Graphical Interface for Exploring Alternate Interface Physics," UIST'94, Nov. 2-4, 1994, 10 pages, ACM.
Benko et al., "Precise Selection Techniques for Multi-Touch Screens," CHI 2006, Apr. 22-28, 2006, 10 pgs., ACM, Montreal, Quebec, Canada.
Benko et al., "Sphere: Multi-Touch Interactions on a Spherical Display," UIST '08, Oct. 19-22, 2008, pp. 77-86, ACM, Monterey, California.
Bennett et al., "Communication Arts," vol. 48, No. 5, Sep./Oct. 2006, 207 pages.
Bezerianos et al., "Interaction and Visualization Techniques for Very Large Scale High Resolution Displays, DGP-TR-2004-002" Jul. 21, 2004, 11 pages, UIST.
Bezerianos et al., "Mnemonic Rendering: An Image-Based Approach for Exposing Hidden Changes in Dynamic Displays," UIST '06, Oct. 15-18, 2006, 10 pgs., ACM, Montreux, Switzerland.
Bezerianos et al., "The Vacuum: Facilitating the Manipulation of Distant Objects," CHI 2005, Apr. 2-7, 2005, 10 pages, ACM, Portland, OR.
Bezerianos et al., "View and Space Management on Large Displays," Jul./Aug. 2005, 10 pages, IEEE Computer Society.
Bi et al., "Comparing Usage of a Large High-Resolution Display to Single or Dual Desktop Displays for Daily Work," CHI 2009 Proceedings: Large Displays/Multi-Display Environments, Apr. 4-9, 2009, pp. 1005-1014, ACM, Boston, Massachusetts.
Bi, "An Exploration of Pen Rolling for Pen-Based Interaction," UIST '08, Oct. 19-22, 2008, pp. 191-200, ACM, Monterey, California.
Bi, et al., "Effects of Interior Bezels of Tiled-Monitor Large Displays on Visual Search, Tunnel Steering, and Target Selection," ACM, Apr. 10-15, 2010, pp. 65-74, CHI 2010: Making Meaning in Large Displays, Atlanta, GA.
Bic et al., "The Logical Design of Operating Systems," Second Edition, 1988, 387 pages, Prentice Hall, Englewood Cliffs, NJ.
Bier et al., "A Taxonomy of See-Through Tools," Proceedings of CHI '94, 1994, 12 pages.
Bier et al., "Snap-Dragging," vol. 20, No. 4, Aug. 18-22, 1986, 8 pp., ACM, Dallas, TX.
Bier et al., "Toolglass and Magic Lenses: The See-Through Interface," Proceedings of SIGGRAPGH '93, 1993, 15 pages.
Bier, "Snap-Dragging: Interactive Geometric Design in Two and Three Dimensions," May 19, 1988, 170 pages.
Biesen, "Cooking Collision," Aug. 2005, 8 pages, http:www.appliancemagazine.com/zones/supplier/20_finishing/editorial.php?artide=10.
Birnholtz et al., "An Exploratory Study of Input Configuration and Group Process in a Negotiation Task Using a Large Display," CHI 2007 Proceedings: Large Displays, Apr. 28-May 3, 2007, pp. 91-100, ACM, San Jose, California.
Birnholtz et al., "Using Motion Tracking Data to Augment Video Recordings in Experimental Social Science Research," journal, date, and publication information unknown, 10 pgs. [No Date Available].
Blasko et al., "Single-Handed Interaction Techniques for Multiple Pressure-Sesnitive Strips," CHI 2004, Apr. 24-29, 2004, 4 pages, ACM, Vienna, Austria.
Bleser et al., "Charcoal Sketching: Returning Control to the Artist," ACM Transactions on Graphics, vol. 7, No. 1, Jan. 1988, pp. 76-81, ACM.
Bleser et al., "Toto: A Tool for Selecting Interaction Techniques," 1990, 8 pages, ACM.
Blount, "Orange Scribble," Howard Forums Mobile Community, accessed at http://www.howardforums.com/shrowthread.php/31351-New-P800-P900-app-OrangeScri . . . , Oct. 7, 2011, 4 pages.
Bohn, "Computer-Aided Design I Term Papers," Virginia Tech, 1997, 38 pages.
Boie, "Capacitive Impedance Readout Tactile Image Sensor," IEEE, 1984, 9 pages, Bell Laboratories, Murray Hill, NJ.
Bolognesi et al., "Introduction to the ISO Specification Language LOTOS," 1987, 35 pages, Elsevier Science Publishers B.V., North-Holland.
Borman et al., "Human Factors in Computing Systems," 1985, 221 pages, CHI '85 Conference Proceedings, Apr. 14-18, 1985, San Francisco, Special Issue of the Sigchi Bulletin.
Boulic et al., "Multi-Finger Manipulation of Virtual Objects," Proceedings of ACM Symposium on Virtual Reality Software and Technology (VRST '96), Jul. 1996, pp. 67-74, ACM, Hong Kong.
Bowman, "The Slippery Desktop," cbc.ca, CBC News Indepth: Tech, 2006, 3 pgs., http://www.dgp.toronto.edu/~ravin/press/CBC20060629bumptop.html[Sep. 14, 2001 12:46:50 PM].
Brooks et al., "Advanced Technology for Portable Personal Visualization," Jan-Jun. 1992, 119 pages.
Brose et al., "Java Promgramming with COBRA," Third Edition, 2001, 745 pages, Wiley Computer Publishing, New York.
Brown et al., "Windows on Tablets as a Means of Achieving Virtual Input Devices," Human-Computer Interaction—INTERACT '90, 1990, pp. 675-681, Elsevier Science Publishers B.V., Amsterdam, Holland.
Browne et al., "Designing a Collaborative Finger Painting Application for Children," 8 pages, Human-Computer Interaction Lab, University of Maryland, College Park, MD [No Date Available].
Burtnyk et al., StyleCam: Interactive Stylized 3D Navigation using Integrated Spatial & Temporal Controls, Published in ACM CHI Letters, 4(2), pp. 101-110, ACM UIST 2002 Symposium on User Interface Software & Technology.
Butler, "Portable MP3: The Nomad Jukebox," Jan. 8, 2001, 5 pages, http://tidbits.com/article/6261.
Buxton et al, "A Study In Two-Handed Input," Proceedings of CHI '86, 1986, 9 pages, University of Toronto.
Buxton et al., "A Computer-Based System for the Performance of Electroacoustic Music," 1979, 10 pages, An Audio Engineering Society Preprint.
Buxton et al., "A Microcomputer-based Conducting System," 14 pages, Structured Sound Synthesis Project, Computer Systems Research Group, University of Toronto, Toronto, Ontario, CA [no date available].
Buxton et al., "Continuous Hand-Gesture Driven Input," Proceedings of Graphics Interface'83, 9th Conference of the Canadian Man-Computer Communiations Society, 1983, pp. 191-195, Edmonton, Canada.
Buxton et al., "EuroPARC's Integrated Interactive Intermedia Facility (IIIF): Early Experiences," Multiuser Interfaces and Applications, Proceedings of the IFIP WG 8.4 Conference on Multi-User Interfaces and Applications, 1990, pp. 11-34, Elsevier Science Publishers B.V., Amsterdam, Holland.
Buxton et al., "Issues and Techniques in Touch-Sensitive Tablet Input," SIGGRAPH, Jul. 22-26, 1985, vol. 19, No. 3, 10 pages, San Francisco, CA.
Buxton et al., "Iteration in the Design of the Human-Computer Interface," Proceedings of the 13th Annual Meeting, Human Factors Association of Canada, 1980, pp. 72-81.
Buxton et al., "Large Displays in Automotive Design," IEEE Computer Graphics and Applications, Jul./Aug. 2000, pp. 68-75, IEEE.
Buxton et al., "Objed and the Design of Timbral Resources," Computer Music Journal, 1982, vol. 6, No. 2, pp. 32-44, Massachusetts Institute of Technology, MA.
Buxton et al., "Scope in Interactive Score Editors," Computer Music Journal, 1981, vol. 5, No. 3, Massachusetts Institute of Technology, MA.
Buxton et al., "The Evolution of the SSSP Score Editing Tools," Computer Music Journal 3(4), 14-25, 1979; reprinted in: 1985, The Evolution of the SSSP Score Editing Tools, In Roads, C. & Strawn, J.,

(56) References Cited

OTHER PUBLICATIONS

1985, Foundations of Computer Music, MIT Press, Cambridge, MA, 376-402; accessed from http://www.billbuxton.com/SSSP.html Sep. 14, 2011, 17 pages.
Buxton et al., "The Use of Hierarchy and Instance in a Data Structure for Computer Music," Computer Music Journal, vol. II, No. 4, 11 pages.
Buxton et al., "Towards A Comprehensive User Interface Management System," Computer Graphics, Jul. 1983, vol. 17, No. 3.
Buxton et al.,"An Introduction to the SSSP Digital Synthesizer," 11 pages, vol. II, No. 4, Computer Music Journal, Menlo Park, CA [No Date Available].
Buxton, "31.1: Invited Paper: A Touching Story: A Personal Perspective on the History of Touch Interfaces Past and Future," Society for Information Display (SID) Symposium Digest of Technical Papers, 2010, pp. 444-448, May 2010, vol. 41(1), Session 31.
Buxton, "A Composer's Introduction to Computer Music," Interface, 1977, pp. 57-72, vol. 6.
Buxton, "A Three-State Model of Graphical Input," Human-Computer Interaction—INTERACT '90, 1990, pp. 449-456, Elsevier Science Publishers B.V., Amsterdam, Holland.
Buxton, "Absorbing and Squeezing Out: On Sponges and Ubiquitous Media," Proceedings of the International Broadcasting Symposium, 1996, pp. 91-96 [http://www.billbuxton.com/sponges.html].
Buxton, "An Informal Study of Selection-Positioning Tasks," Proceedings of the Graphics Interface '82, 8th Conference of the Canadian Man-Computer Communications Society, 1982, pp. 323-328, Toronto, Canada.
Buxton, "Integrating The Periphery and Context: A New Taxonomy of Telematics," Proceedings of Graphics Interfaces '95, 1995, pp. 239-246 [http://www.billbuxton.com/BG_FG.html].
Buxton, "Introduction to This Special Issue on Nonspeech Audio," Human-Colmputer Interaction, 1989, pp. 1-9, vol. 4, Lawrence Erlbaum Associates, Inc.
Buxton, "Lexical And Pragmatic Considerations of Input Structures," Computer Graphics 17(1), 1983, 9 pages.
Buxton, "Living in Augmented Reality: Ubiquitous Media and Reactive Environments," Video Mediated Communication, 1997, pp. 363-384, Erlbaum, Hillsdale, NJ [http://www.billbuxton.com/augmentedReality.html].
Buxton, "Masters and Slaves Versus Democracy: MIDI and Local Area Networks," Proceedings of the 5th International Conference on Music and Digital Technology, May 1-3, 1987, 8 pages, Audio Engineering Society, Anaheim, CA.
Buxton, "Metaphors that Keep Us on the Periphery," Human Computer Interaction, 1994, 3 pages, http://www.billbuxton.com/metaphors.html.
Buxton, "Performance by Design: The Role of Design in Software Product Development," Oct. 26-29, 2003, pp. 1-15.
Buxton, "Telepresence: Integrating Shared Task and Person Spaces," Proceedings of Graphics Interface '92, pp. 123-129 [http://www.billbuxton.com/shared_space.html].
Buxton, "The 'Natural' Language of Interaction: A Perspective on Non-Verbal Dialogues," 1988, pp. 428-438, vol. 26, No. 4, Canadian Journal of Operations Research and Information Processing [http://www.billbuxton.com/natural.html].
Buxton, "The Long Nose of Innovation," Bloomberg Businessweek, BusinessWeek.com, Jan. 2, 2008, 7 pgs., http://www.businessweek.com/innovate/content/jan2008/id2008012_297369.htm[Sep. 7, 2011 4:31:15 PM].
Buxton, "Thought on the State of 3D CG in Film and Video," May/Jun. 2005, 4 pages, IEEE Computer Society.
Buxton, "Using Our Ears: An Introduction to the Use of Nonspeech Audio Cues," Extracting Meaning From Complex Data: Processing, Display, Interaction, 1990, 2 pgs., Proceedings of the SPIE, vol. 1259.
Buxton., "Chunking and Phrasing and the Design of Human-Computer Dialogues," Proceedings of the IFIP World Computer Congress, 1986, 9 pages, Dublin, Ireland.
Cao et al., "Evaluation of an On-line Adaptive Gesture Interface with Command Predicition," 8 pages, University of Toronto [No Date Available].
Cao et al., "Flashlight Jigsaw: An Exploratory Study of an Ad-Hoc Multi-Player Game on Public Displays," CSCW '08, Nov. 8-12, 2008, pp. 77-86, ACM, San Diego, California.
Cao et al., "Interacting with Dynamically Defined Information Spaces Using A Handheld Projector and a Pen," UIST '06, Oct. 15-18, 2006, pp. 225-234, ACM, Montreux, Switzerland.
Cao et al., "Multi-User Interaction Using Handheld Projectors," UIST '07, Oct. 7-10, 2007, pp. 43-52, ACM, Newport, Rhode Island.
Cao et al., "Peephole Pointing: Modeling Acquisition of Dynamically Revealed Targets," CHI 2008 Proceedings: Pointing and Flicking, Apr. 5-10, 2008, pp. 1699-1708, ACM, Florence, Italy.
Cao et al., "ShapeTouch: Leveraging Contact Shape on Interactive Surfaces," IEEE Int'l. Workshop on Horizontal Interactive Human Computer System (Tabletop), 2008, 139-146, IEEE.
Cao et al., "VisionWand: Interaction Techniques for Large Displays using a Passive Wand Tracked in 3D," 2003 ACM, pp. 173-182, UIST, Vancouver, BC, Canada.
Captain, "Future Gear: Keyless (Data) Entry," Apr. 24, 2002, 7 pages, http://www.pcworld.com/article/95263/future_gear_keyless_data_entry.html.
Carlson, "Multiphase Flow Measurements Using Ultrasound," December, LuLea University of Technology, 1999, 55 pages.
Carpendale et al., "Collaborative Interaction on Large Tabletop Displays," CSCW 2006, Nov. 4-8, 2006, pp. 57-58, Banff, Alberta, Canada.
Carpendale, "Roles of Orientation in Tabletop Collaboration: Comprehension, Coordination and Communication," 33 pages, Univserity of Calgary, Alberta, Canada [No Date Available].
Carr et al., "The Power of PenPoint," 1991, 357 pages, Addison-Wesley Publishing Company, Inc.
Casiez et al., "The Impact of Control-Display Gain on User Performance in Pointing Tasks," Human-Computer Interaction, 2008, pp. 215-250, vol. 23:3, Taylor & Francis (online), http://dx.doi.org/10.1080/07370020802278163.
CEI IEC, "Low-Voltage Switchgear and Controlgear—Part 5-2: Control Circuit Devices and Switching Elements—Proximity Switches," 1997, International Standard, Second Edition, 182 pages.
CENA, "DigiStrips humaniser les interfaces," 1 page, Toulouse, France [No Date Available].
Cern Courier, "The First Capacitative Touch Screens at CERN," Mar. 31, 2010, 8 pages, http://www.cerncourier.com/cws/artcle/cem/42092.
Chang et al., "Animation: From Cartoons to the User Interface," SMLI Technical Report, Mar. 1995, 18 pgs., Sun Microsystems Laboratories, Mountain View, CA.
Chang et al., "Communication Arts," vol. 47, No. 5, Sep./Oct. 2005, 212 pages.
Chen et al., "A Study in Interactive 3-D Rotation Using 2-D Control Devices," Computer Graphics, vol. 22, No. 4, Aug. 1988, 9 pages, ACM.
Cheng et al., "Navigation Control and Gesture Recognition Input Device for small, Portable User Interfaces," Jun. 11, 2004, 14 pages, Synaptics Incorporated.
Christensen et al., "Frameworks in CS1—a Different Way of Introducing Event-driven Programming," ITiCSE '02, Jun. 24-26, 2002, 5 pages, ACM, Aarhus, Denmark.
Chu et al., "Featherweight Multimedia for Information Dissemination," manuscript, 11 pgs.
Chu et al., "Haptic Conviction Widgets," Graphics Interface Conference, May 25-27, 2009, pp. 207-210, ACM, Kelowna, British Columbia.
Chun et al., "A High-Performance Silicon Tactile Imager Based on a Capactivie Cell," IEEE Transactions on Electron Devices, Jul. 1985, vol. ED-32, No. 7, 6 pages.
Cooperstock et al., "Evolution of a Reactive Environment," Proceedings of the ACM Conference on Human Factors in Computing Systems (CHI '95), 1995, pp. 170-177, ACM, New York [http://www.billbuxton.com/ReadEnv.html].
Cooperstock et al., "Reactive Environments," Communications of the ACM, Sep. 1997, pp. 65-73, vol. 40, No. 9.

(56) References Cited

OTHER PUBLICATIONS

Crowley Milling, "How CERN broke the software barrier," New Scientist 29, vol. 75, No. 1071, Sep. 1977, 3 pages.
Culwin, "A Java GUI Programmer's Primer," 1998, 337 pages, Prentice-Hall, Upper Saddle River, NJ.
Dannenberg et al., "A Gesture Based User Interface Prototyping System," 1989, 6 pages, ACM.
Davidson et al., "Synthesis and Control on Large Scale Multi-Touch Sensing Displays," NIME 06, Jun. 4-8, 2006, Proceedings of the 2006 International Conference on New Interfaces for Musical Expression, pp. 216-219, Paris, France.
Davies, "Lateral histograms for efficient object location: Speed versus ambiguity," Pattern Recognition Letters, vol. 6, No. 3, Aug. 1987, 10 pages, Elsevier Science Publishers B.V., North Holland.
Davies, "Machine Vision: Theory, Algorithms, Practicalities," 1990, 568 pages, Academin Press Inc., San Diego, CA.
Davis, "Flash To The Core An Interactive Sketchbook," 2003, 20 pages, New Riders Publishing, USA.
Deitel et al., "Java How to Program Fourth Edition," 1995, 1383 pages, Prentice-Happ, Inc., Upper Saddle River, NJ.
Deitel, et al., "Java How to Program, Fourth Edition," 2002, Prentice Hall, Upper Saddle River, NJ.
den Boer, "Active Matrix Liquid Crystal Displays, Fundamentals and Applications," 2005, 6 pages, Elsevier, Inc., Oxford, UK.
Denning, "The Invisible Future," 2002, 363 pages, McGraw-Hill, NY.
Dietz et al., "DT Controls: Adding Identity to Physical Interfaces," UIST '05, 2005, 8 pages, ACM, Seattle, WA.
Dietz et al., "Submerging Technologies," 1 page, Mitsubishi Electric Research Labs [No Date Available].
Dietz et al., DiamondTouch: A Multi-User Touch Technology, Oct. 2003, 10 pages, Mitsubishi Electric Research Laboratories, Inc., Cambridge, MA.
DigiStrips, "DigiStrips, or electronic strips on touch screens," Mar. 2001, 4 pages, mhtml:file://:S\DFSR_DATA/Data01\051900\Prior Art\915\00—Michael Kobayashi\10.1 . . .
Digital Image Fest, "Your Computer Animation Festival To Go," Jun. 30, 2006, 1 page, http://www.dgp.toronto.edu/~ravin/press/DigitalImageFestEpisode005.html.
Dolan et al., "Communication Arts," vol. 43, No. 5, Sep./Oct. 2001, 247 pages.
Dragicevic et al., "Video Browsing by Direct Manipulation," CHI 2008 Proceedings: Improved Video Navigation and Capture, Apr. 5-10, 2008, pp. 237-246, ACM, Florence, Italy.
DSNA, "Activity related to Vigiestrips: study of a support of flight plan information devised for the benefit of the Watchtower," 2011, 4 pages, mhtml:file://S:\DFSR_DATA/Data01\051900\Prior Art\915\00—Michael Kobayashi\10.1 . . . [no date available].
DSNA, "Vigiestrips Making Strips a part of A-SMGCS," 14 pp., CENA [No Date Available].
DSNA, "Vigiestrips," 2001, 2 pages, Bertin Technologies.
Dubroy et al., "A Study of Tabbed Browsing Among Mozilla Firefox Users," ACM, 2010, pp. 673-682, CHI Apr. 10-15, 2010: Browsing, Atlanta, GA.
Duce et al., "An Approach to Hierarchical Input Devices," 1980, 16 pages, Rutherford Appleton Laboratory, Chilton, Didcot, Oxon, UK.
Duce et al., "Components, Frameworks and GKS Input," 1980, 20 pages, Rutherford Appleton Laboratory, Chilton, Didcot, Oxon, UK.
Dupont et al., "Automatic Identification of Environment Haptic Properties," accepted for publication in Presence: Teleoperators and Virtual Environments, Mar. 1999, 27 pgs.
Elo Touch Systems, "Corporate Facts at a Glance Tyco Electronics," 2011, 2 pages, http://www.elotouch.com/AboutElo/Facts/defaultasp.
Elo Touchsystems, "CarrollTouch Infrared Touch Technology," 2011, 4 pages, http://www.elotouch.com/Technologies/CarrollTouch/default.asp.
Elo Touchsystems, Elo IntelliTouch/Secure Touch Touchscreen Guide, 1989, 105 pages, Elo TouchSystems, Inc.
Elo Touchsystems, "MonitorMouse for Macintosh Release 3.0," Nov. 21, 1997, 1 page, http://www.elotouch.com/Products/Updates/pmb000152.asp.
Elo Touchsystems, "Projected Capacitive," 2006, 2 pages, Tyco Electronics Corporation Elo-152 3106.
Elo Touchsystems, "Touchscreen, touchmonitor and other touch product updates," 2011, 13 pages, http://www.elotouch.com/Products/Updates.
Englander, "Developing Java Beans," 1997, 326 pages, O'Reilly, Sebastopol, CA.
EPP, "Prelude to Patterns in Computer Science Using Java Beta Edition," 2001, 972 pages, Franklin, Beedle & Associates, Incorporated, Wilsonville, OR.
Epps et al., "A Study of Hand Shape Use in Tabletop Gesture Interaction," CHI 2006, Apr. 22-27, 2006, 6 pages, ACM, Montreal, Quebec, Canada.
Ergonomic Requirements for Office Work with Visual Display Terminals (VDTs), 2000, 54 pages.
Erickson, "Working with Interface Metaphors," The Art of Human-Computer Interface Design, 1990, pp. 65-73, Addison-Wesley/Apple Computer, Inc., Castleton, NY.
Esenther et al., "DiamondTouch SDK: Support for Multi-User, Multi-Touch Applications," CSCW 2002 Demo, Nov. 2002, 5 pages, Mitsubishi Electric Research Laboratories, Inc., Cambridge, MA.
Esenther et al., "Fluid DTMouse: Better Mouse Support for Touch-Based Interactions," AVI, May 2006, 5 pages, Mitsubishi Electric Research Laboratories, Inc., Cambridge, MA.
Esenther et al., "Multi-User Multi-Touch Games on DiamondTouch with the DTFlash Toolkit," Intelligent Technologies for Interactive Entertainment 2005, Dec. 2005, 5 pages, Mitsubishi Electric Research Laboratories, Inc., Cambridge, MA.
Esenther et al., "RemoteDT: Support for Multi-Site Table Collaboration," CollabTech 2006, Jul. 2006, 7 pages, Mitsubishi Electric Research Laboratories, Inc., Cambridge, MA.
Esenther, "Multi-Touch Gestures for Controlling Synchronized Map Views," ESRI International User Conference, 2008, Mitsubishi Electric Research Labs., 26 pgs., Cambridge, Massachusetts.
Esteban et al., "Visual construction of highly interactive applications," CENA/PII/95.641/O Version 1, 15 pages [no date available].
Everitt et al., "Modal Spaces: Spatial Multiplexing to Mediate Direct-Touch Input on Large Displays," CHI 2005, Apr. 2005, 5 pages, Mitsubishi Electric Research Laboratories, Inc., Cambridge, MA.
Everitt et al., "MultiSpace: Enabling Electronic Document Micro-mobility in Table-Centric, Multi-Device Environments," IEEE, Oct. 2005, 9 pages, Mitsubishi Electric Research Laboratories, Inc., Cambridge, MA.
Everitt et al., "Observations o a Shared Tabletop User Study," CSCW, Jan. 2004, 4 pages, Mitsubishi Electric Research Laboratories, Inc., Cambridge, MA.
Everitt, "UbiTable: Impromptu Face-to-Face Collaboration on Horizontal Interactive Surfaces," Sep. 2003, 10 pages, Mitsubishi Electric Research Laboratories, Inc., Cambridge, MA.
Faconti et al., "The Input Model of Standard Graphics Systems Revisited by Formal Specification," EUROGRAPHICS '92, vol. 11, No. 3, 1992, 15 pages, Blackwell Publishers.
Fearing, "Tactile Sensing Mechanisms," The International Journal of Robotics Research, Jun. 1990, 22 pages, Sage Publications.
Fearing, "Tactile Sensing, Perception and Shape Interpretation," 1987, 164 pages.
Fedorkow et al., "A Computer-Controlled Sound Distribution System for the Performance of Electroacoustic Music," Computer Music Journal, vol. II, No. 3, 10 pages [no date available].
Ferg, "Event-Driven Programming: Introduction, Tutorial, History," Feb. 8, 2006, 59 pages, Creative Commons Attribution License, accessed from http://Tutorial_EventDrivenProgramming.sourceforge.net.
Findlater et al., "Comparing Semiliterate and Illiterate Users' Ability to Transition from Audio+Text to Text-Only Interaction," CHI 2009 Proceedings: Mobile Applications for the Developing World, Apr. 8, 2009, pp. 1751-1760, ACM, Boston, Massachusetts.
Fingerworks, "Arrow keys for iGesture Mini," 2003, 2 pages, vBulletin, http://forums.fingerworks.com/showthread.php?=233.

(56) References Cited

OTHER PUBLICATIONS

Fingerworks, "Gesture Guide Tip and Tricks," 2009, 1 page, http://www.fingerworks.com/gesture_guide_tips.html.
Fingerworks, "Gesture Guide," 2009, 1 pages, http://www.fingerworks.com/gesture_guide_web.html.
Fingerworks, "Installation and Operation Guide for the TouchStream ST and TouchStream LP," 2002, 14 pages, www.fingerworks.com.
Fingerworks, "Inventor and Developer of MultiTouch Technology," 2011, 191 pages, http://www.dgp.toronto.edu/dwigdor/nb/fingerworks/www/index.html.
Fingerworks, "Mouse Emulation Gesture Guide," 2009, 1 page, http://www.fingerworks.com/gesture_guide_mouse.html.
Fingerworks, "My Gesture Editor Gesture Mapping," 2009, 5 pages, http://www.fingerworks.com/MyGestureEditor_mapping.html.
Fingerworks, "Right Hand Gesture/Hotkey Mappings for all TouchStream and iGesture Products," 2009, 2 pages, http://www.fingerworks.com/gesture_keymap.html.
Fingerworks, "TouchStreamLP Programmable USB Keyboard with Integrated Pointing and Hand Gesture," 2011, 2 pages, http://dgp.toronto.edu/~dwigdor/nb/fingerworks/www/lp_product.html.
Fingerworks, "Troubleshooting and Firmware Upgrades," 2009, 7 pages, http://www.fingerworks.com/troubleshooting/html#gesture.
Fingerworks, "US Qwerty and Dvorak Keyboard Layouts," 2011, 4 pages, http://www.dgp.toronto.edu/~dwigdor/nb/fingerworks/www/layouts.html.
Fingerworks, "Welcome to FingerWorks," 2009, 2 pages, http://www.fingerworks.com/.
Fishkin et al., "Embodied User Interfaces: Towards Invisible User Interfaces," Proceeding of EHCI '98, Sep. 13-18, 1998, 18 pages, Heraklion, Crete.
Fitzmaurice et al., "An Empirical Evaluation of Graspable User Interfaces: Towards Specialized, Space-Multiplexed Input," Proceedings of the ACM Conference on Human Factors in Computing Systems (CHI '97), 1997, pp. 43-50, ACM [http://www.billbuxton.com/graspableUI.html].
Fitzmaurice et al., "An Exploration Into Supporting Artwork Orientation in the User Interface," Proceedings of the 1999 ACM Conference on Human Factors in Computing Systems (CHI '99), 1999, pp. 167-174, ACM.
Fitzmaurice et al., "Bricks: Laying the Foundations for Graspable User Interfaces," Proceedings of the ACM Conference on Human Factors in Computing Systems (CHI '95), 1995, pp. 432-449, ACM, New York [http://www.billbuxton.com/bricks.html].
Fitzmaurice et al., "Bricks: Laying the Foundations for Graspable User Interfaces," CHI '95, May 7-11, 1995, 8 pages, ACM, Denver, CO.
Fitzmaurice el al., "Sampling, Synthesis, and Input Devices," Communications of the ACH, Aug. 1999, 10 pgs., vol. 42, No. 8, ACM.
Fitzmaurice et al., "Situated Information Spaces and Spatially Aware PalmTop Computers," Communications of the ACM, vol. 36, No. 7, Jul. 1993, 11 pages.
Fitzmaurice el al., "Tracking Menus," 2003, pp. 71-80, Letters CHI, vol. 5, No. 2, Vancouver, BC, Canada.
Fitzmaurice et al., "Virtual Reality for Palmtop Computers," ACM Transactions on Information Systems, vol. 11, No. 3, Jul. 1993, 22 pages, ACM.
Fitzmaurice, et al., "Sentient Data Access via a Diverse Society of Devices," Nov. 2003, QUEUE, 12 pages.
Flanagan, "In A Nutshell," Fifth Edition, 2005, 1251 pages, O'Reilly Media, Inc., Sebastopol, USA.
Flanagan, "In A Nutshell," Second Edition, 1997, 629 pages, O'Reilly Media, Inc., Sebastopol, USA.
Flanagan, "JavaScript The Definitive Guide," Fifth Edition, 2006, 1014 pages, O'Reilly Media, Inc., Sebastopol, USA.
Flanagan, "JavaScript The Definitive Guide," Fourth Edition, 2002, 927 pages, O'Reilly Media, Inc., Sebastopol, USA.
Flashloaded Expand Your Flash, http://web.archive.org/web/20070101103734/www.fiashloaded.com/flashcomponents/, 2006, 3 pages, FFF Web Media, Inc.
Flashloaded, "slideMenu" Printout from Archive.org, Jan. 2007, 1 page http://www.flashloaded.com/flashcomponents/slidemenu/.
Foley et al., "Computer Graphics, Principles and Practice," Second Edition in C, 1990, The Systems Programming Series, 1276 pages, Addison-Wesley Publishing Company, Inc.
Foley et al., "Computer Graphics: Principles and Practice," Second Edition, 1987, 634 pages, Addison-Wesley Publishing Company.
Foley et al., "Introduction to Computer Graphics," 1990, 605 pages, Addison-Wesley.
Foley et al., "The Art of Natural Graphic Man-Machine Conversation," Proceedings of the IEEE, vol. 62, No. 4, Apr. 1974, 10 pages, University of North Carolina, Chapel Hill, NC.
Foo, "Jackito-Tactile Digital Assistant," Mar. 28, 2005, 1 page, cnet asia, http://asia.cnet.com/crave/jackito-tactile-digital-assistant-62100186.htm.
Forlines et al., "Direct Touch vs. Mouse Input for Tabletop Displays," CHI 2007 Proceedings: Mobile Interaction Techniques I, Apr. 28-May 3, 2007, pp. 647-656, ACM, San Jose, California.
Forlines et al., "DTLens: Multi-User Tabletop Spatial Data Exploration," ACM Symposium on User Interface Software and Technology, Oct. 2005, 5 pages, Mitsubishi Electric Research Laboratories, Inc., Cambridge, MA.
Forlines et al., "Evaluating Tactile Feedback and Direct vs. Indirect Stylus Input in Pointing and Crossing Selection Tasks," CHI 2008 Proceedings: Tactile and Haptic User Interfaces, Apr. 5-10, 2008, pp. 1563-1572, ACM, Florence, Italy.
Forlines et al., "Glimpse: a Novel Input Model for Multi-level Devices," CHI 2005, Apr. 2-7, 2005, 4 pages, ACM, Portland, OR.
Forlines et al., "HybridPointing: Fluid Switching Between Absolute and Relative Pointing with a Direct Input Device," UIST '06, Oct. 15-18, 2006, pp. 211-220, ACM, Montreux, Switzerland.
Forlines et al., "Improving Visual Search With Image Segmentation," CHI 2009 Proceedings: Visualization 1, Apr. 4-9, 2009, pp. 1093-1102, ACM, Boston, Massachusetts.
Forlines et al., "Multi-User, Multi-Display Interaction with a Single-User, Single Display Geospatial Application," ACM Symposium on User Interface Software and Technology, Oct. 2006, 5 pages, Mitsubishi Electric Research Laboratories, Inc., Cambridge, MA.
Forlines et al., "Under MY Finger: Human Factors in Pushing and Rotating Documents Across the Table," INTERACT 2005, Dec. 2005, 5 pages, Mitsubishi Electric Research Laboratories, Inc., Cambridge, MA.
Forlines, "Exploring the Effects of Group Size and Display Configuration on Visual Search," CSCW '06, Nov. 4-8, 2006, pp. 11-20, ACM, Banff, Alberta, CA.
Forlines, "Zoom-and-Pick: Facilitating Visual Zooming and Precision Pointing with Interactive Handheld Projectors," UIST '05, Oct. 23-27, 2005, pp. 73-82, ACM, Seattle, Washington.
Fowler et al., UML Distilled, Second Edition, A Brief Guide to the Standard Object Modeling Language, 2000, 213 pages, Addison-Wesley, Canada.
Foxlin et al., "Constellation: A Wide-Range Wireless Motion-Tracking System for Augmented Reality and Virtual Set Applications," Proceedings of SIGGRAPH 98, Jul. 9-24, 1998, 8 pages, InterSense Incorporated.
Fryberger et al., "An Innovation in Control Panels for Large Computer Control Systems," 4 pages, Stanford University, Stanford, CA [no date available].
Fukuchi et al., "Interaction Techniques for SmartSkin," 2 pages [no date available].
Fukuchi et al., "Marble Market: Bimanual Interactive Game with a Body Shape Sensor," journal, date, and publication information unknown, 8 pgs. [no date available].
Fukuchi et al., "Massively Parallel Manipulation Techniques with SmartSkin," —Not in English, 2 pages [no date available].
Fukuchi et al., "SmartSkin," —(Only summary in English), 5 pages [no date available].
Fukuchi, "Concurrent Manipulation of Multiple Components on Graphical User Interface," Oct. 23, 2006, 160 pages.
Fukuchi, "Multi-Track Scratch Player on a Multi-Touch Sensing Device," journal, date, and publication information unknown, 8 pgs.

(56) References Cited

OTHER PUBLICATIONS

Furuichi et al., "DTMap Demo: Interactive Tabletop Maps for Ubiquitous Computing," UbiComp 2005, Sep. 2005, 3 pages, Mitsubishi Electric Research Laboratories, Inc., Cambridge, MA.
Gamma et al., "Design Patterns Elements of Resusable Object-Oriented Software," 1995, 397 pages, Addison-Wesley Longman, Inc., Reading, MA.
Gaver et al., "Realizing a Video Environment: EuroPARC's RAVE System," Proceedings of the CHI '92 Conference on Human Factors in Computing Systems, May 3-7, 1992, pp. 27-35, Association for Computing Machinery, New York.
Gellersen et al., "An Evaluation of Techniques for Reducing Spatial Interference in Single Display Groupware," Proceedings of the Ninth European Conference on Computer-Supported Coperative Work, 2005, 20 pages, Paris France.
Gillespie, "Novel Touch Screens for Hand-Held Devices," BPA International, vol. 18, No. 2, Feb. 2002, 5 pages, SID.
Gingold et al., "A Direct Texture Placement and Editing Interface," UIST'06, Oct. 15-18, 2006, 9 pages, ACM, Montreux, Switzerland.
Gleicher, "Image Snapping," 1995, 8 pages, ACM.
Google Earth, "GoogleEarth API Information," Nov. 2005, 3 pages, http://markmail.org/message/xaz63x7agpskhy4h.
Google Earth, "IApplicationGE Interface Reference," 2011, 11 pages, http://web.archive/org/web/20061010071219/http://earth.google.com/comapi/interfac . . .
Google Earth, "Navigating in Google Earth Google Earth Help," 2011, 23 pages, http://earth.google.com/support/bin/static.py?page=guide.cs&guide=22358&topic=22 . . .
Google, "Nexus One," User's Guide, Mar. 15, 2010, 334 pages.
Gosling et al., "The Java Language Specification Third Edition," 1996, 670 pages, Addison-Wesley, Upper Saddle River, NJ.
Graham et al., "Communicating Sequential Processes," Communications of the ACM, vol. 21, No. 8, 1978, 12 pages, ACM, Oxford, England.
Graham et al., "Physical Versus Virtual Pointing," CHI 96, Apr. 13-18, 1996, 8 pages, ACM, Vancouver, BC, Canada.
Greenberg et al., "Usability Evaluation Considered Harmful (Some of the Time)," CHI 2008 Proceedings: Usability Evaluation Considered Harmful?, Apr. 5-10, 2008, pp. 111-120, ACM, Florence, Italy.
Greene, "Audio Menus for Ipods," Technology Review, May 8, 2007, 2 pgs., http://www.dgp.toronto.edu/~ravin/press/MIT-TechReview20070508.htm[Sep. 14, 2011 12:39:27 PM].
Gross, "Grids in Design and CAD," 11 pages, Univeristy of Colorado, Boulder, CO [no date available].
Grossman et al., "A Probabilistic Approach to Modeling Two-Dimensional Pointing," ACM Transactions on Computer-Human Interaction, vol. 12, No. 3, Sep. 2005, 25 pages, University of Toronto.
Grossman et al., "An Evaluation of Depth Perception on Volumetric Displays," AVI '06, May 23-26, 2006 8 pages, ACM, Venezia, Italy.
Grossman et al., "An Interface for Creating and Manipulating Curves Using a High Degree-of-Freedom Curve Input Device," CHI 2003, Apr. 5-10, 2003, 8 pages, Ft. Lauderdale, FL, USA.
Grossman et al., "Collaborative Interaction with Volumetric Displays," CHI 2008 Proceedings—Collaborative User Interfaces, pp. 383-392, Florence, Italy, Apr. 5-10, 2008.
Grossman et al., "Creating Principal 3D Curves With Digital Tape Drawing," CHI 2002, Apr. 20-25, 2002, 8 pgs., ACM, Minneapolis, MN.
Grossman et al., "Exploring and Reducing the Effects of Orientation on Text Readability in Volumetric Displays," CHI 2007 Proceedings: Innovative Interactions, Apr. 28-May 3, 2007, pp. 483-492, ACM, San Jose, California.
Grossman et al., "Hover Widgets: Using the Tracking State to Extend the Capabilities of Pen-Operated Devices," CHI 2006 Proceedings: Pen, Apr. 22-27, 2006, pp. 861-870, ACM, Montreal, Quebec, Canada.
Grossman et al., "Interaction Techniques for 3D Modeling on Large Displays," Proceedings of the ACM Symposium on Interactive 3D Graphics (I3DG2001), 2001, pp. 17-23, ACM.
Grossman et al., "Modeling Pointing at Targets of Arbitrary Shapes," CHI 2007 Proceedings: Innovative Interactions, Apr. 28-May 3, 2007, pp. 463-472, ACM, San Jose, California.
Grossman et al., "Multi-Finger Gestural Interaction with 3D Volumetric Displays,"UIST '04, Oct. 24-27, 2004, 10 pages, ACM.
Grossman et al., "Once More, With Volume," Technology Review Synopses, Feb. 2005, pp. 82-83.
Grossman et al., "Pointing at Trivariate Targets in 3D Environments," CHI 2004, 8 pages, ACM, Vienna, Austria, Apr. 24-29, 2004.
Grossman et al., "Strategies for Accelerating On-Line Learning of Hotkeys," CHI 2007 Proceedings: Learning, Apr. 28-May 3, 2007, pp. 1591-1600, ACM, San Jose, California.
Grossman et al., "The Bubble Cursor: Enhancing Target Acquisition by Dynamic Resizing of the Cursor's Activation Area," CHI 2005, Apr. 2-7, 2005, 10 pages, ACM, Portland, OR.
Grossman et al., "The Design and Evaluation of Selection Techniques for 3D Volumetric Displays," UIST '06, Oct. 15-18, 2006, pp. 3-12, ACM, Montreux, Switzerland.
Gujar et al., "Talking Your Way Around a Conference: A speech interface for remote equipment control," 7 pages, University of Toronto, Toronto, Ontario, Canada [no date available].
Han et al., "Measuring Bidirectional Texture Reflectance with a Kaleidoscope," 2003, 8 pages, ACM.
Han et al., "Multi-Touch Interaction Research Animation Theater," Computer Animation Festival, 1 page, New York University [no date available].
Han, "Low-Cost Multi-Touch Sensing through Frustrated Total Internal Reflection," UIST'05, Oct. 23-27, 2005, 4 pages, ACM, Seattle, WA.
Han, "Media Mirror," 1 page, Media Research Laboratory, New York University [no date available].
Han, "Multi-Touch Interaction Wall," 1 page, Courant Institute of Mathematical Sciences, New York University [no date available].
Han, "Multi-Touch Sensing through Frustrated Total Internal Reflection," 1 page, Media Research Laboratory, New York University [no date available].
Han, "Profile on Jeff Han," 2011, 18 pages, http://cs.nyu.edu/~jhan/mediamirror/index/html.
Han, "Unveiling the Genius of Multi-Touch Interface Design," Video on TED.com, TED ideas worth spreading, 2009, 3 pages, http://www.ted.com/index.php/talks/jeff_han_demos_his_breakthrough_touchscreen.html.
Hancock et al., "Exploring Non-Speech Auditory Feedback at an Interactive Multi-User Tabletop," Graphic Interface 2005, May 2005, 11 pages, Mitsubishi Electric Research Laboratories, Inc., Cambridge, MA.
Hansen et al., "Events Not Equal To GUIs," SIGCSE '04, Mar. 3-7, 2004, 4 pages, ACM, Norfolk, VA.
Hardock et al., "A Marking Based Interface for Collaborative Writing," Proceedings of UIST '93, 1993, pp. 259-266 [http://www.billbuxton.com/Mate.html].
Harrison et al., "Squeeze Me, Hold Me, Tilt Me! An Exploration of Manipulative User Interfaces," CHI '98, Apr. 18-23, 1998, 8 pages, Los Angeles, CA.
Harrison et al., "Transparent Layered User Interfaces: An Evaluation of a Display Design to Enhance Focused and Divided Attention," Proceedings of the ACM Conference on Human Factors in Computing Systems (CHI '95), 1995, pp. 317-324, ACM, New York [http://www.billbuxton.com/transparency.html].
Hauptmann et al., "Gesture Analysis for Graphic Manipulation," Nov. 28, 1988, 19 pages.
Helms, "Virtual Environment Technology for MOUT Training," Jul. 1997, 164 pages, Navy Personnel Research and Development Center, San Diego, CA.
Henault et al, "A Computer Simualtion Study and Component Evaluation For A Quaternion Filter For Sourceless Tracking Of Human Limb Segment Motion," Mar. 1997, 107 pages.
Henning et al., "Advanced COBRA Programming with C++," 1999, 1091 pages, Addison-Wesley Longman, Inc., Reading, MA.
Herot et al., "One-Point Touch Input of Vector Information for Computer Displays," 7 pages, Massachusetts Institute of Technology, Cambridge, MA [no date available].

(56) References Cited

OTHER PUBLICATIONS

Hewlett-Packard, "QuickSpecs for HP iPAQ rx 1950 Pocket PC Product Information," Hewlett-Packard Development Co., L.P., Sep. 26, 2005, 9 pgs.
Hilbert et al., "Extracting Usability Information from User Interface Events," ACM Computing Surveys, Dec. 2000, pp. 384-421, vol. 32, No. 4.
Hinckley et al., "Codex: A Dual Screen Tablet Computer," CHI 2009 Proceedings: New Mobile Interactions, Apr. 4-9, 2009, pp. 1933-1942, ACM, Boston, Massachusetts.
Hinckley et al., "Sensing Techniques for Mobile Interaction," UIST 2000, 2000, 10 pages, ACM, Redmond, WA.
Hinckley et al., "Touch-Sensing Input Devices," CHI 99, May 15-20, 1999, 8 pages, ACM, Pittsburgh, PA.
Hinckley, et al., "Quantitative Analysis of Scrolling Techniques," Conf. on Human Factors in Computing Systems, Apr. 20-25, 2002, pp. 65-72, vol. 4, No. 1, CHI Letters, Redmond, WA.
Hinrichs et al., "Evaluating the Effects of Fluid Interface Components on Tabletop Collaboration," Proceedings of the International Working Conference on Advanced Visual Interfaces (AVI) '06, May 22-26, 2006, 8 pgs., ACM.
Hinrichs et al., "Interface Currents: Supporting Fluid Face-to-Face Collaboration," CSCW 06, 2006, 1 pg., Banff, Alberta, Canada.
Hinrichs et al., "Interface Currents: Supporting Fluent Collaboration on Tabletop Displays," 12 pages, Otto-von-Guericke University, Magdeburg, Germany [no date available].
Hinrichs et al., "Interface Currents: Supporting Fluent Face-to-Face Collaboration," 1 page, Otto-von-Guericke University, Magdeburg, Germany, Nov. 4-8, 2006.
Hoff et al., "Computer vision-based registration techniqures for augmented reality," Proceedings of Intelligent Rovots and Computer Vision XV, SPIE, vol. 2904, Nov. 18-22, 1996, 10 pages, Boston, MA.
Holloway et al., "Virtual Environments: A Survery of the Technology," Sep. 1993, 59 pages, University of North Carolina at Chapel Hill, Chapel Hill, NC.
Houde, "Iterative Design of an Interface for Easy 3-D Direct Manipulation," CHI '92, May 3-7, 1992, 8 pages, ACM.
HP invent, "User's Guide, hp iPAQ Pocket PC h1900 series, Models: h1930, h1935, h1937, h1940, h1945," First Edition, May 2003, 128 pages.
HTC, "HTC HD2," User Manual, 2009, 301 pages.
HTC, "HTC Tilt 2," User Manual, 2010, 277 pages.
HTC, "myTouch 4G Slide," User Guide, 2011, 176 pages.
HTC, "Touch Cruise," User Manual, 2009, 318 pages.
HTC, "Touch Pro," Quick Start Guide, 41 pages, [no date available].
HTC, "Touch Pro," User Manual, 2008, 160 pages.
HTC, "Touch Pro," User Manual, 2008, 164 pages.
HTC, "Your HTC 7 Pro," Quick Guide, 2 pages, [no date available].
HTC, "Your HTC 7 Pro," User Guide, 2011, 74 pages.
HTC, "Your HTC 7 Trophy," Quick Guide, 2 pages, [no date available].
HTC, "Your HTC 7 Trophy," User Guide, 2010, 78 pages.
HTC, "Your HTC Amaze 4G," User Guide, 204 pages.
HTC, "Your HTC Freestyle," User Guide, 2011, 90 pages.
HTC, "Your HTC HD7," User Guide, 2010, 78 pages.
HTC, "Your HTC HD7S," User Guide, 2011, 79 pages.
HTC, "Your HTC Jetstream," User Guide, 2011, 174 pages.
HTC, "Your HTC Radar 4G," Quick Guide, 2 pages, [no date available].
HTC, "Your HTC Radar 4G," User Guide, 2011, 102 pages.
HTC, "Your HTC Radar 4G," User Guide, 2011, 103 pages.
HTC, "Your HTC Rhyme," User Guide, 2011, 342 pages.
HTC, "Your HTC Sensation 4G," User Guide, 191 pages, [no date available].
HTC, "Your HTC Status," User Guide, 2011, 179 pages.
HTC, "Your HTC Surround," User Guide, 2010, 79 pages.
HTC, "Your HTC Titan," User Guide, 2011, 101 pages.
HTC, "Your HTC Vivid," User Guide, 2011, 199 pages.
HTC, "Your HTC Wildfire S," Quick Guide, 2 pages, [no date available].
HTC, "Your HTC Wildfire S," User Guide, 2011, 175 pages.
Hudson et al., "Animation Support in a User Interface Toolkit: Flexible, Robust, and Reusable Abstractions," Graphics Visualization and Usability Center, College of Computing, 10 pages, Georgia Institute of Technology, Atlanta, GA [no date available].
Huey et al., "Communication Arts," vol. 46, No. 5, Sep./Oct. 2004, 215 pages.
IBM Retail Store Solutions, "Noise Frequencies in Capacitive Touch Screens," 8 pages [no date available].
IBM, "Method to Disable and Enable a Touch Pad Pointing Device or Tablet Input Device using Gestures," Jun. 11, 2002, 4 pages, IP.com.
Imserba, "Mobile Applications Software," Scribble UIQ, accessed at http://www.imserba.com/forum/scribble-uiq-t57435/, Oct. 7, 2011, 2 pages.
Integrated—Google Search, Dictionary "in-te-grat-ed," 2 pages https://www.google.com/search?source=jg&hl=en&rlz-&q=define+integr . . . [no date available].
International Search Report and Written Opinion of the International Searching Authority, dated Jun. 11, 2008, The United States Patent and Trademark Office for International Application No. PCT/US2006/061337.
Internet.com, "Flash Kit," A Flash Developer Resource Site, 3 page [no date available].
Internet.com, "Teleprompter—VPForums," VBWire, Oct. 10, 2011, 14 page, accessed at http://www.vbforums.com/showthread.php?t=244139.
Intuilab, "ANIMS CARE-INO: State of the art on sound and animations in Human Machine Interfaces," Sep. 2004, 36 pages, EUROCONTROL.
Ishak et al., "Content-Aware Scrolling," UIST '06, Oct. 15-18, 2006, 4 pages, ACM, Montreux, Switzerland.
Ivanov et al., "Tracking People in Mixed Modality Systems," VCIP 2007, Feb. 2007, 12 pages, Mitsubishi Electric Research Laboratories, Inc., Cambridge, MA.
Izadi et al., "A Thin Form-Factor Interactive Surface Technology," Communications of the ACM, Dec. 2009, pp. 90-98, vol. 52, No. 12.
Izadi et al., "ThinSight: Integrated Optical Multi-Touch Sensing Through Thin Form-Factor Displays," EDT 2007, 2007, 4 pgs., The Association for Computing Memory, San Diego, CA.
Java Community Process, "Mobile Information Device Profile for JAVA 2 Micro Edition," 1999, 566 pages, Sun Microsystems, Inc., Palo Alto, CA.
Jiang et al., "DiamondTouch," 2009, 4 pages, Mitsubishi Electric Research Laboratories, Cambridge, MA.
Jiang et al., "LivOlay: Interactive Ad-Hoc Registration and Overlapping of Applications for Collaborative Visual Exploration," CHI 2008, Aug. 2008, 5 pages, Mitsubishi Electric Research Laboratories, Inc., Cambridge, MA.
Johnson et al., "A Collection of Papers from FirstPerson, Inc.," Aug. 1995, 91 pages, Sun Microsystems Laboratories, Mountain View, CA.
Johnson et al., "The Effect of Touch-Pad Size on Pointing," FirstPerson Technical Report FP-1994-2, Apr. 1994, 10 pages, Sun Microsystems, Inc., Mountain View, CA.
Johnson, "A Comparison of User Interfaces for Panning on a Touch-Controlled Display," CHI '95, May 7-11, 1995, 8 pages, ACM, Denver, CO.
Johnson, "Gestures redefine computer interface," Oct. 21, 1996, 1 page, Electronic Engineering Times.
Johnson, "Touch Displays: A Programmed Man-Machine Interface," Ergonomics Research Society, vol. 10, No. 2, Mar. 1967, 8 pages, Taylor & Francis Ltd., London.
Kabbash et al., "Human Performance Using Computer Input Devices in the Preferred and Non-Preferred Hands," Proceedings of the INTERCHI '93 Conference on Human Factors in Computing Systems, 1993, pp. 474-481, Association for Computing Machinery, New York [http://www.billbuxton.com/LHfitts.html].
Kabbash et al., "The 'Prince' Technique: Fitts' Law and Selection Using Area Cursors," Proceedings of the ACM Conference on Human Factors in Computing Systems (CHI '95), 1995, pp. 273-279, ACM, New York [http://www.billbuxton.com/prince.html].

(56) References Cited

OTHER PUBLICATIONS

Kabbash et al., "Two-Handed Input in a Compound Task," Proceedings of CHI '94, 1994, 10 pages, http://www.billbuxton.com/2hCHI94.html.
Kamba et al., "Using Small Screen Space More Efficiently," CHI 96, Apr. 13-18, 1996, 8 pages, ACM Vancouver, BC, Canada.
Karlson et al., "AppLens and Launch Tile: Two Designs for One-Handed Thumb Use on Small Devices," Article, 10 pages, Human-Computer Interaction Lab, University of Maryland, [no date available].
Karlson et al., "AppLens and Launch Tile: Two Designs for One-Handed Thumb Use on Small Devices," PowerPoint Presenation, 34 pages, Human-Computer Interaction Lab, University of Maryland, [no date available].
Karlson et al., "AppLens and Launch Tile: Two Designs for One-Handed Thumb Use on Small Devices," PowerPoint Presentation with notes, 50 pages, Human-Computer Interaction Lab, University of Maryland [no date available].
Kasik et al., "Ten CAD Challenges," 2005, 12 pages, IEEE Computer Society.
Kawachiya et al., "NaviPoint: An Input Device for Mobile Information Browsing," CHI '98, Apr. 18-23, 1998, 8 pages, Los Angeles, CA.
Kawamoto, "The History of Liquid-Crystal Displays," Apr. 2002, pp. 460-500, Proceedings of the IEEE, vol. 90, No. 4.
Keelan et al., An Analysis of the Human Papilloma Virus Vaccine Depate on MySpace Blogs, Elsevier, 2010, pp. 1535-1540, 2009 Elsevier Ltd.
Keskin et al., "Real Time Hand Tracking and 3D Gesture Recognition For Interactive Interfaces Using HMM," 4 pages, Computer Engineering Dept. Bogazici University [no date available].
Kim et al., "Multi-Touch Interaction for Table-Top Display," ICAT 2006, 2006, pp. 1273-1282, Springer-Verlag, Berlin, Heidelberg.
Kirk, "Optimal Control Theory," 1970, 15 pages, Prentice-Hall, Inc., Englewood Cliffs, NJ.
Kitamura et al., "Music Synthesis by Simulation using a General-Purpose Signal Processing System," ICMC '85 Proceedings, 1985, 4 pages, University of Toronto.
Kitchin, "Using Accelerometers in Low g Applications," 6 pages, Analog Devices, Norwood, MA [no date available].
Kobayashi, "Design of dynamic soundscape: mapping time to space for audio browsing with simultaneous listening," 1996, 58 pages, Massachusetts Institute of Technology, MA.
Korpela, "Using inline frames to embed documents into HTML documents," 2011, 10 pages, http://www.cs.tut.fi/~jkorpela/html/iframe.html.
Krein et al., "The Electroquasistatics of the Capacitive Touch Panel," IEEE Transactions on Industry Applications, May/Jun. 1990, pp. 529-534, vol. 26, No. 3, Pittsburgh, PA.
Krolik, "PIV Creator 3.41—Cross Browser DHTML 360° Panorama Image Viewer (PIV)," 3 pages, 1999-2006, Martin Krolik.
Krueger et al., "Videoplace—An Artificial Reality," CHI '85 Proceedings, 1985, 6 pages, University of Connecticut.
Krueger, "Artificial Reality II," 1991, 320 pages, Addison-Wesley Publishing Company, Inc., Reading, MA —.
Krueger, "Artificial Reality," 1983, 328 pages, Addison-Wesley Publishing Company, Reading, MA.
Kruger et al., "Fluid Integration of Rotation and Translation," Proceedings of the ACM Conference on Human Factors in Computering Systems, Apr. 2-7, 2005, 10 pages, Portland, OR.
Kruger, et al., "How People Use Orientation on Tables: Comprehension, Coordination and Communication," [no date], 10 pages, Univ. of Calgary, Department of Science, Calgary, Alberta.
Kumar et al., "Gaze-Enhanced Scrolling Techniques," UIST '07, Oct. 7-10, 2007, 4 pgs., ACM, Newport, Rhode Island.
Kurlansky et al., "Communication Arts," vol. 45, No. 5, Sep./Oct. 2003, 208 pages.
Kurtenbach et al., "An Empirical Evaluation of Some Articulatory and Cognitive Aspects of 'Marking Menus,'" Human Computer Interaction, 1993, pp. 1-23, vol. 8, No. 1 [http://www.billbuxton.com/PieMenus.html].
Kurtenbach et al., "Contextual Animation of Gestural Commands," Computer Graphics Forum, 1994, vol. 13, No. 5, 10 pages, Blackwell Publishers, Oxford, UK.
Kurtenbach et al., "GEdit: A Test Bed for Editing by Continuous Gestures," SIGCHI Bulletin, 1991, pp. 22-26, vol. 23, No. 2 [http://www.billbuxton.com/GEditBulletin.html].
Kurtenbach et al., "Issues in Combining Marking and Direct Manipulation Techniques," Proceedings of the Fourth ACM SIGGGRAPH Symposium on User Interface Technology (UIST), 1991, pp. 137-144 [http://www.billbuxton.com/GEdit.html].
Kurtenbach et al., "The Design of a GUI Paradigm based on Tablets, Two- Hands, and Transparency," CHI 97, 1997, 8 pages, ACM, Atlanta, GA.
Kurtenbach et al., "The Limits of Expert Perforance Using Hierarchic Marking Menus," Proceedings of the InterCHI '93, 1993, 7 pages, University of Toronto.
Kurtenbach et al., "User Learning and Performance with Marking Menus," Proceedings of CHI '94, 1994, 11 pages, http://www.billbuxton.com/MMUserLearn.html.
Laurel et al., "The Art of Human-Computer Interface Design," 1990, 552 pages, Addison-Wesley Publishing Company, Inc.
Laurel, "The Art of Human-Computer Interface Design," 1990, 19 pages, Addison-Wesley.
Lavoisier Librairie, "Designing interfaces: Patterns for effective interaction design," Dec. 2005, 2 pages, http://www.lavoisier.fr/livre/notice.asp?id=OA6WXOAOSO2OWF.
Lecaine, "Biography," 2011, 130 pages, http://www.hughlecaine.com/en/biography.html.
Lee et al., "A Multi-Touch Three Dimensional Touch-Sensitive Tablet," CHI '85 Proceedings, Apr. 1985, 5 pages, University of Toronto.
Lee et al., "Haptic Pen: Tactile Feedback Stylus for Touch Screens," ACM Symposium on User Interface Software and Technology, Oct. 2004, 5 pages, Mitsubishi Electric Research Laboratories, Inc., Cambridge, MA.
Lee, "A Fast Multiple-Touch-Sensitive Input Device," Oct. 1984, 120 pages, University of Toronto.
Leeper, "14.2: Integration of a Clear Capacitive Touch Screen with a ⅛-VGA FSTN-LCD to form and LCD-based TouchPad," 2002, pp. 187-189, SID 02 Digest, Synaptics, Inc., San Jose, CA, USA.
Leganchuk et al., "Manual and Cognitive Benefits of Two-Handed Input: An Experimental Study," Transactions on Human-Computer Interaction, 1998, pp. 326-359, vol. 5, No. 4 [http://www.billbuxton.com/ToCHI2H.html].
Lesh et al., "Building and Sharing Digital Group Histories," ACM Conference on Computer Supported Cooperative Work, Nov. 2002, 11 pages, Mitsubishi Electric Research Laboratories, Inc., Cambridge, MA.
Levin et al., "Bringing Sketching Tools to Keychain Computers with an Acceleration-Based Interface," 2 pages, MIT Media Laboratory, Cambridge, MA [no date available].
Lewis et al., "MAC OS in a Nutshell," 2000, 403 pages, O'Reilly & Associates, Inc., Sebastopol, CA.
Leydon et al., "Gesture-Based Control of a Personal Digital Assistant," Mar. 6, 2001, 121 pages, Darmouth College.
Lieberman, "PowerPC 603e rides VMEbus boards," Jul. 24, 1995, 1 pages, Electronic Engineering Times.
Lindholm et al., "The Java™ Virtual Machine Specification," Second Edition, 1997, 489 pages, Addison-Wesley.
Linus Technologies, Inc., Linus Write-Top computer, 2012, 7 pages, http://oldcomputers.net/linus.html.
Lippman, "C# Primer A Practical Approach," 2002, 413 pages, Addison-Wesley, Boston, MA.
Lueder, "Liquid Crystal Displays, Addressing Schemes and Electro-Optical Effects," 2001, 5 pages, John Wiley & Sons, Ltd., West Sussex, England.
MacIntyre et al., "Future Multimedia User Interfaces," 1996, 26 pages, Multimedia Systems.

(56) References Cited

OTHER PUBLICATIONS

MacKay et al., "Reinventing the Familiar: Exploring an Augmented Reality Design Space for Ait Traffic Control," 8 pages, France [No Date Available].
MacKenzie et al., "A Comparison of Input Devices in Elemental Pointing and Dragging Tasks," Proceedings of the CHI '91 Conference on Human Factors in Computing Systems, 1991, pp. 161-166, Association for Computing Machinery, New York.
MacKenzie et al., "A Comparison of Three Selection Techniques for Touchpads," CHI 98, 1998, 8 pages, Los Angeles, CA.
MacKenzie et al., "Extending Fitts' Law to Two-Dimensional Tasks," Proceedings of the CHI '92 Conference on Human Factors in Computing Systems, 1992, pp. 219-226, Association for Computing Machinery, New York.
MacKenzie et al., "The Prediction of Pointing and Dragging Times in Graphical User Interfaces," Interacting with Computers, 1994, 12 pages, http://www.billbuxton.com/TCW.html.
Malik et al., "Interacting with Large Displays from a Distance with Vision-Tracked Multi-Finger Gestural Input," UIST'05, 2005, 10 pages, ACM, Seattle, WA.
Malik et al., "Visual Touchpad: A Two-handed Gestural Input Device," ICMI'04, 2004, 8 pages, ACM, Pennsylvania, USA.
Malik, "An Exploration of Multi-Finger Interaction on Multi-Touch Surfaces," Doctoral Thesis, Graduate Dept. of Computer Science, University of Toronto, 2007, 184 pgs.
Mantei et al., "Experiences in the Use of a Media Space," [Publication Unknown], 1991, pp. 203-208, Association for Computing Machinery, New York.
Martin, "Snaky Tape May Enliven Computer Interactions," NewsFactor Network, Apr. 21, 2003, 2 pages, NewsFactor Sci::Tech, Tech Innovation & Discovery, http://sci.newsfactor.com/perl/story/21314.html.
Masui et al., "Elastic Graphical Interfaces for Precise Data Manipulation," ACM Conference on Human Factors in Computing Systems (CHI'95) Conference Compainon (Apr. 1995), ACM Press, pp. 143-144.
Matias et al., "Half-QWERTY: A One-Handed Keyboard Facilitating Skill Transfer From QWERTY," Proceedings of the INTERCHI '93 Conference on Human Factors in Computing Systems, 1993, pp. 88-94, Association for Computing Machinery, New York [http://www.billbuxton.com/matias93.html].
Matias et al., "Half-QWERTY: Typing With One Hand Using Your Two-handed Skills," Companion of the CHI '94 Conference on Human Factors in Computing Systems, 1994, 3 pages, ACM, NY.
Matias et al., "One-Handed Touch-Typing on a QWERTY Keyboard," Human-Computer Interaction, 1996, pp. 1-27, vol. 11, Lawrence Erlbaum Associates, Inc.
McDaniel, "IBM Dictionary Of Computing," Aug. 1993, 3 pages, McGraw-Hill, Inc., New York.
McGuffin et al., "Acquisition of Expanding Targets," Paper: Smooth Moves, Apr. 20-25, 2002, pp. 57-64, vol. 4, No. 1, Minneapolis, MN USA.
McGuffin et al., "Expand-Ahead: A Space-Filling Strategy for Browsing Trees," 8 pages, University of Toronto [no date available].
McGuffin et al., "Fitts' Law and Expanding Targets: Experimental Studies and Designs for User Interfaces," ACM Transactions on Computer-Human Interaction, vol. 12, No. 4, Dec. 2005, pp. 388-422.
McGuffin et al., "Interactive Visualization of Genealogical Graphs," 8 pages, University of Toronto [no date available].
McGuffin, et al., "Using Deformations for Browsing Volumetric Data," Oct. 19-24, 2003, pp. 401.408, IEEE Visualization, Seattle, Washington, USA.
Mehta, "A Flexible Human Machine Interface," Oct. 1982, 82 pages.
Mertz et al., "Pushing the limits on aTC user interface design beyond S&M interaction: the DigiStrips experience," 3rd USA/Europe Air Traffic Management R&D Seminar, Jun. 13-16, 2000, 9 pages, Napoli.
Mertz et al., "The influence of design techniques on user interfaces" the DigiStrips experiment for air traffice control, HCI-aero Sep. 2000, 2000, 7 pages, Toulouse, France.
Mertz, "ANIMS, CARE-INO projet Indentification of operational scenarious for sound and animations use in ATC.," Sep. 2004, 24 pages, EUROCONTROL.
Mertz, "Peropheral awareness ofered by interaction techniques in Air Traffic Control interfaces," CHI 2003, 2003, 4 pages, Toulouse, France.
Mertz, "Touch Input and Animations: More Efficient and Humanized Computer Interactions for ATC(O)," Proceedings of the 10th International Symposium on Aviation Psychology, 1999, 6 pages, Colombus, OH.
Mertz, "Users Bandwidth in Air Traffic Management: an Analysis from the HMI Point of View," HCI-02 Proceedings, 2002, 6 pages, American Association for Artificial Intelligence.
Meyer, "An Integrated Capacitive Position Sensor," Proceedings Inegrating Intelligent Instrumentation and Control, IEEE Xplore, Apr. 23-25, 1995, 1 page.
Microsoft, "Computer Dictionary," Fifth Edition, 2002, 651 pages, Microsoft Press, Redmond, WA.
Microsoft, "Computer Dictionary," Third Edition, 1997, 561 pages, Microsoft Press, Redmond, WA.
Minsky et al., "Manipulating Simulated Objects with Real-world Gestures using a Force and Position Sensitive Screen," Computer Graphics, Jul. 1984, vol. 18, No. 3, 9 pages.
Moghaddam et al., "Visualization & User-Modeling for Browsing Personal Photo Libraries," International Journal of Computer Vision 56(½), Feb. 2004, 34 pages, Mitsubishi Electric Research Laboratories, Inc., Cambridge, MA.
Monster Tracks, "Original Music Downloads," 2011, 46 pages, http://www.monstertracks.com/mtFILES/freemusicdownload.html.
Montalbano, "Novell Launches next-generation Linux desktop," Mar. 9, 2006, 4 pages, ComputerWorld.
Moraveji et al., "A Mischief of Mice: Examining Children's Performance in Single Display Groupware Systems with 1 to 32 Mice," CHI 2009 Proceedings: Systems for Children, Apr. 9, 2009, pp. 2157-2166, ACM, Boston, Massachusetts.
Morgan, "New Enterprise-Class Linux Desktop Previewed by Novell," Mar. 14, 2006, 2 pages, http://www.itjungle.com/sub/subscribe.html.
Morgan, "Novell Betas XgL 3D Graphics for Linux Desktop," The Linux Beacon, vol. 3, No. 5, Feb. 7, 2006, 2 pages.
Morris et al., "Beyond Social Protocols: Multi-User Coordination Policies for Co-located Groupware," Jan. 2004, 6 pages, CSCW, Mitsubishi Electric Research Laboratories, Inc., Cambridge, MA.
Morris et al., "Conflict Resolution in Paper and Digital Worlds: Two Surveys of User Expectations," CSCW, Jan. 2004, 4 pages, Mitsubishi Electric Research Laboratories, Inc., Cambridge, MA.
Moscovich et al., "A Multi-finger Interface for Performance Animation of Deformable Drawings," 2 pages, Brown University [no date available].
Moscovich et al., "Multi-finger Cursor Techniques," 7 pages, Department of Computer Science, Providence, RI [no date available].
Moscovich, "Principles and Applications of Multi-Touch Interaction," Doctoral Dissertation, Department of Computer Science, Brown University, 2007, 114 pgs., Providence, Rhode Island.
Moyle et al., "The Design and Evaluation of a Flick Gesture for 'Back' and 'Forward' in Web Browsers," 8 page, Human-Computer Interaction Lab, Christchurch, Department of Computer Science, New Zealand, 2002, Australia Computer Society, Inc.
MSDN, "Control OnPaint Method," 2011, 4 pages, http://www.msdn.microsoft.com/en-us/library/systems.windows.forms.control.onpaint.
MSDN, "SendInput function," 2011, 7 pages, http://www.mdn.microsoft.com/en-us/library/ms646310(d=printer).
My-Symbian.com, "Orange Scribble", OrangeScribble for UIQ 2x by Orange:: Symbian software @ My-Symbian.com, accessed at http://my-symbian.com/uiq/software/applications/php?fldAuto=638,faq=6, Oct. 7, 2011, 2 pages.
Myers et al., "Past, Present, and Future of User Interface Software Tools," ACM Transactions on Computer-Human Interaction, vol. 7, No. 1, 2000, 26 pages, ACM.

(56) References Cited

OTHER PUBLICATIONS

Myers et al.,"Creating Highly-Interactive and Graphical User-Interfaces by Demonstration," SIGGRAPH '86, Aug. 18-22, 1986, vol. 20, No. 4, 10 pages, Dallas, TX.
Nakatani et al., "Soft Machines: A Philosophy of User-Copiter Interface Design," Dec. 1983, pp. 19-23, Addison-Wesley Publishing Company.
Narayanaswamy et al., "User Interface for a PCS Smart Phone," 1999, 5 pages, IEEE, [no date available].
Narine et al., "Collaboration Awareness and Its Use to Consolidate a Disperse Group," Proceedings of Interact '97, 1997, 12 pgs., Sydney, Australia [http://www.billbuxton.com/postcards.html].
Nasiri et al., "Motion Processing: The Next Breakthrough Function in Handsets," 10 pages, InvenSense, Inc., Sunnyvale, CA [no date available].
Newman, "A system for interactive graphical programming," Spring Joint Computer Conference, 1968, 8 pages, Harvard University, Cambridge, MA.
Newton, "Apple Message Pad Handbook," 1995, 196 pages, Apple Computer, Inc., Cupertino, CA.
Next-Generation Sharp Organiser to Carry Pen Interface, Jul. 1992, 1 page.
Nextstep, "Object-Oriented Programming And The Objective C Language," Apr. 1993, 257 pages, Addison-Wesley Publishing Company, Reading, MA.
Niemeyer et al., "Learning Java," Third Edition, 2005, 978 pages, O'Reilly Media, Inc., Sebastopol, CA.
Norman et al,. "User Centered System Design, New Prospectives on Human-Computer Interaction," 1986, 532 pages, Lawrence Erlbaum Associates, Inc., Hillsdale, NJ.
Ogawa et al., Preprocessing for Chinee Character Recognition and Global Classification of Handwritten Chinese Characters, Pattern Recognition, vol. 11, pp. 1-7, 1979, Pergamon Press Ltd., Great Britain.
Oka et al., "Real-time Tracking of Multiple Fingertips and Gesture Recognition for Augmented Desk Interface Systems," 6 pages, Institute of Industrial Science, University of Tokyo, Tokyo, Japan [no date available].
Olsen et al., "A Context for User Interface Management," IEEE Computer Graphics and Applications 4(12), 1984, 13 pages.
Olsen, "Developing user Interfaces," 1998, 426 pages, Morgan Kaufmann Publishers, Inc., San Francisco, CA.
Owen et al., "When It Gets More Difficult, Use Both Hands- Exploring Bimanual Curve Manipulation," 8 pages, Alias, Toronto, Ontario, Canada [no date available].
Palm Inc., "iPhone's Multi-Touch Technology—Apple (Appl 949)," Jul. 5, 2009, 6 pages, Article One Partners—Research Reward Reform, Article One Partners Holdings, LLC.
Pavet et al., "Use of Paper Strips by Tower Air Traffic Controllers and Promises Offered by New Design Techniques on User Interface," USA/Europe R&D Seminar ATM, 2001, 11 pages, Santa Fe, NM.
Pavet et al., "Vigistrips: a highly interactive Human Machine Interface project for the benefit of major French airports," Dec. 2006, 14 pages, mhtml:file://S:\DFSR_DATA/data01\051900\Prior%20Art\915\00%20-%20Michael%20 . . .
PenPoint API Reference, vols. 1-2, Addison-Wesley, 1992.
Penpoint, "PenPoint API Reference," vol. 2, 1991, 605 pages, GO Corporation., Foster City, CA.
Penpoint, "PenPoint Architectural Reference vol. 1," 1991, 655 pages, Addison-Wesley Publishing Company, Reading, MA.
Perlin et al., "An Alternative Approach to the Computer Interface," Courant Institute of Mathematical Sciences, NYU, pp. 1-11, New York, NY [no date available].
Perry et al., "An Investigation of Current Virtual Reality Interfaces," 17 pages, Crossroads, The ACM Student Magazine [no date available].
Petzold, "Programming Windows," Fifth Edition, 1999, 1518 pages, Microsoft Press, Redmond, WA.
Phan, "Focus+Context Sketching on a PDS," Dec. 2003, 65 pages, A paper submitted to the faculty of San Francisco State University, San Francisco, CA.
Philipp, "Controls & Sensors: Tough Touch Screen," Feb. 1, 2006, 6 pages, http://www.appliancedesign.com/copyright/75872c1b0b819010VgnVCM100000f932a8c . . .
Pickering, "Touch-sensitive screens: the technologies and their application," 1986, 21 pages, Academic Press Inc., London.
Piquepaille, "Exclusive Interview with Jackito's Makers," Jul. 21, 2004, 3 pages, http://web.archive.org/web/20040806182136/http://radio.weblogs.com/0105910/2004/07/21.html.
Piquepaille, "Forget the PDA, Here Comes the TDA," Jul. 21, 2004, 2 pages, http://web.archive.org/web/20040806134919/http://radio.weblogs.com/0105910/categories/sidebars/2004/07/12/html.
Plasmaplugs, "PlasmaplugsScrollBar," Aug. 24, 2006, 1 page.
PR Newswire, "FingerWorks Announces a Gesture Keyboard for Apple PowerBooks," 2011, 2 pages, http://www.prnewswire.com/news-releases/fingeworks-announces-a-gesture-keyboard-for-apple-powerbooks-59032847.html.
PR Newswire, "FingerWorks Announces the ZeroForce iGesture Pad for Macs and PCs," 2011, 2 pages, http://www2.prnewswire.com/cgi-bin/stories.pl?ACCT=104&SToRY=/www/story/02-18-2003/000893081&EDATE=/.
Prasad et al., "Exploring the Feasability of Video Mail for Illiterate Users," Conference AVI '08, May 2008, 8 pgs., Napoli, Italy.
Principles of Animation: "Slow In and Out", 1 page, 2010, http://www.siggraph.org/education/materials/HyperGraph/animation.
ProQuest, "Adobe Rolls Out Flash Player 9", Wireless News, Jun. 28, 2006, 8 pages.
Prosise, "Programming Microsoft.Net," 2002, 801 pages, Microsoft Press, Redmond, WA.
Quantum Research Group Ltd., "Preliminary QProx QT60320 Product Information," 1999, 14 pgs., Quantum Research Group Ltd., Pittsburgh, PA.
Quantum Research Group Ltd., "Preliminary QT60325, QT60485, QT60645 Product Information," 2001, 42 pgs., Quantum Research Group Ltd., Hamble, GB.
Quantum Research Group Ltd., "QMatrix QT60040 Product Information," 2000, 10 pgs., Quantum Research Group Ltd., Pittsburgh, PA.
Quantum Research Group, "Company and Technology Overview," 2006, 20 pages.
Quantum Research Group, "Design Wins," May 2006, 25 pages.
Quantum Research Group, "Qmatrix Panel Design Guidelines," Oct., 2002, 4 pages.
Quantum Research Group, "Qmatrix Technology White Paper," 2006, 4 pages.
Raab et al., "Pedagogical Power Tools for Teaching Java," ITiCSE, 2000, 4 pages, ACM, Helsinki, Finland.
Railane et al., "Tackling the Problem of Flight Integration," 10 pages, Toulouse, France [no date available].
Ramos et al., "Pointing Lenses: Facilitating Stylus Input Through Visual- and Motor-Space Magnification," CHI 2007 Proceedings: Mobile Interaction Techniques II, Apr. 28-May 3, 2007, pp. 757-766, ACM, San Jose, California.
Ramos et al., "Pressure Marks," CHI 2007 Proceedings: Alternative Interaction, Apr. 28-May 3, 2007, pp. 1375-1384, ACM, San Jose, California.
Ramos et al., "Pressure Widgets," CHI 2004, vol. 6, No. 1, Apr. 24-29, 2004, 8 pages, ACM, Vienna, Austria.
Ramos et al., "Visual Features and Interference in Pressure Widget," Apr. 2004, 11 pages, University of Toronto.
Ramos et al., "Zliding: Fluid Zooming and Sliding for High Precision Parameter Manipulation," UIST'05, Oct. 23-27, 2005, 10 pages, ACM, Seattle, WA.
Ramos, et al., "Fluid Interaction Techniques for the Control and Annotation of Digital Video," 2003, pp. 105-114, ACM, Vancouver, BC, Canada.
Ranjan et al., "An Exploratory Analysis of Partner Action and Camera Control in a Video-Mediated Collaborative Task," CSCW '06, Nov. 4-8, 2006, 10 pages, ACM, Bannff, Alberta, Canada.
Ranjan et al., "Dynamic Shared Visual Spaces: Experimenting with Automatic Camera Control in a Remote Repair Task," CHI 2007

(56) References Cited

OTHER PUBLICATIONS

Proceedings: People, Looking at People, Apr. 28-May 3, 2007, pp. 1177-1186, ACM, San Jose, California.
Ranjan et al., "Improving Meeting Capture by Applying Television Production Principles with Audio and Motion Detection," CHI 2008 Proceedings: Improved Video Navigation and Capture, Apr. 5-10, 2008, pp. 227-236, ACM, Florence, Italy.
Ranjan et al., "Searching in Audio: The Utility of Transcripts, Dichotic Presentation, and Time-Compression," CHI 2006 Proceedings: Search & Navigation: Mobiles & Audio, Apr. 22-27, 2006, pp. 721-730, ACM, Montreal, Quebec, Canada.
Rasala et al., "Java Power Tools: Model Software for Teaching Object-Oriented Design," SIGCSE, 2001, 5 pages, ACM, Charlotte, NC.
Raskar et al., "Intelligent Clusters and Collaborative Projector-based Displays," CVRV 2003, Oct. 2003, 6 pages, Mitsubishi Electric Research Laboratories, Inc., Cambridge, MA.
Reetz et al., "Superflick: A Natural and Efficient Technique for Long-Distance Object Placement on Digital Tables," 8 pages, University of Saskatchewan, Saskatoon, Canada.
Reexam Request for U.S. Patent No. 7469381, dated Apr. 28, 2010, 51 pages.
Rekimoto et al., "Augmented Surfaces: A Spatially Continuous Work Space for Hybrid Computing Environments," year and publisher unknown, 8 pages.
Rekimoto, "Pick-and-Drop: A Direct Manipulation Technique for Multiple Computer Environments," UIST 97, 1997, 9 pages, ACM, Banff, Alberta, Canada.
Rekimoto, "SmartSkin: An Infrastructure for Freehand Manipulation on Interactive Surfaces," Paper: Two-Handed Interaction, Apr. 20-25, 2002, pp. 113-120, vol. 4, No. 1, CHI Letters, Minneapolis, MN USA.
Rekimoto, "Tilting Operations for Small Screen Interfaces," 2 pages, Sony Computer Science Laboratory, Inc., Tokyo, Japan [no date available].
Robertson et al., Data Mountain: Using Spatial Memory for Document Management, UIST '98, 1998, pp. 153-162, ACM, San Francisco, CA.
Rosenberg et al., "Real-Time Stereo Vision using Semi-Global Matching on Preogrammable Graphics Hardware," 1 page, New York University [no date available].
Rosenthal et al., "The Detailed Semantics of Graphics Input Devices," Computer Graphics, vol. 16, No. 3, Jul. 1982, 6 pages, ACM.
Ross, "Gazing into the Crystal Ball, But what shape should the cursor be?," Jan. 20, 2003, Toronto Star, 3 pages, http://www.dpg.toronto.edu/-ravin/press/TorontoStar20030120.htm.
Rubine et al., "Programmable Finger-Tracking Instrument Controllers," Computer Music Journal, 1990, pp. 26-41, vol. 14, No. 1, Massachusetts Institute of Technology, Cambridge, MA.
Rubine et al., "The VideoHarp," Proceddings of the 14th International Compuyter Music Conference, Sep. 20-25, 1988, 8 pages.
Rubine, "Combining Gestures and Direct Manipulation," Proceedings of the CHI '92 Conference on Human Factors in Computing Systems, May 3-7, 1992, pp. 659-660, Association for Computing Machinery, New York.
Rubine, "Integrating Gesture Recognition and Direct Manipulation," Proceedings of the Summer '91 USENIX Technical Conference, 1991, 19 pgs. [CMU-IT-91 100].
Rubine, "Specifying Gestures by Example," Computer Graphics, Jul. 1991, pp. 329-337, vol. 25, No. 4, Association for Computing Machinery, New York.
Rubine, "The Automatic Recognition of Gestures," Doctoral Thesis, Dec. 1991, 285 pgs., Carnegie Mellon University, Pittsburgh, PA [CMU-CS-91-202].
Ryall et al., "Experiences with and Observations of Direct-Touch Tabletops," IEEE, Oct. 2005, 9 pages, Mitsubishi Electric Research Laboratories, Inc., Cambridge, MA.
Ryall et al., "Exploring the Effects of Group Size and Table Size on Interactions with Tabletop Shared-Display Groupware," CSCW, Jan. 2004, 12 pages, Mitsubishi Electric Research Laboratories, Inc., Cambridge, MA.
Ryall et al., "iDwidgets: Parameterizing Widgets by User Identity," Interact 2005, Jul. 2005, 5 pages, Mitsubishi Electric Research Laboratories, Inc., Cambridge, MA.
Ryall et al., "Temporal Magic Lens: Combined Spatial and Temporal Query and Presentation," Interact 2005, Jul. 2005, 15 pages, Mitsubishi Electric Research Laboratories, Inc., Cambridge, MA.
Safety and Regulatory Information, 15 pages [no date available].
Salaun et al., "Innovative HMI for the busiest airport towers," 4 pages [no date available].
Saponas et al., "Demonstrating the Feasability of Using Forearm Electromyography for Muscle-Computer Interfaces," CHI 2008 Proceedings: Physiological Sensing for Input, Apr. 5-10, 2008, pp. 515-524, ACM, Florence, Italy.
Saponas et al., "Enabling Always-Available Input with Muscle-Computer Interfaces," UIST '09, Oct. 4-7, 2009, pp. 167-176, ACM, Victoria, British Columbia, Canada.
Sarma, "Liquid Crystal Displays," 2004, 21 pages, CRC Press LLC.
Schmidt et al., "Sketching and Composing Widgets for 3D Manipulation," Eurographics 2008, vol. 27, No. 3, 10 pages.
Schmidt et al., "There is more to Context than Location," 10 pages, University of Karlsruhe, Karlsruhe, Germany [no date available].
Scott et al., "Investigating Tabletop Territoriality in Digital Tabletop Workspaces," Technical Report, 2006-836-29, 2006, pp. 1-10, Dept. of Computer Science, University of Calgary, Calgary, Alberta, Canada.
Scott et al., "Storage Bins: Mobile Storage for Collaborative Tabletop Displays," Jul./Aug. 2005, 8 pages, IEEE Computer Society.
Scott, "Territoriality in Collaborative Tabletop Workspaces," Mar. 2005, 307 pages, The University of Calgary, Alberta, Canada.
Sears, "High Precision Touchscreens: Design Strategies and Comparisons With a Mouse," Int. J. Man—Machine Studies, 1991, pp. 593-613, vol. 34.
Sellen et al., "The Prevention of Mode Errors Through Sensory Feedback," Human-Computer Interaction, 1992, pp. 141-164, J. of HCI [http://www.billbuxton.com/ModeErrors.html].
Sellen et al., "The Role of Visual and Kinesthetic Feedback in the Prevention of Mode Errors," Human-Computer Interaction ? INTERACT '90, Aug. 27-31, 1990, pp. 667-673, Elsevier Science Publishers B.V., Amsterdam, Holland.
Sellen et al., "Using Spatial Cues to Improve Videoconferencing," Proceedings of CHI '92, 1992, pp. 651-652 [http://www.billbuxton.com/hydra.html].
Sensor Frame, "The Sensor Frame Graphic Manipulator NASA Phase II Final Report," 1990 [Not 1992 as handwritten on p. 2, see p. 4 onward], 28 pgs., Sensor Frame, Inc., Pittsburgh, PA.
Shapetape, "9 Photographic Illustrations," year unknown.
Shen et al., "CoR2Ds: Context-Rooted Rotatable Draggables for Tabletop Interaction," CHI 2005, Apr. 2005, 5 pages, Mitsubishi Electric Research Laboratories, Inc., Cambridge, MA.
Shen et al., "DiamondSpin: An Extensible Toolkit for Around-the-Table Interaction," CHI 2004, Jan. 2004, 10 pages, Mitsubishi Electric Research Laboratories, Inc., Cambridge, MA.
Shen et al., "Informing the Design of Direct-Touch Tabletops," Sep./Oct. 2006, pp. 56-66, IEEE Computer Society.
Shen et al., "Personal Digital Historian: Story Sharing Around the Table," Feb. 2003, Mitsubishi Electric Research Laboratories, Inc., Cambridge, MA.
Shen et al., "Three Modes of Multi-Surface Interaction and Visualization," CHI, Apr. 2006, 5 pages, Mitsubishi Electric Research Laboratories, Inc., Cambridge, MA.
Shen, :Multi-User Interface and Interactions on Direct-Touch Horizontal Surfaces: Collaborative Tabletop Research at MERL, Tabletop, Jan. 2006, 3 pages, Mitsubishi Eletric Research Laboratories, Inc., Cambridge, MA.
Sheng et al., "An Interface for Virtual 3D Sculpting via Physical Proxy," Graphite 2006, Nov. 29, 2006, 8 pgs., ACM, Kuala Lumpur, Malaysia.
Shneiderman et al., "Designing The User Interface, Fourth Edition," 2005, 667 pages, Pearson Addison Wesley, Boston, MA.

(56) References Cited

OTHER PUBLICATIONS

Shneiderman, "4.3 Touchscreens now offer compelling uses," IEEE Software, Mar. 1991, vol. 8, No. 2, 9 pages, Ablex Publishing, Norwood, NJ.
Shneiderman, "Direct Manipulation: A Step Beyond Programming Languages," Aug. 1983, 13 pages.
Shneiderman, "Future Directions for Human-Computer Interaction," 1990, 19 pages, Department of Computer Science, University of Maryland, College Park, MD.
Sibert et al., "An Object-Oriented User Interface Management System," SIGGRAPH '86, vol. 20, No. 4, Aug. 18-22, 1986, 10 pages, Dallax, TX.
Siegel et al., "Performance Analysis of a Tactile Sensor," 1987, 7 pages, IEEE.
Silberschatz et al., "Operating System Concepts," Third Edition, 1990, 704 pages, Addison-Wesley Publishing Co., Reading, MA.
Sin, "Editing Digital Video With a Flick of the Wrist," The Varsity Online, Dec. 3, 2002, 2 pgs., University of Toronto, http://www.dgp.toronto.edu/~ravin/press/Varsity20021104.htm[Sep. 14, 2011 12:50:10 PM].
Singh et al., "Numeric Paper Forms for NGOs," pp. 1-11 [no date available].
Singh et et al., "Virtual Reality Software and Technology," Proceedings of the VRST '94 Conference, Aug. 23-26, 1994, 8 pages, World Scientific, Singapore.
Singh et al., "Visualizing 3D Scenes using Non-Linear Projections and Data Mining of Previous Camera Movements," Afrigraph '04, Nov. 3-5, 2004, 8 pages, ACM, Cape Town, South Africa.
Small et al., "Design of Spatially Aware Graspable Displays," CHI 97, Mar. 22-27, 1997, 2 pages, MIT Media Laboratory, Cambridge, MA.
Smith et al., "Croquet: A Menagerie of New User Interfaces," 8 pages. [no date available].
Smith et al., "Electric Field Sensing for Graphical Interfaces," to be published in Special Issue on Input Devices, IEEE Computer Graphics and Applications, May 1998, 17 pgs., IEEE.
Smith et al., "The Radial Scroll Tool: Scrolling Support for Stylus- or Touch-Based Document Navigation," UIST 2004, Oct. 24-27, 2004, 4 pages, ACM, Santa Fe, NM.
Smith, "Field Mice: Extracting Hand Geometry From Electric Field Measurements," IBM Systems Journal, 1996, pp. 587-608, vol. 35, Nos. 3 and 4.
Smith, "ISO and ANSI Ergonomic Standards for Computer Products," 1996, 351 pages, Prentice Hall, Upper Saddle River, USA.
Son et al., "Comparison of contact sensor localization abilities during manipulation," Robotics and Autonomous Systems, 1996, 17 pages, Elsevier Science B.V.
Sony Electronics, Inc., "VGN-U750P Notebook Product Information," Sony Electronics, Inc., 2004, 1 pg.
Sony, VAIO Instruction Manual, 2004, 142 pages.
Sprint, "HTC Arrive," Basics Guide, 2011, 129 pages.
Sprint, "HTC Arrive," User Guide, 2011, 160 pages.
Sprint, "HTC EVO Design 4G," User Guide, 2011, 276 pages.
Sprint, "HTC Touch Pro," User Guide, 2008, 217 pages.
Sprint, "Sprint PCS Service Sprint Power Vision Smart Device Treo 700 by Palm," 2006, 432 pages, USA.
Standsfield, "Haptic perception with an articulated, sensate robot hand," Robotica 1992, vol. 10, Part 6, pp. 497-508, Sandia National Laboratories, Albuquerque, NM.
Stauffer, "Progress in Tactile Sensor Development," Robotics Today, Jun. 1983, 6 pages, The Society of Manufacturing Engineers.
Stein, "What We Swept Under the Rug: Radically Rethinking CS1," Computer Science Education, vol. 8, No. 2, 1998, 13 pages, Swets and Zeitlinger.
Sugimoto et al., "HybridTouch: An Intuitive Manipulation Technique for PDAs Using Their Front and Rear Surfaces," MobileHCI '06, Sep. 12-15, 2006, pp. 137-140, ACM, Helsinki, Finland.
Sugiyama et al., "Tactile Image Detection Using a 1k-element Silicon Pressure Sensor Array," Sensors and Actuators, A21-A23, 1990, 4 pages, Elsevier Sequoia, Netherlands.
Sun et al., "Flipper: a New Method of Digital Document Navigation," CHI 2005, Apr. 2-7, 2005, 4 pages, ACM, Portland, OR.
Sun Microsystems, "Mobile Information Device Profile for Java™ 2 Micro Edition, Version 2.0," 1999-2002, 566 pages.
Sun Microsystems, "PersonalJava Application Environment," Archive—Java Technology Products Download, Apr. 26, 2008, 13 pgs., Sun Microsystems, http://java.sun.com/jsp_utils/PrintPage.jsp?url=http%3A%2F%2Fjava.sun.com%2Fproducts%2Fpersonaljava%2Ftouchable%2F.
Sutherland, "A Head-Mounted Three Dimensional Display," 1968, 8 pages.
Suzuki et al., "A 1024-Element High-Performance Silicon Tactile Imager," IEEE Transactions on Electron Devices, Aug. 1990, pp. 1852-1860, vol. 37, No. 8.
Synaptics Technology, "Transparent Capacitive Position Sensing," Way Back Machine website, as of Jul. 20, 2011, 4 pages, http://web.archive.org/web/20010417174413/http://www.synaptics.com/technology/tcps.cfm.
Synaptics TouchPad Interfacing Guide, Second Edition, 1998, 91 pages.
Synaptics, "Synaptics Announces Major Design Win With Toshiba for Leading-Edge Notebook," Mar. 4, 2002, 1 page, San Jose, CA.
Szalavari et al., "The Personal Interaction Panel—A Two-Handed Interface for Augmented Reality" [Abstract only], Computer Graphics Forum, Sep. 1997, vol. 16, No. 3, Blackwell Publishing [http://www.ingentaconnect.com/content/bpl/cgf/1997/00000016/00000003/art00171; May 10, 2010].
Tang et al., "VideoDraw: A Video Interface for Collaborative Drawing," CHI '90 Proceedings, Apr. 1990, pp. 313-320, Systems Sciences Lab., Xerox/Palo Alto Research Center, Palo Alto, CA.
Tang et al., "VisTACO: Visualizing Tabletop Collaboration," ITS '10, Nov. 7-10, 2010, 10 pages, ACM, Saarbrucken, Germany.
The Bumps, "An Important BumpTop Announcement," Apr. 30, 2010, http://bumptop.com, 1 page.
Thomas et al., "Animating Direct Manipulation in Human Computer Interfaces," Aug. 1997, 224 pages, South Australia.
Thomas et al., "Animating Direct Manipulation Interfaces," UIST 95, Nov. 14-17, 1995, 10 pages, ACM, Pittsburgh, PA.
Thomas et al., "Applying Cartoon Animation Techniques to Graphical User Interfaces," ACM Transactions on Computer-Human Interaction, vol. 8, No. 3, 2001, 25 pages, ACM.
Thomas et al., "Graphical Input Interaction Technique (GIIT),"Jun. 2-4, 1982, 26 pages, Workshop Summary, Battelle Seattle Conference Center.
Tidwell, "Designing Interfaces," 2006, 354 pages, O'Reilly Media, Inc., Sebastopol, CA.
TMobile, "Dash 3G," User Manual, 2009, 192 pages.
TMobile, "HTC HD2," 2010, 31 pages.
TMobile, "HTC Sensation 4G," Start Guide, 21 pages [no date available].
Toccata, "Demonstrating Interaction Techniques for an ATC Workstation," 1 page, CENA, Toulouse, France [no date available].
Tognazzini, "The 'Starfire' Video Prototype Project: A Case History," 2011, 12 pages, http://www.asktog.com/papers/videoPrototypePaper.html.
Tohidi et al., "Getting the Right Design and the Design Right: Testing Many is Better Than One," CHI 2006 Proceedings: Usability Methods, Apr. 22-27, 2006, pp. 1243-1252, ACM, Montreal, Quebec, Canada.
Tohidi et al., "User Sketches: A Quick, Inexpensive, and Effective Way to Elicit More Reflective User Feedback," NordiCHI 2006: Changing Roles, Oct. 14-18, 2006, pp. 105-114, ACM, Oslo, Norway.
Traynor, "Java Concise Reference Series, Swing and AWT," 2008, 799 pages, Newport House Books, LLC.
Truitt, "Electronic Flight Data in Airport Traffic Control Towers: Literature Review," Federal Aviation Administration Technical Report, Feb. 2006, 31 pgs., http://actlibrary.tc.faa.gov.
Truscelli, "Radius Full Page Pivot," Prova, Apr. 1992, 6 pages, Roma.
Tsang et al., "A Suggestive Interface for Image Guided 3D Sketching," Apr. 24-29, 2004, pp. 591-598, vol. 6, No. 1, Letters CHI, Vienna, Austria.

(56) References Cited

OTHER PUBLICATIONS

Tsang et al., "Boom Chameleon: Simultaneous capture of 3D viewpoint, voice and gesture annotations on a spatially-aware display," 10 pages, Toronto, Canada [no date available].
Tsang et al., "Temporal Thumbnails: Rapid Visualization of Time-Based Viewing Data," 8 pages, University of Toronto [no date available].
Tse et al., "Enabling Interaction With Single User Applications Through Speech and Gestures on a Multi-User Tabletop," AVI '06, Proceedings of Advanced Visual Interfaces, May 23-26, 2006, 8 pgs., ACM, Venezia, Italy.
Tse et al., "Freehand Touch Gestures," 2009, 2 pages, Mitsubishi Electric Research Laboratories, Cambridge, MA.
Tse et al., "GSI Demo: Multiuer Gesture/Speech Interaction over Digital Tables by Wrapping Single User Applications," ICMI, Nov. 2006, 9 pages, Mitsubishi Electric Research Laboratories, Inc., Cambridge, MA.
Tse et al., "Multimodal Multiplayer Tabletop Gaming," PerGames, May 2006, 11 pages, Mitsubishi Electric Research Laboratories, Inc., Cambridge, MA.
Tucker et al., "Programming Languages Principles and Paradigms," 2002, 423 pages, The McGraw-Hill Companies, Inc., New York, NY.
VAIO, "Using your VAIO computer," User Manual, 2004, 142 pages, Sony Corportation.
Verizon, "Droid Eris by HTC," User Guide, 2010, 260 pages.
Verizon, "HTC Rezound," Master Your Device, 2011, 41 pages.
Verizon, "HTC Rezound," User Guide, 2011, 348 pages.
Verizon, "HTC Rhyme," Getting Started Guide, 66 pages [no date available].
Verplaetse, "Inertial Proprioceptive Devices: Self-Motion-Sensing Toys and Tools," IBM Systems Journal, 1996, pp. 639-650, vol. 35, Nos. 3 and 4.
Verplaetse, "Inertial-Optical Motion-Estimating Camera for Electronic Cinematography," 1997, 109 pages, Massachusetts Institute of Technology, MA.
Viredaz, "The Itsy Pocket Computer Verison 1.5 User's Manual," Jul. 1998, 42 pages, Western Research Laboratory, Palo Alto, CA.
Viredaz, "The Memory Daughter-Card Version 1.5 User's Manual," Jul. 1998, 17 pages, Western Research Laboratory, Palo Alto, CA.
Virgin Mobile, "HTC Wildfire S," User Manual, 172 pages [no date available].
Vogel et al., "Distant Freehand and Pointing and Clicking on Very Large High Resolution Displays," UIST'05, Oct. 23-27, 2005, 10 pages, ACM, Seattle, WA, USA.
Vogel et al., "Hand Occlusion With Tablet -Sized Direct Pen Input," CHI 2009 Proceedings: Non-Traditional Interaction Techniques, Apr. 7, 2009, pp. 557-566, ACM, Boston, Massachusetts.
Vogel et al., "Interactive Public Ambient Displays: Transitioning from Implicit to Explicit, Public to Personal, Interaction with Multiple Users," UIST '04, Oct. 24-27, 2004, 10 pages, ACM.
Vogel et al., "Occlusion-Aware Interfaces," CHI 2010, Apr. 10-15, 2010, 10 pages, ACM, Atlanta, GA.
Wahl, "Team Designs Twist on Software, Virtual shapes created on a computer screen by manipulating *ShapeTape*, a flexible tape-like tool," Apr. 15, 2003, 2 pages, University of Toronto, News@UofT, Toronto, CA.
Wahlster, "An Intelligent Multimodal Interface," Methodologies for Intelligent Systems, 1988, pp. 101-111, vol. 3, Elsevier Science Publishing Co., Inc., Amsterdam, Holland.
Walker, "A Cornucopia of Touch Technology," Information Display, 2006, 7 pages, SID.
Walker, "Touch screen highlights from the SID 2006 show floor," Jun. 2006, 8 pages, Veritas et Visus, Touch Panel.
Wallace, "The Semantics of Graphic Input Devices," 5 pages, University of North Carolina, Chapel Hill, NC [no date available].
Want et al., "An Overview of the PARCTAB Ubitquitous Computing Experiment," Dec. 1995, 16 pages, IEEE.
Ware et al., "Reaching for Objects in VR Displays: Lag and Frame Rate," ACM Transactions on Computer-Human Interaction, Dec. 1994, vol. 1, No. 4, 26 pages.
Welch, "Hybrid Self-Tracker: An Inertial/Optical Hybrid Three-Dimensional Tracking System," 21 pages, University of North Carolina Chapel Hill, Chapel Hill, NC [no date available].
Wellner, "Adaptive Thresholding for the DigitalDesk," Jul. 1993, 18 pages, EuroPARC Technical Report.
Wellner, "Interacting With Paper on the DigitalDesk," Communications of the ACM, Jul. 1993, pp. 87-96, Association for Computing Machinery, New York.
Wellner, "Self Calibration for the DigitalDesk," Jul. 1993, 16 pages, EuroPARC Techincal Report.
Wellner, "The DigitalDesk Calculator: Tactile Manipulation on a Desk Top Display," Proceedings of ACM Symposium on User Interface Software and Technology (UIST '91), Nov. 11-13, 1991, pp. 27-33.
Westerman et al., "Multi-Touch: A New Tactile 2-D Gesture Interface for Human-Computer Interaction," Proceedings of the Human Factors and Ergonomics Society 45th Annual Meeting, 2001, 5 pages, University of Delaware.
Westerman, "Hand Tracking, Finger Identification, and Chordic Manipulation on a Multi-Touch Surface," Doctoral Dissertation, University of Delaware, 1999, 363 pgs.
Wigdor et al., "A Comparison of Consecutive and Concurrent Input Text Entry Techniques for Mobile Phones," Apr. 24-29, 2004, pp. 81-88, Letters CHI, vol. 6, No. 1.
Wigdor et al., "Effects of Display Position and Control Space Orientation on User Preference and Performance," CHI 2006 Proceedings: Multidisplay Environments, Apr. 22-27, 2006, pp. 309-318, ACM, Montreal, Quebec, Canada.
Wigdor et al., "Empirical Investigation into the Effect of Orientation on Text Readability in Tabletop Displays," 21 pages, University of Toronto [no date available].
Wigdor et al., "Living with a Tabletop: Analysis and Observations of Long Term Office Use of a Multi-Touch Table," Tabletop 2007, Dec. 2007, 9 pages, Mitsubishi Electric Research Laboratories, Inc., Cambridge, MA.
Wigdor et al., "Table-Centric Interactive Spaces for Real-Time Collaboration," AVI '06, 2006, 5 pgs., Association for Computing Machinery, Venezia, Italy.
Wigdor et al., "Table-Centric Interactive Spaces for Real-Time Collaboration," images, date unknown, 1 pg., Mitsubishi Electric Research Laboratories.
Wigdor et al., "Table-Centric Interactive Spaces for Real-Time Collaboration: Solutions, Evaluation, and Application Scenarios," journal, date, and publication information unknown, 6 pgs.
Wigdor et al., "TilfText: Using Tilt for Text Input to Mobile Phone," 2003, ACM, pp. 81-90, UIST, Vancouver, BC, Canada.
Wigdor et al., "Under the Table Interaction," UIST '06, Oct. 15-18, 2006, pp. 259-268, ACM, Montreux, Switzerland.
Wigdor, "Perception of Elementary Graphical Elements in Tabletop and Multi-Surface Environments," CHI 2007 Proceedings: Innovative Interactions, Apr. 28-May 3, 2007, pp. 473-482, ACM, San Jose, California.
Wikipedia, "Xgl," From Wikipedia, the free encyclopedia, 1 page, [no date available].
Wilson et al., "FlowMouse: A Computer Vision-Based Pointing and Gesture Input Device," 14 pages, Microsoft Research, Redmond, WA [no date available].
Wilson, "Robust Computer Vision-Based Detection of Pinching for One and Two-Handed Gesture Input," UIST '06, Oct. 15-18, 2006, 4 pgs., ACM, Montreux, Switzerland.
Wilson, "TouchLight: An Imaging Touch Screen and Display for Gesture-Based Interaction," ICMI '04, Oct. 13-15, 2004, 8 pages, ACM, Pennsylvania, USA.
Wilson., "Play Anywhere: A Compact Interactive Tabletop Projection-Vision System," UIST'05, Oct. 23-27, 2005, 10 pages, ACM, Seattle, WA.
Wittenburg, Research On Public, Community, and Situated Displays at MERL Cambridge, Nov. 2002, 6 pages, Mitsubishi Electric Research Laboratories, Inc., Cambridge, MA.
Wolfeld, "Real Time Control of a Robot Tacticle Sensor," 1981, 68 pages, University of Pennsylvania.

(56) References Cited

OTHER PUBLICATIONS

Woodfill et al., "Real-Time Stereo Vision on the Parts Reconfigurable Computer," IEEE Symposium on FPGAs for Custom Computing Machines, Apr. 1997, 10 pages.
Wu et al., "Gesture Registration, Relaxation, and Reuse for Multi-Point Direct-Touch Surfaces," Tabletop '06, Proceedings of the First IEEE International Workshop on Horizontal Interactive Human-Computer Systems, 2006, 8 pgs., IEEE.
Wu et al., "Multi-Finger and Whole Hand Gestural Interaction Techniques for Multi-User Tabletop Displays," 10 pages, to appear in ACM UIST 2003, Department of Computer Science, University of Toronto, CA.
Yamaashi et al., "Beating the Limitations of Camera-Monitor Mediated Telepresence with Extra Eyes," Proceedings of CHI '96, ACM Conference on Human Factors in Computing Systems, 1996, pp. 50-57, ACM, New York [http://www.billbuxton.com/ExtraEyes.html].
Yeh et al., "Optics of Liquid Crystal Displays," 1999, 10 pages, John Wiley & Sons, Inc., New York.
Zhai et al., "The "Silk Cursor": Investigating Transparency for 3D Target Acquistion," Human Factors in Computing Systems, Apr. 24-28, 1994, 7 pages, ACM, Boston, MA.
Zhai et al., "The Influence of Muscle Groups on Performance of Multiple Degree-Of-Freedom Input," Proceedings of CHI '96, Apr. 13-18, 1996, pp. 308-315, ACM, Inc., Vancouver, B.C., Canada.
Zhai et al., "The Partial Occlusion Effect: Utilizing Semi-Transparency in 3D Human Computer Interaction," ACM Transactions on Computer-Human Interaction, 1996, pp. 254- 284, ACM, vol. 3, No. 3 [http://www.billbuxton.com/silk.html].
Zhao et al., "earPod: Eyes-Free Menu Selection Using Touch Input and Reactive Audio Feedback," CHI 2007 Proceedings: Alternative Interaction, Apr. 28-May 3, 2007, pp. 1395-1404, ACM, San Jose, California.
Zhao et al., "Simple vs Compound Mark Hierarchial Marking Menus," UIST '04, Oct. 24- 27, 2004, 10 pages, ACM.
Zimmerman et al., "Applying Electric Field Sensing to Human-Computer Interfaces," [was to be published in] IEEE SIG CHI, 1995, 8 pgs.
Zukowski, "Java 1.1, JAVA AWT Reference," 1997, 1080 pages, O'Reilly & Associates, Inc., Sebastopol, CA.
Zukowski, "Java AWT Reference," 1997, 1085 pages, O'Reilly, Sebastopol, CA.

* cited by examiner

PORTABLE COMPUTERS

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

*CROSS REFERENCE TO RELATED APPLICATIONS*

*This application is a divisional broadening reissue application of broadening reissue application Ser. No. 13/188,239, filed Jul. 21, 2011, which in turn is a divisional broadening reissue application of Ser. No. 11/907,832, filed Oct. 17, 2007, now U.S. Pat. No. Re. 42,738; which in turn is a broadening reissue application of Ser. No. 09/171,921, now U.S. Pat. No. 6,956,564, issued Oct. 18, 2005; which is the 35 USC 371 National Stage Entry of International patent application serial number PCT/GB98/03016, filed Oct. 8, 1998, claiming priority of GB9722766.4, filed Oct. 28, 1997, the entire disclosures of which are herein incorporated by reference in their entireties; and is related to the following reissue applications: Ser. No. 12/255,557, filed Oct. 21, 2008; Ser. No. 12/268,254, filed Nov. 10, 2008, now U.S. Pat. Re. 44,103; Ser. No. 12/268,336, filed Nov. 10, 2008.*

BACKGROUND OF THE INVENTION

1. Field of the Invention

The present invention relates to portable computers and more particularly but not exclusively to hand-held computers of the kind sometimes referred to as personal digital assistants.

2. Related Art

A personal digital assistant includes data files defining such items as an electronic diary, address book and other applications such as word processing software, calculators and the like. As more powerful memories and processors have been developed in smaller packages it has become possible to provide quite powerful computers in relatively small portable eases. However, the limitation of miniaturisation occurs when a viewing screen and keyboard are needed for data input and read out. Thus, so called palm top personal computers (PPC) are usually of the order of 15 cm by 7 cm in order to provide a readable screen and a usable keyboard. Such palm top computers are known, for example Psion Corporation have produced a Psion Series 5 (trade mark) PPC having an 8 megabyte RAM and processor while Hewlett Packard similarly produce PPCs as e.g. the HP320LX (trade mark). The capabilities of such PPCs may be enhanced by incorporating so called flash cards enabling the expansion of the RAM by up to 10 megabytes or more while PCMCIA cards may be provided to enable connection of the PPC to telephone networks by way of cellular phones or telephony sockets for communication with other computers and the so called Internet and Intranets.

Most PPCs incorporate it docking arrangement to enable them to be connected with a desktop computer or other main frame for the purposes of synchronisation of data files and the like.

However, generally speaking PPCs are not robust and are prone to damage mainly because of the clam shell design requiring a hinge that opens to reveal the incorporated keyboard and screen. Thus PPCs are more usually used on a desk top or table or may be held in one hand while typing with the other.

SUMMARY OF THE INVENTION

According to the present invention there is provided a portable computer including movement detection means responsive to movement of the computer to produce an electrical output signal representative of such movement, processing means responsive to the output of said position detection means to determine detected movement data defining a user's intention, the processing means using said data to provide a mode response selected from a multiplicity of stored possible modes.

Preferably the movement detection means includes at least one acceleration or tilt detection means responsive to movement of the computer to produce the output electrical signal. There may be a plurality of acceleration detection means each producing a respective electrical output signal representative of movement components in respective directions, the detectors generally being mounted to detect X and Y movement components at a ninety degree angle.

The processing means may include a data input mode in which detected movement data is used to generate alphanumeric or graphical data. The alphanumeric or graphical data may be stored in data storage of the portable computer or may be output by transmitting means to receiving means connected to another processing device.

The processing means may include a screen output mode in which detected movement data is used to modify output to display means of the computer whereby scrolling of displayed information is effected. In the screen output mode the processing means may be responsive to relative lateral tilting movement to cause the display of information stored as to one or other side of currently displayed information. Relative rolling movement may cause the display of information stored as above or below the currently displayed information.

In the screen output mode the processing means may be responsive to detected movement data to determine a most likely orientation of the computer display means with respect to a user's eye line whereby the signals output to the display means may cause inversion of the displayed information such that the computer may be held and used in either hand.

The computer may include proximity detection means arranged to provide signals indicative of the proximity of the display screen to a user's view, the processing means being responsive to changes in the relative proximity to increase or decrease density of displayed information.

In a further development, security data derived from movement of the computer defining an authorised user's password is stored, the processing means being locked in a secure mode until detected movement data corresponding to the security data is received.

The computer may include a sound input device, the processing means having a second data input mode in which alphanumeric data is derived from input speech signals. A sound output device may also be included to permit the output of speech derived from stored data. Alternatively the sound input and output devices may be combined with a radio transceiver whereby cellular or other radio telephony networks may be used.

The computer may be housed in a casing shaped to facilitate a user holding the computer as if holding a writing stylus. The casing is preferably of substantially radiused triangular cross section along a substantial portion of its length and may include a flattened section incorporating a display screen. The casing may include angular shaping between a forward holding area and a rearward screen area the shaping being such as to provide a natural viewing angle of an incorporated display screen while the casing is held as a writing stylus. The shaping may also be such as to facilitate support of the rearward screen area by the dorsal aspect of a user's hand between the root of the thumb and index finger and the wrist.

BRIEF DESCRIPTION OF THE DRAWINGS

A portable computer in accordance with the invention will now be described by way of example only with reference to the accompanying drawings of which.

DETAILED DESCRIPTION OF THE EXEMPLARY EMBODIMENTS

Figure 1:
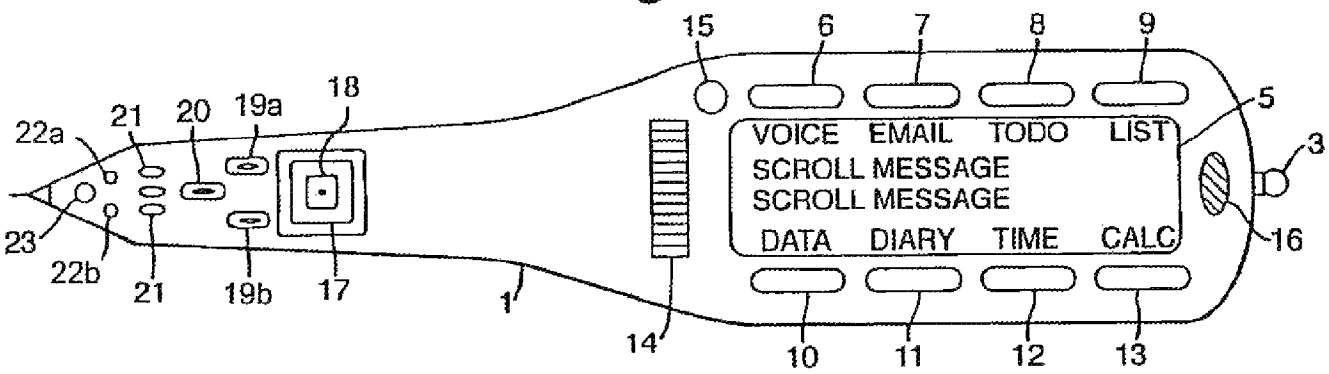
FIG. 1 shows a plan view of the computer.
Figure 2:
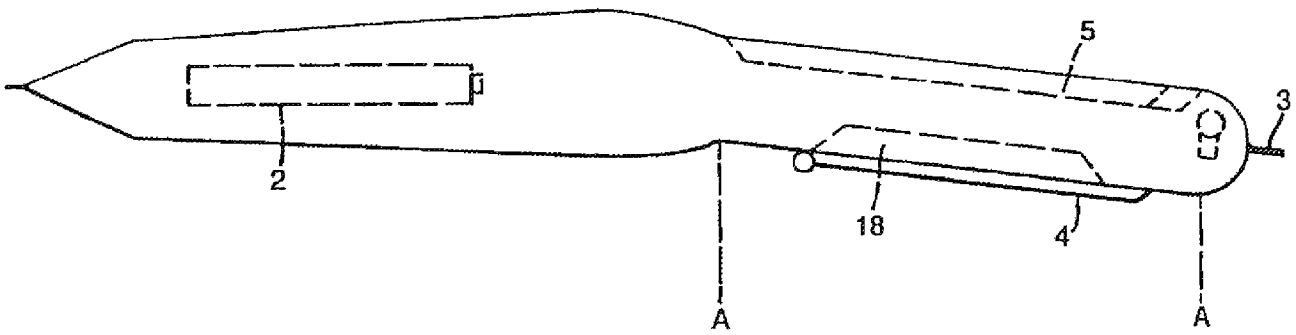
FIG. 2 shows a side view-of the computer of FIG. 1.

Referring to FIGS. 1 and 2, the hand-held computer of the present invention has a case 1 of a moulded plastics material having a triangular barrel cross section towards the forward end, that is towards the point, with radiused sides providing a diameter of approximately 15 mm. The case is shaped to have a curve so that when the forward part of the barrel of the casing is held as a writing stylus using the thumb, index finger and second finger of the user, the screen area A—A rests comfortably on the dorsal area at the back of the hand between the root of the thumb and index finger of the hand and the user's wrist. This provides some additional support to allow the entire computer to be operated using one hand only. After assembly the case is sealed using an O-ring seal much in the manner of sealing watch parts. Coating the casing with wax polythene completes the sealing of the unit so that to all intents and purposes the case is waterproofed.

The casing is weighted at one end (for example by including a rechargeable battery 2) at the forward end so that if the item is dropped on to a surface it tends to fall in a specified manner such that the tip which may include some impact protection, for example by being rubber cased, prevents any significant damage to internal components. The weighting also assists balancing of the unit in a user's hand.

The case may incorporate a hook 3 for attachment of a strap or key ring (not shown) and may have a pocket clip 4. The hook is preferably recessed within the casing.

Externally mounted a small liquid crystal diode screen which may be of the kind manufactured by Batron and supplied under type number BT42003STYC is included. To either side of the LCD 5 touch or pressure sensitive switches 6 to 13 are provided. These switches may be soft programmed to provide functions as hereinafter described. A touch scroll strip 14 (hereinafter described) is provided in front of the screen 5 and the system includes a pyroelectric detector 15 used in determining the proximity of the computer to a user's eye.

Audio input and output devices are also provided together with an alerting device. For example, a microphone 16, annunciator 17 and speaker 18 may be included. Finger switches 19a, 19b, 20 are provided forward of the annunciator 17 and again may be soft programmed for functionality. Also visible are gold docking pins 21 used for connecting the hand-held computer for recharging of the battery 2 and transfer of data by way of a docking device to other computers, for example desk mounted personal computers.

As an alternative means of transferring data from the computer of the invention to another processing device or to enable the computer of the invention to be used as an input device for a PC, an infrared transceiver 22a, 22b is mounted towards the front of the casing 1.

Also included is a light emitting diode 23 which may be of the kind having three or more colours. Individual colours allow for a small amount of illumination or may be used to provide indication or alarm functions. Alternatively, a single coloured red light emitting diode part TLSH180P from Toshiba may be used. This ultrabright LED aids human night sight viewing and whilst only being of low power may in a dark environment assist the user.

Figure 3:
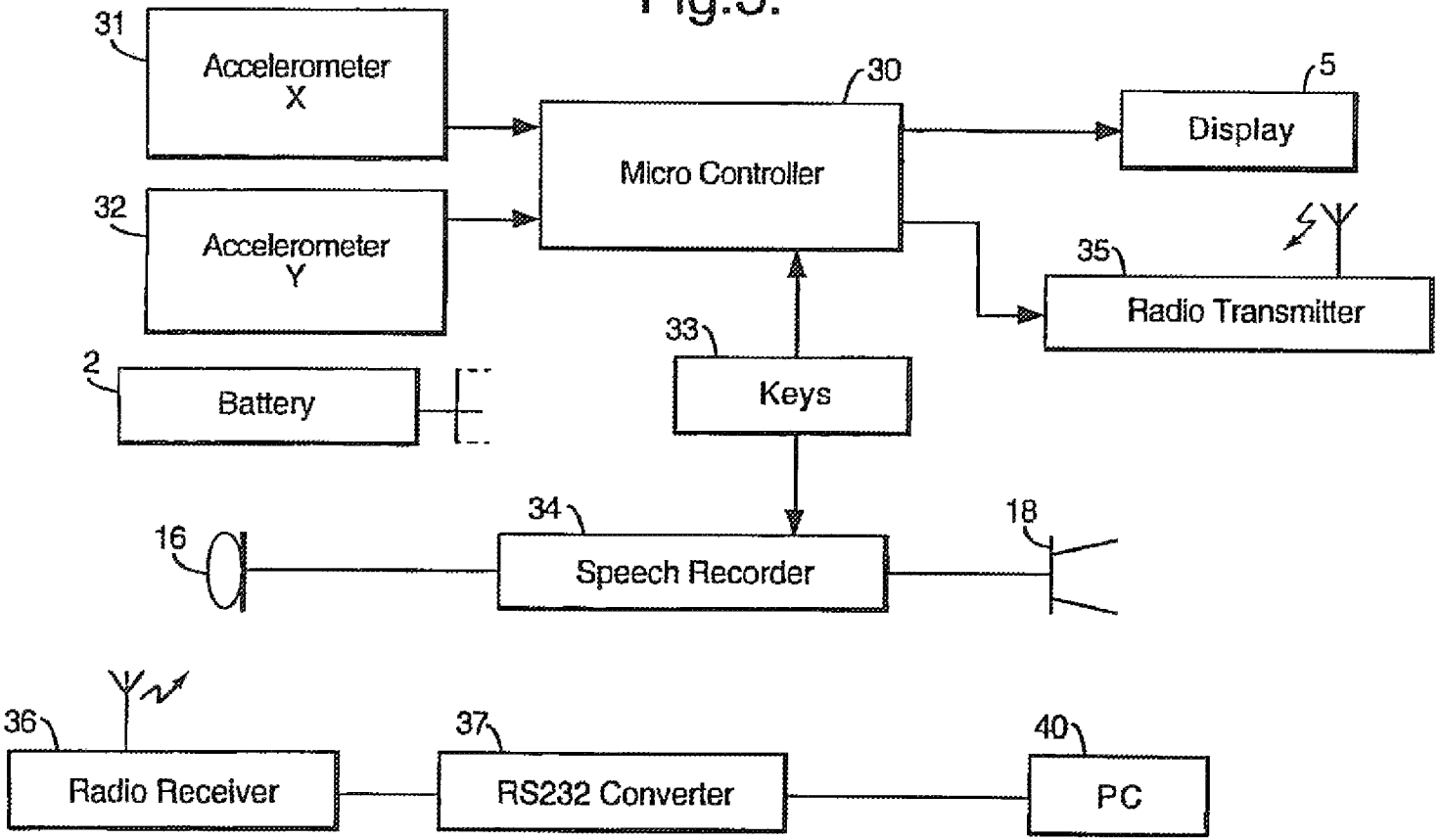
FIG. 3 is a block schematic diagram of the circuits of the computer of FIG. 1.

Turning now to FIG. 3, a block schematic diagram of the component parts of the computer is shown. It will be noted that the display 5 receives inputs from a microcontroller 30 which may be of the type supplied by Microchip under the reference PIC16C74. The PIC16C74 includes on board read only memory (ROM) but in a preferred embodiment an ARM processor with a larger memory is used. Also mounted within the casing 1 are two accelerometers 31, 32 which may be of the kind known as ADXL05 from Analog Devices Limited and which are buffered by operational amplifiers, for example National Semiconductor type LPC662. The keys 6 to 13 and 18 to 20 are here represented as a keypad 33. Some of the keys may be used to control a speech recorder 34 which is also used as an interface between the microcontroller 30, and microphone 16 and the speaker 18. A radio transmitter 35, which may be a radio transceiver, is also incorporated.

One function of the radio transmitter may be to allow use of the hand-held computer of the invention as an input device for a desk mounted or other PC 40 having corresponding receiver 36 and an appropriate converter without physical interconnection. Other functions of the transceivers 35, 36 may be apparent from the description hereinafter.

Figure 4A:
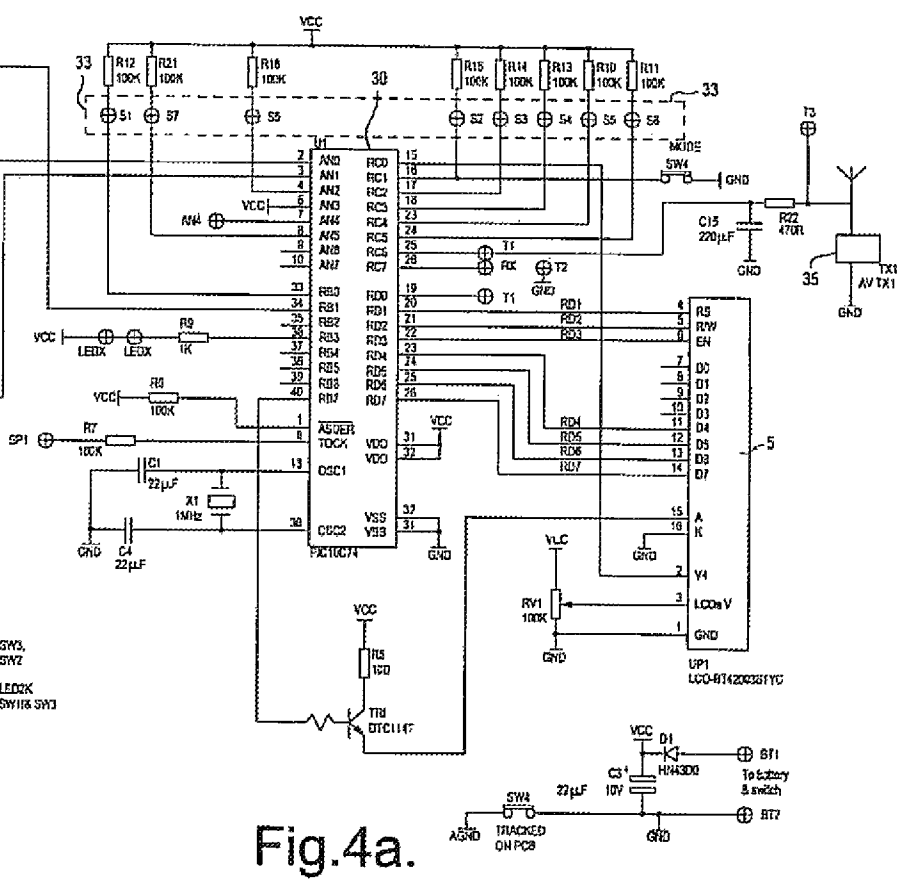
FIGS. 4a and 4b provide a circuit diagram showing details of the circuitry described with respect to FIG. 3.
Figure 4B:
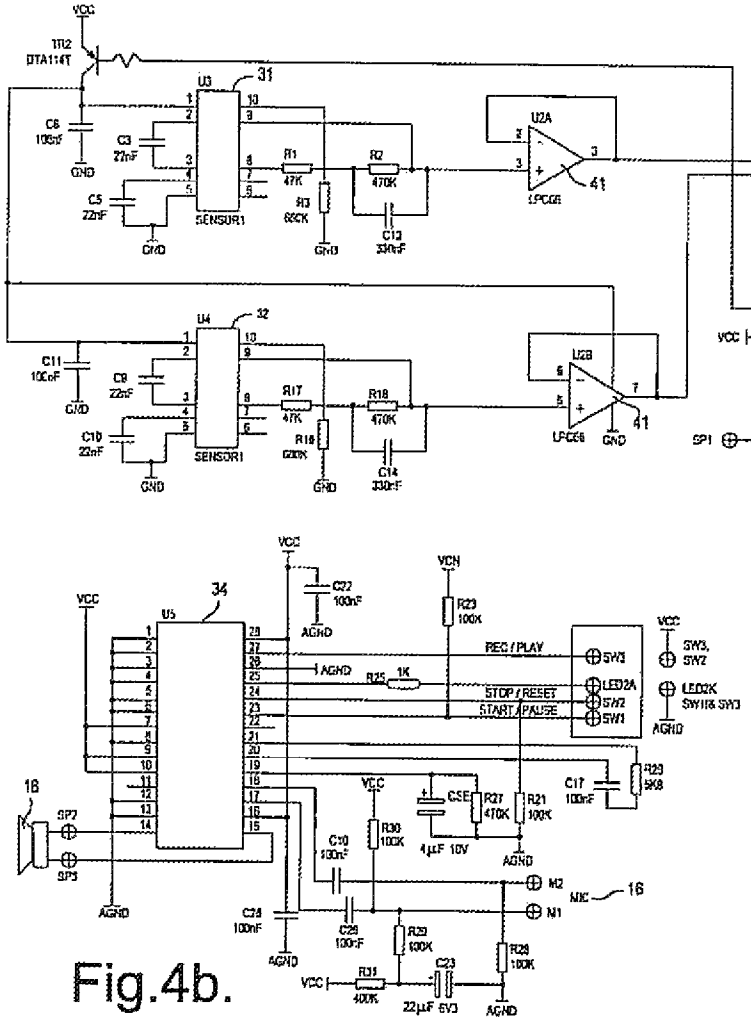

Referring now to FIGS. 4a, 4b the microcontroller 30 is connected to the display 5 using standard control inputs of the display to provide a visual output of the result of program activities requested by the user. It will be noted that the accelerometers 31 and 32 have associated buffer circuits which each include an operational amplifier to buffer the input to the microcontroller. The operational amplifiers 41 may be type LFC662 from National semiconductor.

Power to the accelerometers 31 is by way of a transistor TR2 so that if the microcontroller 30 determines that no movement of the computer is occurring or that the present program does not require use of the accelerometers 31 and 32, output RB1 may be set to stop current being drawn to minimise battery usage. The microcontroller may allow periodic sampling during dormant periods so that if the computer is picked up the sensors may again be activated.

An EEPROM integrated circuit chip type X24F064 8 Kbyte from Xicor providing 8 Kbytes of memory is also provided accessible from the microcontroller 30 in known manner. Switches S1 to S8 (keys 33 in FIG. 3) are wired to respective inputs of the microcontroller 30.

Note that TR1 controls power input to the back lighting circuitry of the LCD display 5. Again, the microcontroller 30 will normally bias TR1 off when the computer is dormant and will maintain TR1 biased off unless back lighting is requested by operation of one of the keys of the keyboard 33.

For the avoidance of doubt it is here noted that the microcontroller 30 includes a program which uses position outputs from the accelerometers 31, 32 to determine from the orientation of the computer whether the hand-held computer is in the left hand or right hand of the user. It is here noted that accelerometer output may depend upon the tilt angle of the included accelerometers to the earth's gravitational field. The keys S1 to S8 are then swapped over in soft programming mode such that functionality is determined by the apparent top of the display 5 to the user in its current position. Similarly, determination of orientation of alphanumeric or other display information on the screen 5 will be determined from the orientation of the computer itself. Thus, data output to the screen from the controller 30 arranged to provide an appropriately oriented display.

The speech recorder 34 is implemented using Sequoia technology sound recording integrated circuit type ISD2560. The Sequoia technology chip is capable of recording 60 seconds of speech message in digital form and is connected so that the microphone 16 can be used to provide an input. The three switches SW1, SW2 and SW3 may correspond to the fingertip switches 18 to 20 of FIG. 1 or may be selected in software from keys 6 to 13.

In speech recording mode SW1 provides a start and pause control function for the user, SW2 is a stop or reset function while SW3 switches between the record and play modes.

Short messages are played back by way of the loud speaker 18. As currently implemented the microphone 16 is a Maplin type QY628, the speaker is from Hosiden type HDR9941. "Speech notes" recorded by this method may be down loaded to a PC for sorting and categorising.

Figure 5:
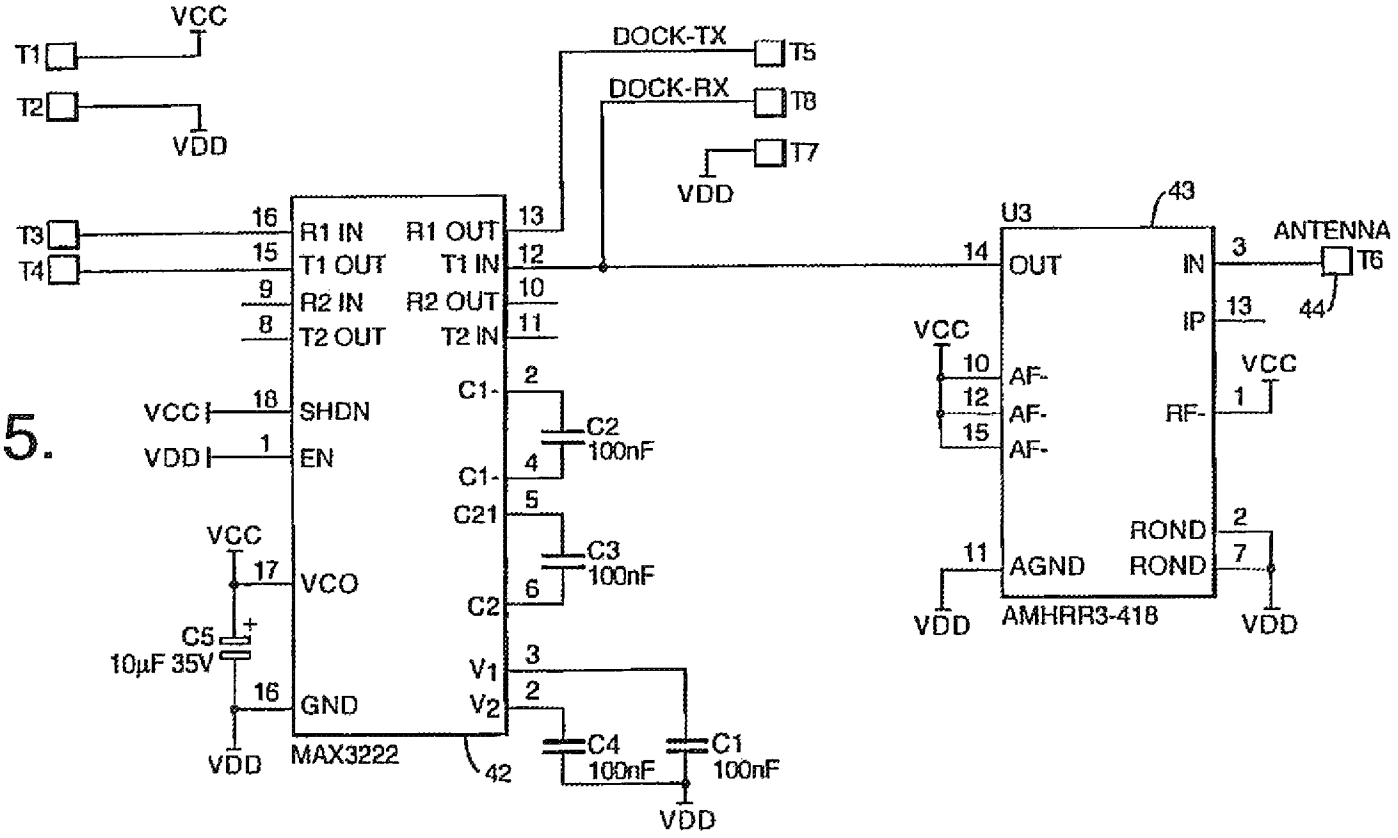
FIG. 5 is a circuit diagram of a docking station to enable the computer of FIG. 1 to be connected to a desktop or other device.

Turning briefly to FIG. 5, the hand-held computer of FIG. 1 can be inserted in a corresponding docking port shaped to align the contact 21 with T5 to T7 of FIG. 5. The contact T5 and T8 provide serial receive and transmit paths for synchronising databases between a PC and the portable computer and also provide battery charging. Contact T7 provides an earth contact. Speech samples and other data may be up loaded from a PC to the portable computer.

A Maxim integrated circuit 42, which may be type MAX232IC, converts RS232 level serial output and input required by current PCs to the voltage level required by the microcontroller 30 of FIG. 4. Note also the ability to receive radio input by way of an antenna connected to the radio receiver chip type AMHRR3-418.

Having discussed the hardware of the portable computer of the invention we shall now consider various uses to which the writing stylus input, voice input and screen may be used. Exemplary flow charts for some aspects of the use of the portable computer are attached. While functions are individually discussed in respect of the flow charts of FIGS. 6 to 9, it will be appreciated that combinations of programs may be used in the implementation of features described hereinafter.

Figure 6:
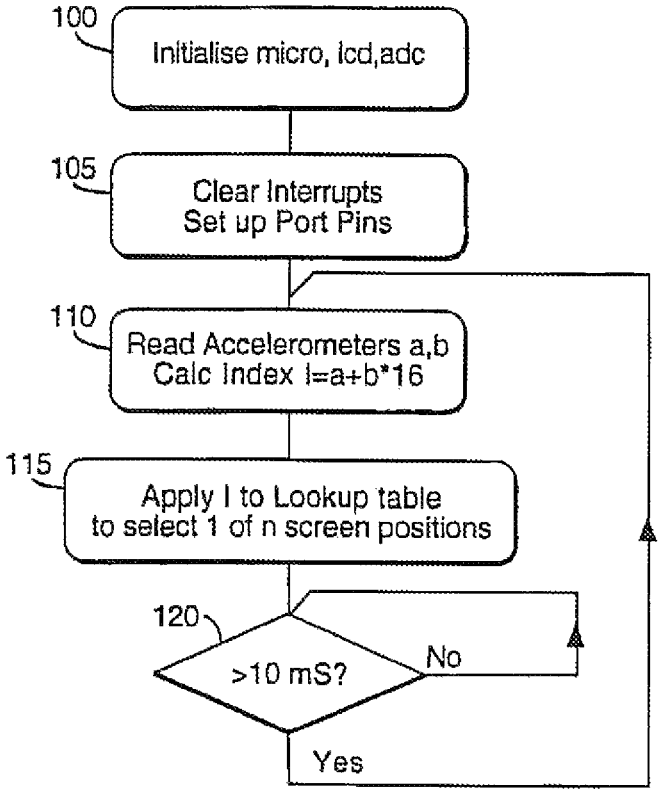
FIGS. 6 to 9 are flow charts showing some of the programs incorporated in the microprocessor of FIG. 4.
Figure 17:
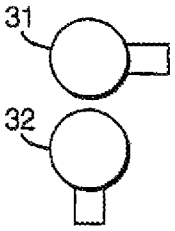
FIG. 17 shows mounting positions of the accelerometers of FIG. 4 with respect to each other.

Turning now to FIG. 6, the tilt sensor software uses inputs from the accelerometers 31, 32 which, as shown in FIG. 17 to which reference is additionally made, are mounted with their respective sensitive axes at right angles to each other. As will have been seen from FIG. 4, the output from each accelerometer is filtered by a resistor capacitance network to remote high frequency noise for example, and the outputs are then read by an analogue to digital converter included within the microcontroller 30. Thus, referring to FIG. 6, for special sensing the microcontroller 30, display 5 and analogue to digital conversion circuits are initialised at 100 and the interrupts and port pins of the microcontroller 30 are reset or cleared at 105. The output of the accelerometers 31, 32 is read from respective analogue input pins AN0 and AN1 of the microcontroller 30 and an index to a look up table is calculated at step 110 using the formula $I=a+(b1\times16)$. In this case a is calibration constant and b1 is the digitised output of the accelerometer 31. This allows for a look up table allowing a16 by 16 matrix of left to right position to be determined. For vertical tilt position the formula $I=a+(b2\times16)$ where b2 is the output of the accelerometer 32 may be used to address a further matrix to determine the relative up/down position. By applying one or more of the indices to the look p table, it is possible to select one of n screen positions or to determine the amount of movement since the last reading at step 115. The system then waits for 10 ms as indicated at step 120 before repeating the reading of the accelerometer output.

The program allows for the screen 5 to be scrolled in accordance with the user's requirements. The mounting of these sensors, as shown in FIG. 17, allows posiitonal movement such as up, down, left and right to resolved to fractions of a degree.

Figure 18:
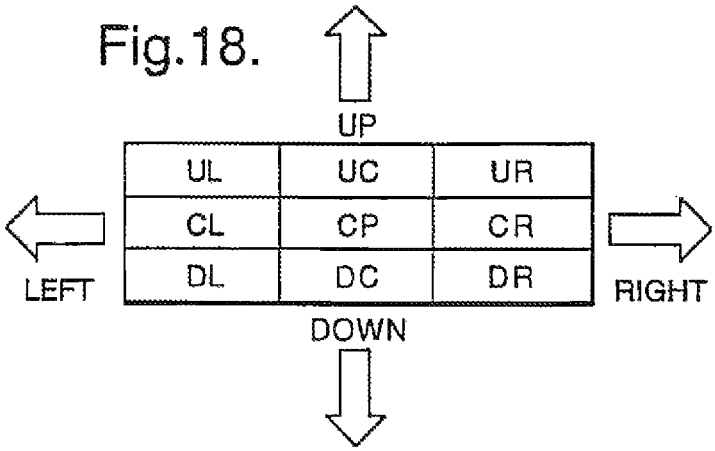
FIG. 18 is a table showing a program response to movement of the accelerometers of FIG. 16 in a particular mode of operation.

Using software the microcontroller 30 may use the output from the accelerometers 31, 32 to determine a user's requirement for a different view to be displayed on the screen 5. Thus a virtual hinge is created such that if the user moves the stylus whilst it is in viewing position the screen information may be changed to respond to a natural reaction for looking up or down or to the left or right. Thus, as shown in FIG. 18 in a simplified arrangement, if the display on the screen at any time is designated as current page (CP) then tilting the stylus towards the left will cause the display of a page stored as to the right of CP (CR). The page which was formerly CR (as represented by data held within the storage of the microcontroller 30 or an associated data store) is now CP. Tilting the stylus to the right will cause a page of information (CL) to the left of CP to be displayed. For the avoidance of doubt the term page is used here as for a screen for information. Thus the action of tilting the stylus to the left or right is analogous to the natural inclination to look through a window towards the right or left to obtain additional information from a scene.

Similarly, if the stylus is turned towards the user information stored at UC will be displayed and tilting the stylus away results in the information DC being displayed. It will be appreciated that combining tilt angles may result in the display of information up and to the left (UL), up and to the right (UR), down and to the left (DL) and down and to the right (DR). This simplified description of a multiple line screen moving as if a jump is occurring should be considered as allowing single line scrolling in which CP defines the top line of the screen, DC the line below and further lines to the limit of screen viewability also being displayed with CP such that single line scroll movement or smooth scrolling appears to occur. Finer scrolling modes such as single pixel movements are also possible. The user may select the rate of response using keys 6 to 13 or fingertip switches 18 to 20. It should also be noted that the tilt sensor arrangement 31, 32 allows the microcontroller 30 to determine the most likely viewing angle and to adjust pixel mapping to the screen accordingly so that if a user holds the stylus in the left hand the display is inverted to that shown in FIG. 1 so that the bottom right corner, as viewed by a right handed user, becomes the top left corner as viewed by a left handed user. It should be noted that the microcontroller does not require an input from the user to determine whether the stylus is being held in the left or right hand and, if a user changes hands during the course of viewing the screen output will be inverted accordingly.

It is also possible, particularly if pictorial rather than alphanumeric display is required, for the screen to enter a "portrait" mode if the stylus is held vertically. In this case the orientation will be appropriate to the stylus being held with its tip above or below the waist of the stylus.

To prevent scrolling or orientation change the user may use a soft key 6 to 13 or fingertip switch 18 to 20 to lock and unlock display movement.

Further, while as described with reference to FIG. 3, the display screen is a Batron, in a preferred embodiment a Kopin Cyberdisplay 320 having ¼ VGA colour resolution may be used. Using the Kopin display and the associated monocular viewing lens mounted end on to the body allows clear viewing of some 15 lines of normal text. The Kopin Monocular lens is approximately 20 mm by 18 mm which gives an acceptable size to a pen body incorporating movement sensing means as herein described.

In a still further development the pyroelectric detector (Murata type IRA- E700STO) 15 may be used to detect the presence of the user and the proximity of the user to the viewing screen 5. Using the Kopin ¼ VGA display it is possible to decrease the size of character displayed. Thus the microcontroller 30 uses the output of the pyroelectric detector 15 to determine how close to a user's eye the stylus is held and may adjust the size of print so that more characters are fitted on the screen 5. In this way large areas of text may be read by holding the screen close to the user's eye. A further use of the pyroelectric detector for power saving purposes it discussed hereinafter. As has been mentioned detection of the position of the screen with respect to the user's left or right side is possible.

Figure 8:
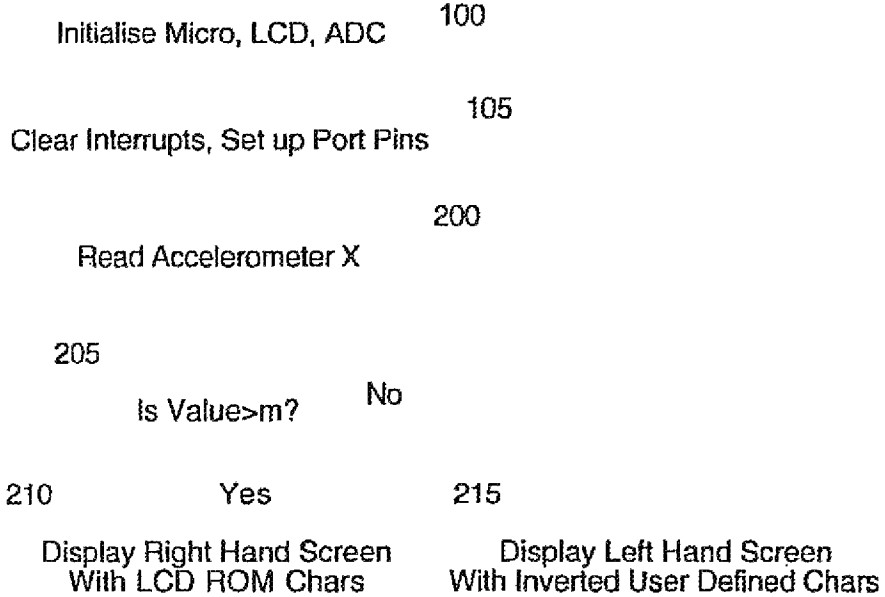

Referring to FIG. 8, clearing of interrupt and set port pins and initialisation as previously mentioned with regard to FIG. 6 is carried out. One of the accelerometers, for example the accelerometer 31, is read at step 200 and its value compared with a predetermined value m. Values greater than m indicate that the display is most likely in the user's left hand so that as indicated at 215 inverted characters are displayed on the screen 5. If the value read from accelerometer 31 is less than m then it may be assumed that the stylus is in the user's right hand and normal ROM LCD characters are displayed. As indicated at 220, a check may be carried every 10 ms to determine the whereabouts for the screen.

It is envisaged that input to the computer system either for use as a PDA or for word processing purposes, will be carried out either by hand writing recognition (HR) or by voice input using the microphone 16. Handwriting recognition does not require the user to write on a surface, although some users may find this a preferable method of operation, but requires the user merely to move the stylus (that is the whole computer) as if writing letters and numbers. Katakana or Cyrillic texts may also be entered as may symbols.

Figure 11:
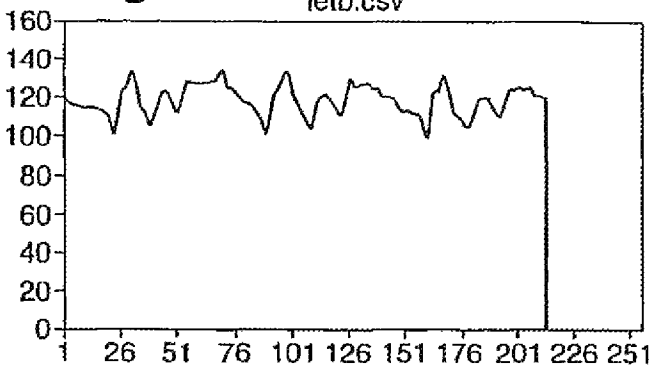
FIGS. 10 to 13 are graphical representations of the outputs of the accelerometers of FIG. 4 as analysed by the microprocessor.
Figure 10:
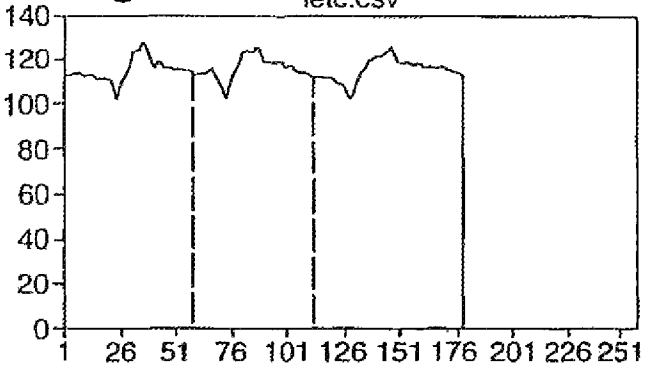
Figure 13:
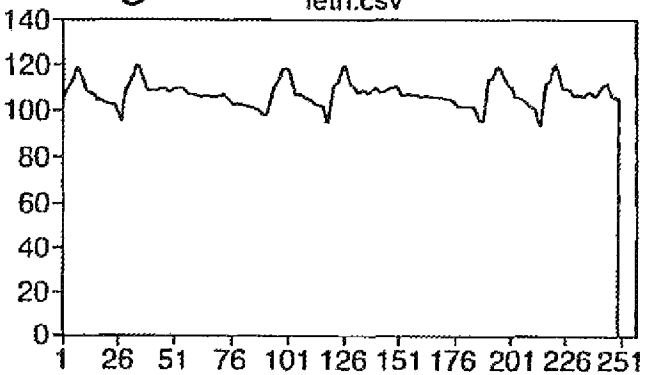
Figure 12:
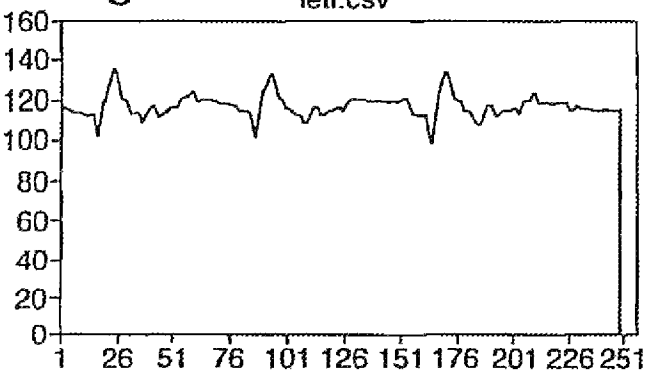

Thus using one of the two accelerometers 31, 32 and referring to FIGS. 10 to 14, the output of one of the accelerometers 31, 32 is read at a simple rate of 100 times per second. The received data is stored in a random access memory (RAM) buffer as a set of acceleration values against unit time. Using a software process of autocorrelation the microcontroller 30 may determine the character entered. Thus, referring to the Figures, FIG. 10 shows three entries of the letter C, FIGS. 11 shows three entries of letter B, FIG. 123 entries of letter F and FIG. 13 three entries of letter H for exemplary purposes only. Feedback to the user either on the display or by character speech output or simply by an acoustic beep indication may be used to note acceptance of a character. The validity indication may be user selectable.

Figure 14:
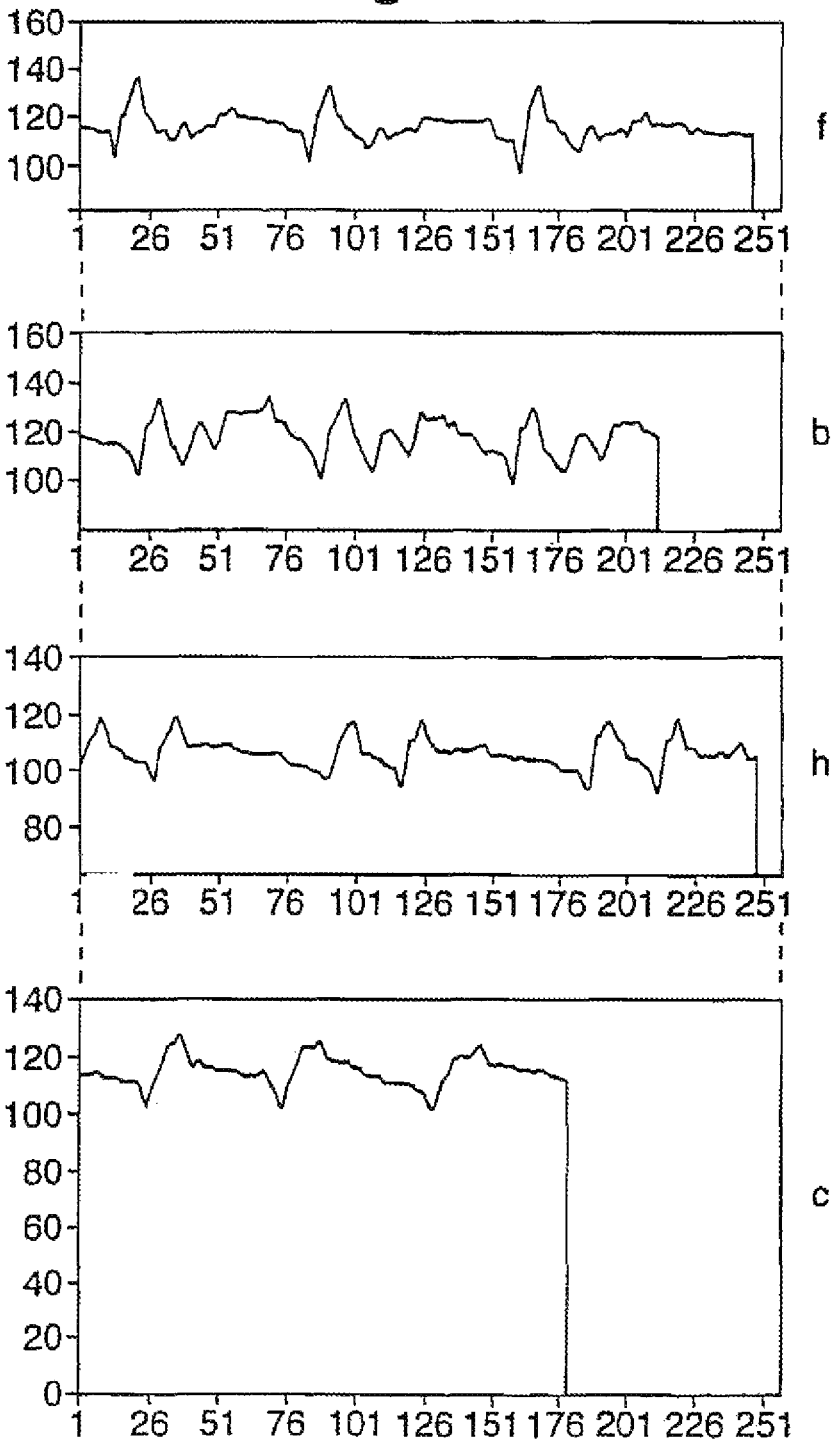
FIGS. 14a and 14b provide a graphical comparison of the representations of the outputs of the accelerometers as shown in FIGS. 10 to 13.

It will be noted from FIG. 14 that a single accelerometer output is distinct for each of the input characters and therefore the microcontroller can determine the entry made. The entry may be of text which can be reflected to the viewing screen 5 or maybe instructions couched in appropriate terms such as "get Monday diary". Once the diary has been recovered from the store the appropriate entries may be displayed on the screen 5 with appropriate soft key indications for the keys 6 to 13.

Note that predefined user gestures such as drawing an "envelope" to request e-mail mode or a table for diary mode, for example, may be used. The instructions may be user selectable or teachable so that on initialisation the user draws and selects the mode. Subsequently drawing the same symbol will cause the microcontroller 30 to enter the appropriate selected mode.

Again sensing may be used to move around the displayed area (as discussed with reference to FIG. 6 and FIG. 18) or the touch strip controller 14 may be used in combination with the keys 6 to 13 to select appropriate areas.

Figure 19:
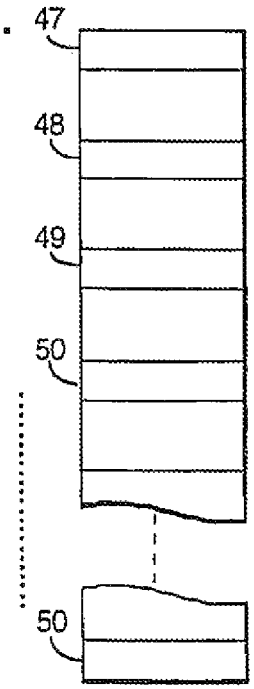
FIG. 19 is a schematic diagram of a part of a scroll detector of the portable computer of FIG. 1

Entry of information to the diary may also be by handwriting input. It is convenient here to consider the construction of the touch strip 14 which as shown in FIG. 19 comprises a 0.4 mm printed board having a surface area of approximately 20 mm by 5 m with horizontal strips in the 5 mm dimension as indicated as 47 to 50 for FIG. 19 which shown a part of the strip 14. The strip 14 thus replaces the rotational elements of potentiometer so that hermetic sealing of the casing may be complete and a control which is resistant to wear as provided. The strips 47 to 50 etc, are interfaced to the microcontroller 30 so that as a finger is moved across the strip direction of movement and speed of movement may be determined. The information may be used in the same way as a rotary potentiometer.

It will be appreciated that incorporating a second strip at right angles to the strip 14 would allow full functionality of (eg) a computer mouse to be simulated.

Thus as shown in FIG. 19, if a user moves a finger such that, for example, the presence of the finger bridging 48, 49 and 50 subsequent to the presence of a finger bridging 47 to 50 indicates that the user would wish to rotate a potentiometer in a counter-clockwise direction. Similarly, detection of a finger bridging 47 and 48 subsequent to there having been no previous bridge indicates rotation in a clockwise direction.

It will be appreciated, however, that if the tilt detection mechanism hereinbefore described indicates that the device is in the left hand rather than the right hand the functionality of bridging and unbridging is reversed accordingly.

Entry of data files, for example the composition of letters or reports can be carried out using either the write sensing arrangement, hereinbefore described, to determine input alphanumeric which may be stored for subsequent transmission to a printer or for transfer as data files to a PC for example. Data entered and converted into appropriate stored information may be displayed on the display screen if required.

Cursor movement around the display screen to select a position to which information is to be placed may be by use of either the potentiometer arrangement described with reference to FIG. 19 or by use of the tilt sensing mechanism hereinbefore described in combination with one of the soft keys to indicate that an insert or delete position is being selected.

Figure 7A:
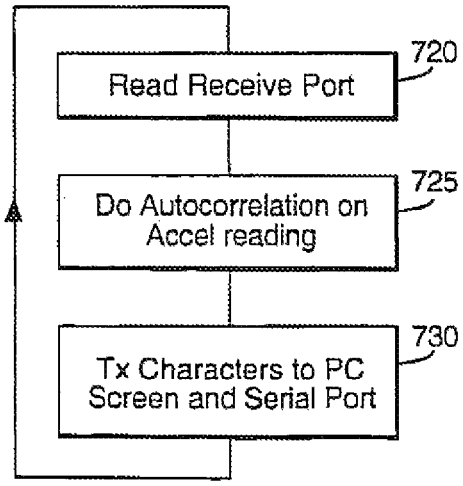
Figure 7B:
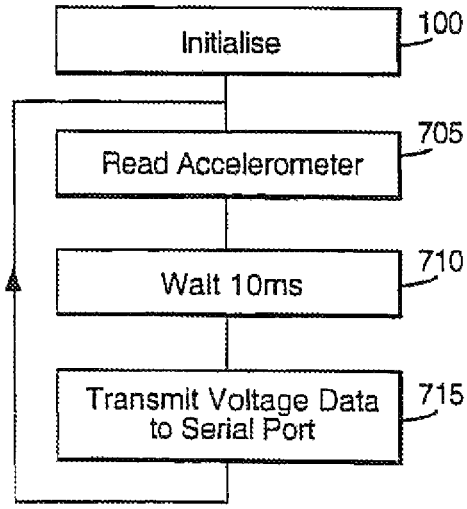

In an alternative method of operation and referring to FIG. 7a and initially to FIG. 7b, use of the stylus of FIG. 1 as a non-connected input device for a PC allows all of the functions of the hand held computer to be duplicated. For example, where alphanumeric data is input in the manner previously described with reference to FIGS. 10 to 14 a more powerful PC may be able to effect autocorrelation much more rapidly than the microcontroller 30 of the device itself. In this case, referring specifically to FIG. 7b, once the initialisation process has been completed at 100, one or both of the accelerometers may be read at 705 at 10 ms intervals as indicated at step 710 and the voltage data is transferred to the serial port for transmission by the wireless link or by use of infrared transmission.

A corresponding program in the PC itself will read from radio receiver 36 and the receive port the data defining the voltage from one, or both the accelerometers. Autocorrelation will be carried out on the reading to generate appropriate characters at step 725, the characters being displayed on the PC screen at step 730 and possibly being transmitted back to the hand-held PC.

In an alternative implementation autocorrelation may be carried out within the microcontroller 30 and data defining input characters themselves be transmitted to the PC.

Note that the transmission of comma separated variables (CSV) format ASCH is transmitted at 418 MHz using an amplitude modulated radio transmitter from RF Solutions of Lewes East Sussex UK. In the PC CMOS voltage levels converted by the RS232 conversion unit can be used to provide raw data to the PC. Windows 3.1 terminal software is capable of reading CSV data and spreadsheet can read and plot data graphically.

In a still further use of the accelerometer 31, 32 arrangement password protection of the hand-held computer may be provided. Thus, once trained to a user's signature, for example, a stored waveform corresponding to accelerometer voltage outputs read at 10 ms intervals can be used. Thus the user does not require to remember any special passwords and cracking of the signature code is extremely difficult since, for example forging a signature will result in a different acceleration pattern to that of the natural signature writer.

Thus it may be possible to use a hand-held computer of this nature to provide transmission of security information for, for example, electronic point of sale authorisations, access restriction and the like.

A still further use of the transmission and reception capability allows a local area paging system to be developed. Thus if several users work in reasonable proximity to each other it is possible to transmit a message directly from one hand-held computer to another such that, for example, telephone messages taken by one person in an office and files created may be transmitted using a digital serial identity to another specified hand-held computer unit.

Figure 16:
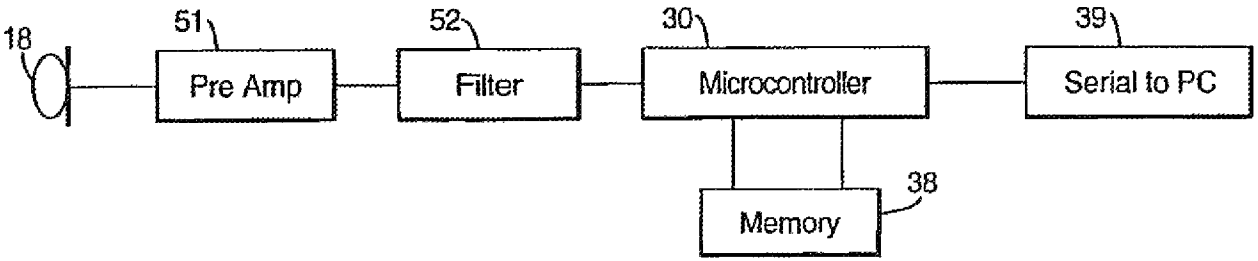
FIG. 16 is a schematic diagram of a voice input arrangement of the portable computer of FIG. 1.

Turning to FIG. 16, in addition to the simple 60 second voice note storage chip 34, the microphone 18 may also be connected by the amplifier and filter arrangements to provide voice input to the microcontroller 30. Voice recognition software can thus be used to convert the voice input to data, the keys or fingertip switches 18 to 20 having appropriate use for pause, record, etc as hereinbefore described with reference to the spoken memorandum chip. Converted data can thus be transferred to the memory or displayed on screen or as hereinbefore described with reference to using pen input for handwriting correlation by a PC serial data to the PC representing the voice input can be provided. This is indicated at 39.

In an alternative method of working, the microcontroller causes storage of the speech input in the memory 38 without effecting conversion, the information being transmitted via the serial output port either in the docking station or by the radio link to a PC which may use voice recognition software to carry out the conversions. It may be preferable to use a PC to carry out the conversion rather than a microcontroller incorporated in the pen since significant processing power may be required. However, the inclusion of voice recognition software in the microcontroller 30 is possible.

It will also be realised that a data store may be used to store received speech signals. Thus several speech notes each time/date stamped may be held for subsequent use. If a suitable store is included then the speech storage chip, hereinbefore described, may be omitted from the stylus to allow additional memory chip space.

It will be noted that since the hand-held computer of the invention includes microphone, loudspeaker and function keys use of the device as a cellular telephone is also envisaged.

Where cellular phone functionality is included within the stylus or where the stylus is in contact with a PC for example by IRDA or radio transmission, the use of the microphone input for substantial dictation purposes is possible and also the use of substantially larger data files than could otherwise be stored locally.

Thus the input speech will be stored in a buffer by the microcontroller 30 and periodically, when the buffer contains a substantial amount of data, a network connection to either network data storage means or to a predetermined PC is effected. Stored buffered data is then transferred to the remote location. Since the network connection is not permanently required the cost of transferring the data by this means is less significant and periods of network signal weakness can be overcome.

Data buffered in this manner may be date and time stamped or, if the stylus incorporates GPS (global positioning systems) may be location stamped also.

Data may similarly be recovered such that large text documents required by a user may have portions stored in the buffer for display and sequential recovery of other parts of the document from the remote location using telephony as required. Photographic data, for example from a digital camera, may similarly be saved to the network by way of the buffered store.

The various functions above described enable the provision of a full PDA function including diary alarm and scheduling functions as well as data input, file creation and storage. The user may select the mode of operation using either soft buttons or movement input and the use of the accelerometers 31, 32 is determined from the mode selected by the user. Electronic mail and fax facilities may be incorporated in the PDA functions allowing reception or transmission of data via the unit. The transmission capability of the unit may be associated with a receiver in a printer for example or a printer incorporating a docking station may be used to allow the printing of data from the PDA. Note that infrared transmission may be used.

As will be appreciated one of the major problems with any hand-held portable device is the use of rechargeable batteries which have a limited power life between charges. The hand-held computer of the present invention therefore incorporates a number of power saving facilities arranged particularly to close down back lighting of the small LCD screen 5 if it is not appropriate. Thus if the accelerometers indicate that there is no current usage of the system then powering down of the detection circuitry and back lighting of the screen may occur. However, in a further use of the proximity detector 15, it is possible to turn back lighting on and off in dependence upon whether the user is looking at information on the screen or not. Thus, referring to FIG. 15, the pyroelectric detector conversion detects presence of movement to maintain back lighting. Pyroelectric detectors tend to detect presence of a person by movement through a parallel beam of infrared such that when movement is detected across a Fresnel lens an AC signal is generated.

Thus the pyroelectric system can be used to detect the presence of a user and in the absence of use power down of the back lighting at least may occur. Infrared sensors may similarly be used to detect the presence or absence of body heat. Note the pyroelectric detector, as previously described, can be used to control the character zoom feature hereinbefore described. A suitable detector is a Murata type IRAE700STO.

Figure 15:
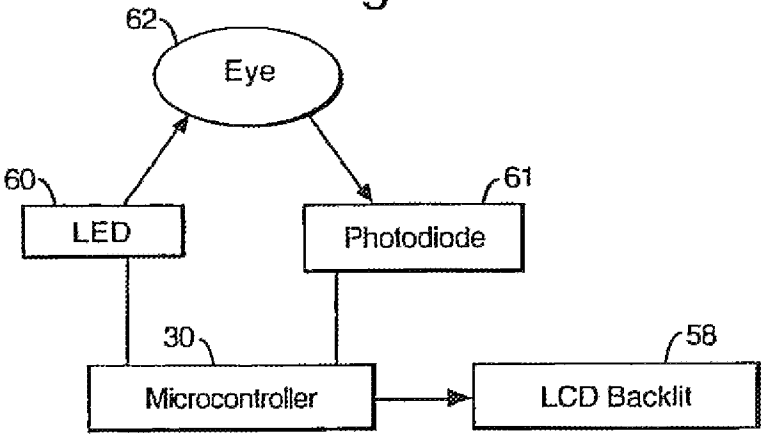
FIG. 15 is a schematic diagram of a power saving arrangement of the portable computer of FIG. 1.

In a further implementation of back lighting power down which is responsive to the viewer's vision in addition to the viewer's presence. It is known that when a subject looks directly at a lens and a flash occurs blood vessels at the rear of the eyes reflect back to the camera. It is thus possible to periodically flash a low level light and to sense red reflection using a photodiode sensor. Thus as shown at FIG. 15, the microcontroller 30 periodically causes an LED 60 to pulse. At the same time a photodiode 61 is monitored and, assuming presence of a user's eye 62 reflecting light from the pulse, the LCD will remain back lit as indicated at 58. It is further noted that a custom-built solar cell (not shown), for example a Solarex available from Farnell Electronics, may be used to assist triple charging of the battery 2.

If a user is not looking directly at the screen at the time the LED 60 is flashed there will be no reflection and the photodiode 61 will not activate. The microcontroller may therefore power down the back light 58 thus reducing the drain on the rechargeable battery 2.

Although the present invention has been described with reference to a particular implementation using accelerometers other position detection and location means may be used to implement movement detection arrangements. While herein references made to alphanumeric data it will be appreciated that katakana character and Cyrillic script inputs may also be detected using the acceleration method hereinbefore described.

Figure 9:
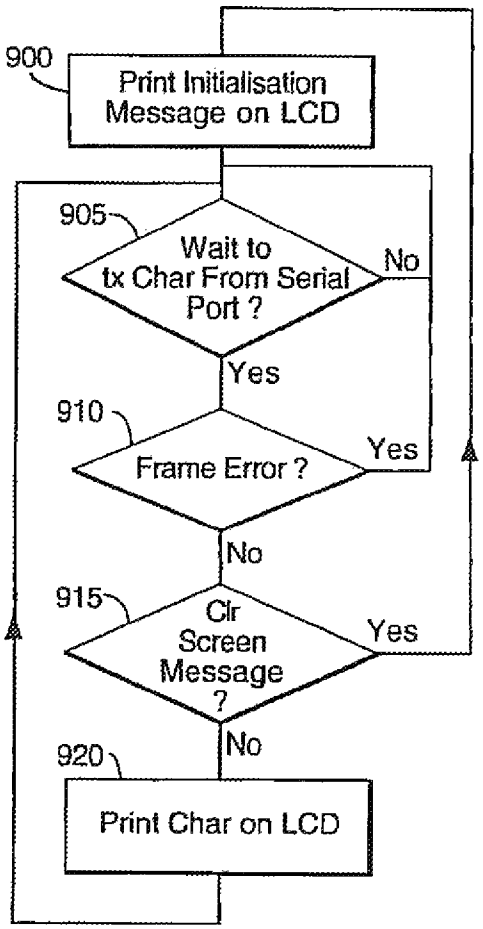

Note when the hand-held computer is docked with a PC or is receiving data by way of cellular or radio transmission it is possible to display received information on the screen 5. Thus as indicated at FIG. 9 an initialisation message is output to the screen 5 and an appropriate buffer is cleared. As characters are received at the serial port they are transferred to the microcontroller at 905 and checked for frame validity at 910. Assuming that there is no error at 910 and that the received character is not a clear screen message as indicated at 915 then a character is transferred to the LCD 5 for display at 920.

Further possible uses of the portable computer of the invention include storing large numbers of speech modes which when down loaded to a PC with the pen either in a docking station or by IRDA or radio transmission are sorted. In this process the PC converts the each of the speech notes to text and scans the text for frequently occurring words, for example "meeting" and then sorts the stored notes into sub-directories. Alternatively, notes may be sorted by date, subject matter or size as will occur with a normal windows file. Key control words such as "alarm" may result in the speech note being converted into a timed alarm which may then be written back to the portable computer so that at the appropriate time the portable computer either announces the alarm or a vibrate to alert the user, the alarm being displayed as a text message. It will be appreciated that if a sufficiently powerful microcontroller is used in the pen then the speech to text conversion may take place in the portable computer unit. A suitable vibrating motor for use as a silent alarm can be obtained from Murata of Japan. Situating the annunciator towards the barrel of the pen near the tip improves transmission.

The microcontroller may cause audio feedback of the current position of the stylus, for example by causing sounds of flicking pages when the pen is tilted forward or back.

While most emphasis herein has been on the display of alphanumeric, Katakana or Cyrillic characters, graphic information may also be viewed. For example, a file holding pictures related to a person may include three dimensional picture of that person's face. By revolving or tilting the computer the view may switch from a front view to a profile aspect. It will also be appreciated that an atlas may be stored in the data store and maps may be rotated to align with the direction of travel for example.

Additional functionality may be introduced to the hand-held computer by including a touch screen in front of the display screen such that a stylus can be used to select text or to cause localised movement of a cursor.

An autolocate function may be built into the microcontroller such that if no movement, ie no change in tilt of either the enclosed accelerometers occurs for a selectable period, probably 24 hours, the unit will sound an alarm at periodic intervals so that the user can locate it.

Note that the tilt sensors included herein measure tilt with respect to earth's gravity by use of a small beam arrangement. Other position sensors may be included. Global positioning By satellite is also a possible method of detecting a change in the position of the portable computer.

In a symbol counted mode it is possible for a user to flick the pen either as a tick or a cross, for example, in relation to a submitted document. The number of ticks or crosses may be counted and the result accumulated and transferred to data store or accumulated in a spreadsheet to which the user may input names, titles and the like. The use of other symbols in anticipated.

While as hereinbefore described the security signature is by use of acceleration, a pressure detector may be incorporated into the end of the device to further increase security by measurement of the profile as well as the two dimensional or three dimensional spatial sensor.

As has been mentioned hereinbefore, a number of keys, switches and buttons are provided on the casing of the portable computer. In a further implementation an on/off switch may be provided operated by pressure on the "nib-end". Whilst such switch pressure is not used for detecting Input text per se, it may be used to turn functions on and off. This may be used in a normal writing mode, for example, touching the pen tip against a writing surface to turn on the accelerometer detection functions. Releasing pressure on the tip then stops the accelerometer signals being considered as potential input to be decoded.

Any of the other switches may be used in certain modes to turn on or off text detection, for example, or to stop screen scrolling for example.

Calculator functions in the portable computer may be provided simply by writing the numerals and appropriate mathematical symbols in the normal manner. The tilt sensor software will determine the numerals and characters entered and perform an appropriate calculation for display on the display screen.

A further function, for example for clock setting causes Display of an analogue clock face on the display means 5. Time changes may be entered by selecting an appropriate mode and moving the user's write. Tilt sensing is used to determine forward or backward adjustment of the time stored.

What is claimed is:

[1. A portable computer comprising:

movement detection means responsive to movement of the computer to produce an electrical output signal representative of such movement, a storage medium for storing data defining a multiplicity of displayable pages each comprising of a plurality of lines;

a display having a corresponding plurality of lines to enable one of the multiplicity of pages to be displayed; and processing means responsive to the output of said movement detection means to determine detected movement data defining a user's intention;

the processing means using said movement data to provide a mode response selected from a multiplicity of stored possible modes, at least some of which define selection for display of a further one of the pages from the multiplicity of pages, the further one of the pages being adjacent to a previously selected page being currently displayed;

wherein detected movement data is used to effect scrolling of displayed information such that portions of data defining alphanumeric or graphic information outside a currently displayed screen is selectable by the user, the scrolling of displayed information effectively displaying a part of an adjacent screen.]

[2. A portable computer comprising:

movement detection means responsive to movement of the computer to produce an electrical output signal representative of such movement;

a storage medium for storing data defining a multiplicity of displayable pages each comprising of a plurality of lines;

a display having a corresponding plurality of lines to enable one of the multiplicity of pages to be displayed; and processing means responsive to the output of said movement detection means to determine detected movement data defining a user's intention;

the processing means using said movement data to provide a mode response selected from a multiplicity of stored possible modes, at least some of which define selection for display of a further one of the pages from the multiplicity of pages, the further one of the pages being adjacent to a previously selected page being currently displayed;

in which a relative lateral tilting movement causes the display of information stored as to one or other side of currently displayed information.]

[3. A portable computer comprising:

movement detection means responsive to movement of the computer to produce an electrical output signal representative of such movement;

a storage medium for storing data defining a multiplicity of displayable pages each comprising of a plurality of lines;

a display having a corresponding plurality of lines to enable one of the multiplicity of pages to be displayed; and processing means responsive to the output of said movement detection means to determine detected movement data defining a user's intention;

the processing means using said movement data to provide a mode response selected from a multiplicity of stored possible modes, at least some of which define selection for display of a further one of the pages from the multiplicity of pages, the further one of the pages being adjacent to a previously selected page being currently displayed;

in which relative rolling movement causes the display of information stored as above or below currently displayed information.]

[4. A portable computer comprising:

movement detection means responsive to movement of the computer to produce an electrical output signal representative of such movement;

processing means responsive to the output of said movement detection means to determine detected movement data defining a user's intention;

the processing means using said data to provide a mode response selected from a multiplicity of stored possible modes; and wherein the processing means is responsive to detected movement data to determine a most likely orientation of a computer display means, the processing means causing the displayed information to be oriented accordingly.]

[5. A portable computer as in claim 4, in which a plurality of switch means responsive to user action is included adjacent to the display means, the respective function of each of the switch means being oriented to match the orientation of displayed information.]

[6. A portable computer as in claim 4 further comprising a touch sensitive static potentiometer strip responsive to movement of a user's finger to simulate movement of a potentiometer, the orientation of said potentiometer reflecting the orientation of the displayed information.]

[7. A portable computer comprising:

movement detection means responsive to movement of the computer to produce an electrical output signal representative of such movement;

processing means responsive to the output of said movement detection means to determine detected movement data defining a user's intention, the processing means using said data to provide a mode response selected from a multiplicity of stored possible modes; and proximity detection means which provides signals indicative of the proximity of a computer display screen to a user's view, the processing means being further responsive to changes in relative proximity to increase or decrease the density of displayed information.]

[8. A portable computer comprising:

movement detection means responsive to movement of the computer to produce an electrical output signal representative of such movement;

a storage medium for storing data defining a multiplicity of displayable pages each comprising of a plurality of lines;

a display having a corresponding plurality of lines to enable one of the multiplicity of pages to be displayed; and processing means responsive to the output of said movement detection means to determine detected movement data defining a user's intention; the processing means using said movement data to provide a mode response selected from a multiplicity of stored possible modes, at least some of which define selection for display of a further one of the pages from the multiplicity of pages, the further one of the pages being adjacent to a previously selected page being currently displayed;

radio transceiver means, the processing means being responsive to detected movement data which identifies another device to cause the transmission of coded signals including a message for display.]

[9. A portable computer as in claim 8 in which the processing means is responsive to received encoded radio signals to activate a paging alert.]

[10. A portable computer as in claim 9, in which the page alert comprises a tone.]

[11. A portable computer as in claim 9, in which the paging alert comprises an operation of a vibrating means.]

[12. A portable computer as in claim 8, in which the processing means causes the display of a message derived from the information received.]

[13. A portable computer comprising:

a casing for housing other components of the portable computer, the casing being shaped to facilitate a user holding the portable computer as a writing stylus; and a display screen;

wherein said casing includes a radiused triangular cross-section along a substantial portion of its length and a flattened section incorporating the display screen, and an angular shaping between a forward holding area adapted to rest in the user's fingers and rearward flattened area holding the display screen the shaping being such as to provide a natural viewing angle of the incorporated display screen while the casing is held as a writing stylus.]

[14. A portable computer as in claim 13, in which the shaping causes the rearward screen area to be supported by the dorsal areas of a user's hand.]

[15. A portable computer comprising:

movement detection means responsive to movement of the computer to produce an electrical output signal representative of such movement;

a storage medium for storing data defining a multiplicity of displayable pages each comprising of a plurality of lines;

a display having a corresponding plurality of lines to enable one of the multiplicity of pages to be displayed; and processing means responsive to the output of said movement detection means to determine detected movement data defining a user's intention;

the processing means using said movement data to provide a mode response selected from a multiplicity of stored possible modes, at least some of which define selection for display of a further one of the pages from the multiplicity of pages being the further one of the pages being adjacent to a previously selected page being currently displayed;

wherein the processing means is responsive to detected movement data to determine a most likely orientation of the display, the processing means causing the displayed information to be oriented accordingly.]

[16. A portable computer comprising:

movement detection means responsive to movement of the computer to produce an electrical output signal representative of such movement;

a storage medium for storing data defining a multiplicity of displayable pages each comprising of a plurality of lines;

a display having a corresponding plurality of lines to enable one of the multiplicity of pages to be displayed; and processing means responsive to the output of said movement detection means to determine detected movement data defining a user's intention;

the processing means using said movement data to provide a mode response selected from a multiplicity of stored possible modes, at least some of which define selection for display of a further one of the pages from the multiplicity of pages, the further one of the pages being adjacent to a previously selected page being currently displayed;

in which a plurality of switch means responsive to user action is included adjacent to the display, the respective function of each of the switch means being oriented to match the orientation of displayed information.]

[17. A portable computer comprising:

movement detection means responsive to movement of the computer to produce an electrical output signal representative of such movement;

a storage medium for storing data defining a multiplicity of displayable pages each comprising of a plurality of lines;

a display having a corresponding plurality of lines to enable one of the multiplicity of pages to be displayed;

processing means responsive to the output of said movement detection means to determine detected movement data defining a user's intention, the processing means using said movement data to provide a mode response selected from a multiplicity of stored possible modes, at least some of which define selection for display of a further one of the pages from the multiplicity of pages, the further one of the pages being adjacent to a previously selected page being currently displayed; and a touch sensitive static potentiometer strip responsive to movement of a users finger to simulate movement of a potentiometer, the orientation of said potentiometer reflecting the orientation of the displayed information.]

[18. A portable computer comprising:

movement detection means responsive to movement of the computer to produce an electrical output signal representative of such movement;

a storage medium for storing data defining a multiplicity of displayable pages each comprising of a plurality of lines;

a display having a corresponding plurality of lines to enable one of the multiplicity of pages to be displayed; and processing means responsive to the output of said movement detection means to determine detected movement data defining a user's intention;

wherein detected movement data is used to effect scrolling of displayed information such that portions of data defining alphanumeric or graphic information outside a currently displayed screen is selectable by the user, the scrolling of displayed information effectively displaying a part of an adjacent screen.]

[19. A portable computer as in claim 18, including a sound output device, the processing means being arranged to provide output of speech or other sound signals derived from stored data.]

[20. A portable computer as in claim 18, including radio transmission or infrared transmission means, the processing means being responsive to detected movement data to output to the transmission means signals representative of the detected movement.]

[21. A portable computer as in claim 18, including radio transmission or infrared transmission means, the processing means being responsive to detected movement data to output to the transmission means signals representative of alphanumeric characters.]

[22. A portable computer as in claim 18, in which the processing means stores data defining an authorised user's password, the processing means being locked in a secure mode until detected movement data corresponding to the security data is received.]

[23. A portable computer as in claim 18, further comprising a sound input device, the processing means being responsive to voice input signals from a user to derive alphanumeric data.]

[24. A portable computer as in claim 23, further including a sound output device in combination with a radio transceiver whereby cellular or radio telephony networks may be used.]

[25. A portable computer as in claim 18 housed in a casing shaped to facilitate a user holding the computer as a writing stylus.]

[26. A portable computer as in claim 25, in which the casing comprises a radiused triangular cross-section along a substantial portion of its length.]

[27. A portable computer as in claim 26, in which the casing includes a flattened section incorporating a display screen.]

[28. A portable computer comprising:

movement detection means responsive to movement of the computer to produce an electrical output signal representative of such movement;

a storage medium for storing data defining a multiplicity of displayable pages each comprising of a plurality of lines;

a display having a corresponding plurality of lines to enable one of the multiplicity of pages to be displayed; and processing means responsive to the output of said movement detection means to determine detected movement data defining a user's intention;

in which a relative lateral tilting movement causes the display of information stored as to one or other side of currently displayed information.]

[29. A portable computer as in claim 28 housed in a casing shaped to facilitate a user holding the computer as a writing stylus.]

[30. A portable computer as in claim 29, in which the casing comprises a radiused triangular cross-section along a substantial portion of its length.]

[31. A portable computer as in claim 30, in which the casing includes a flattened section incorporating a display screen.]

[32. A portable computer comprising:

movement detection means responsive to movement of the computer to produce an electrical output signal representative of such movement;

a storage medium for storing data defining a multiplicity of displayable pages each comprising of a plurality of lines;

a display having a corresponding plurality of lines to enable one of the multiplicity of pages to be displayed; and processing means responsive to the output of said movement detection means to determine detected movement data defining a user's intention;

in which relative rolling movement causes the display of information stored as above or below currently displayed information.]

[33. A portable computer as in claim 32 housed in a casing shaped to facilitate a user holding the computer as a writing stylus.]

[34. A portable computer as in claim 33, in which the casing comprises a radiused triangular cross-section along a substantial portion of its length.]

[35. A portable computer as in claim 34, in which the casing includes a flattened section incorporating a display screen.]

[36. A portable computer comprising:

movement detection means responsive to movement of the computer to produce an electrical output signal representative of such movement;

a storage medium for storing data defining a multiplicity of displayable pages each comprising of a plurality of lines;

a display having a corresponding plurality of lines to enable one of the multiplicity of pages to be displayed; and processing means responsive to the output of said movement detection means to determine detected movement data defining a user's intention;

wherein the processing means is responsive to detected movement data to determine a most likely orientation of the display, the processing means causing the displayed information to be oriented accordingly.]

*37. A hand held cellular telephone comprising:*

*a case;*

*the case being unitary and without comprising a hinge;*

*the case being sized and shaped to be held within one hand of a user;*

*the case also containing a cellular transceiver;*

*the case also containing a processor;*

*a rechargeable battery also being housed within the case;*

*a display that displays information, the display disposed on the case;*

*the screen area of the display being of a size such that it extends between the root of a thumb and an index finger of a user and extending to the user's wrist;*

*a detector that generates data indicative of whether a user is looking at the display;*

*the display being powered by a rechargeable battery; and*

*the processor being configured to reduce power supplied by the rechargeable battery to the display based on the data generated by the detector.*

*38. The hand held cellular telephone of claim 37, wherein the display comprises a touch screen.*

*39. The hand held cellular telephone of claim 37, wherein the housing comprises a molded plastic case which is sealed to make the case waterproof.*

*40. The hand held cellular telephone of claim 37, further comprising a light emitting diode.*

*41. The hand held cellular telephone of claim 40, wherein the light emitting diode may emit light of more than one color.*

*42. The hand held cellular telephone of claim 40, wherein the light emitting diode emits a red color.*

*43. The hand held cellular telephone of claim 37, further comprising configuring the hand held cellular telephone to*

*perform multiple functions selected from the group consisting of at least one of: reception and transmission of email; storage and display of large text documents; diary alarm and scheduling functions; storage and display of maps; and storing and sorting speech notes.*

*44. The hand held cellular telephone of claim 43, wherein the at least one function of storage and display of large text messages comprises the storage and display of photographs.*

*45. The hand held cellular telephone of claim 43, wherein the at least one function is storage and display of maps.*

*46. The cellular telephone of claim 37, wherein the display comprises a liquid crystal display further comprising a backlight.*

*47. The cellular telephone of claim 46, wherein the processor is configured to reduce power to the liquid crystal display by closing down the backlight of the display.*

* * * * *